US007787416B2

(12) United States Patent
Gidwani

(10) Patent No.: US 7,787,416 B2
(45) Date of Patent: Aug. 31, 2010

(54) WIRELESS NETWORK HAVING REAL-TIME CHANNEL ALLOCATION

(76) Inventor: Sanjay M. Gidwani, 18925 Mellon Dr., Saratoga, CA (US) 95070

(*) Notice: Subject to any disclaimer, the term of this patent is extended or adjusted under 35 U.S.C. 154(b) by 888 days.

(21) Appl. No.: 10/994,080

(22) Filed: Nov. 18, 2004

(65) Prior Publication Data

US 2006/0104232 A1 May 18, 2006

(51) Int. Cl.
*H04W 4/00* (2009.01)
(52) U.S. Cl. .................. 370/329; 370/310; 370/327; 370/328; 370/338
(58) Field of Classification Search .......... 370/338, 370/331; 455/436
See application file for complete search history.

(56) References Cited

U.S. PATENT DOCUMENTS

| 5,659,596 | A  | * | 8/1997  | Dunn ................... 455/456.1 |
| 6,463,274 | B1 | * | 10/2002 | Robertson ............... 455/406 |
| 6,496,499 | B1 | * | 12/2002 | Hamilton et al. .......... 370/348 |
| 6,553,218 | B1 | * | 4/2003  | Boesjes ................. 455/406 |
| 6,754,191 | B1 | * | 6/2004  | Paranchych et al. ........ 370/331 |
| 6,771,962 | B2 | * | 8/2004  | Saifullah et al. .......... 455/436 |
| 6,889,056 | B2 | * | 5/2005  | Shibutani ................ 455/522 |
| 6,891,807 | B2 | * | 5/2005  | Roskind et al. ........... 370/255 |
| 6,954,790 | B2 | * | 10/2005 | Forslow ................. 709/227 |
| 6,978,144 | B1 | * | 12/2005 | Choksi ................. 455/452.2 |
| 7,050,405 | B2 | * | 5/2006  | Attar et al. ............. 370/282 |
| 7,330,472 | B2 | * | 2/2008  | Kowalski ............. 370/395.21 |
| 7,453,844 | B1 | * | 11/2008 | Lee et al. .............. 370/329 |
| 2003/0068975 | A1 | * | 4/2003 | Qiao et al. ............. 455/11.1 |
| 2005/0094585 | A1 | * | 5/2005 | Golden et al. ........... 370/310 |
| 2005/0153725 | A1 | * | 7/2005 | Naghian et al. .......... 455/520 |

* cited by examiner

*Primary Examiner*—Vincent P Harper
*Assistant Examiner*—Mazda Sabouri
(74) *Attorney, Agent, or Firm*—Blakely, Sokoloff, Taylor & Zafman LLP

(57) ABSTRACT

A wireless network having a real-time channel allocation is described herein. In one embodiment, an exemplary network architecture includes, but is not limited to, multiple access points coupled to a wired network, where each of the access points is capable of communicating with one or more mobile nodes over a wireless network. The exemplary network architecture further includes a controller coupled to the access points over the wired network. The controller maintains one or more parameters that control one or more characteristics of each access points. The controller adjusts and communicates the one or more parameters to each of the access points in response to a detection of real-time conditions changed. Other methods and apparatuses are also described.

27 Claims, 31 Drawing Sheets

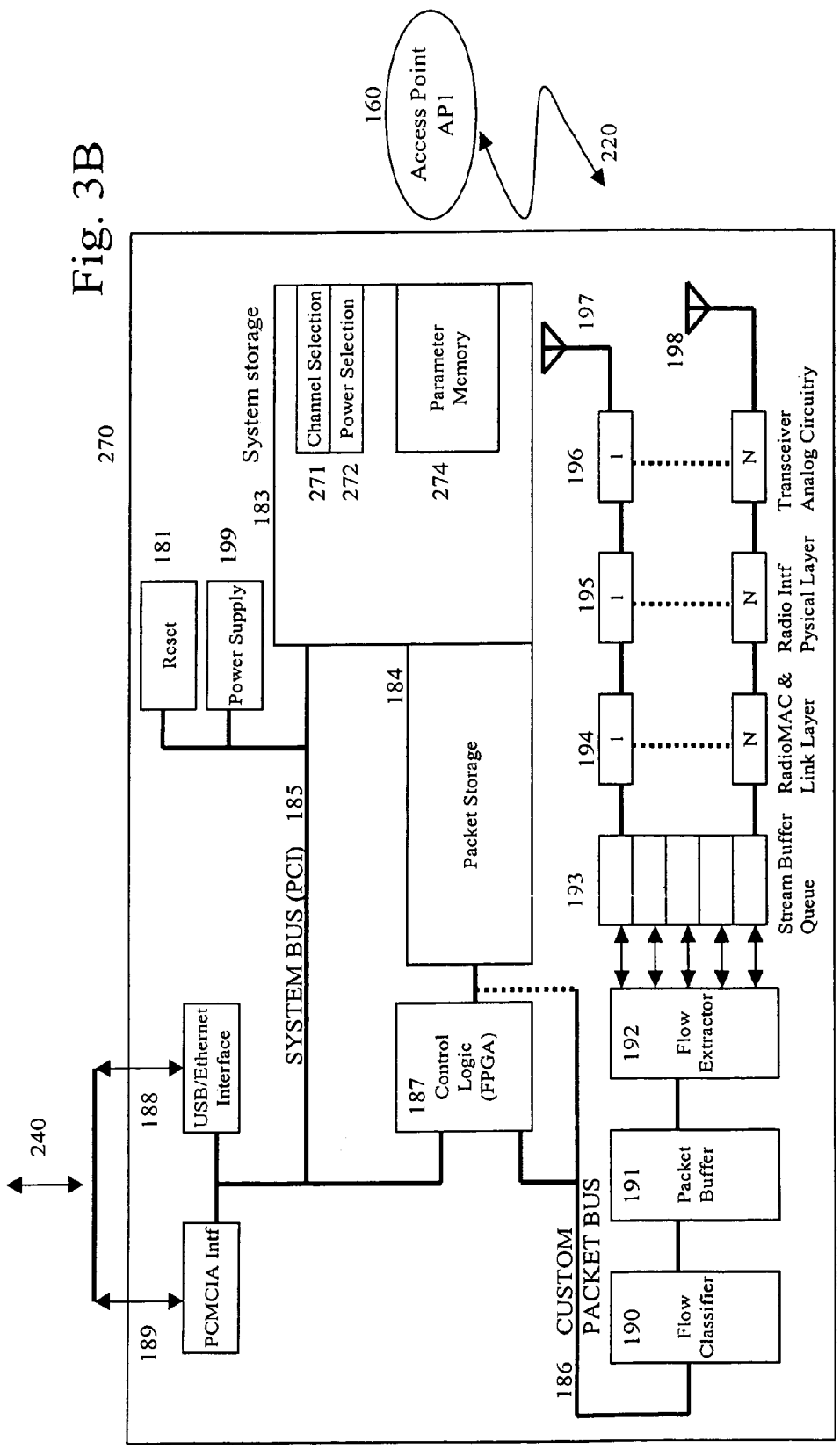

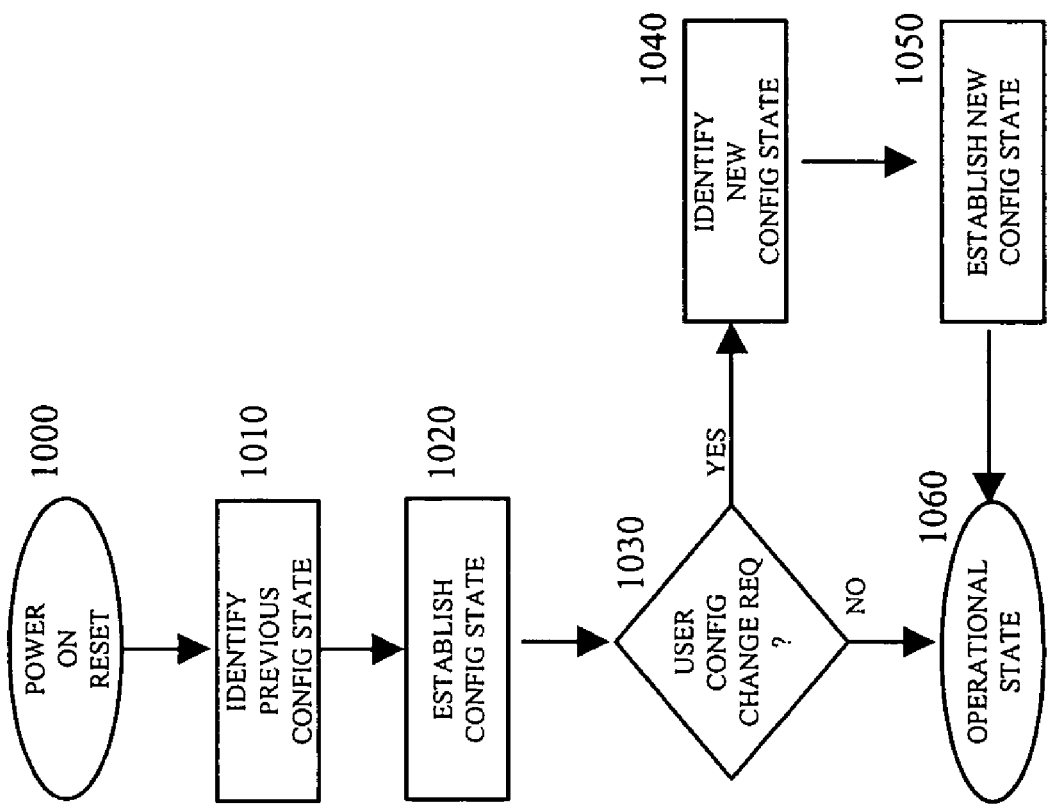

WIRELESS NETWORK HAVING REAL-TIME CHANNEL ALLOCATION

FIELD OF THE INVENTION

The present invention relates generally to wireless networks. More particularly, this invention relates to a wireless network having a real-time channel allocation.

BACKGROUND OF THE INVENTION

Wireless networking has grown into an expansive field. Specifically, Wireless Fidelity (WiFi) has received much attention as a technology for wireless local area networks (WLAN). Furthermore, various new technologies such as WiMax are receiving attention as possibly a wireless backhaul technology for internetworking wireless networks for hotspots and 3G wireless networks. Although significant WiFi penetration has been made in the SOHO (small office/home office) and residential markets; WiFi's penetration within the enterprise and the carrier has been limited by a number of challenges. Some of the key challenges faced by the carrier, large campus and enterprise networks in adopting wireless networks have been lack of reliability and scalability. These coupled with the lack of multi-streaming, multi-service support and limitations in a client node capacity have all contributed to hinder the penetration of the mobile wireless networks on a wider scale.

A typical wireless network includes multiple mobile nodes that operate in an ad-hoc manner or else are connected to an access point and operate in an infrastructure manner. Certain conventional systems incorporate multiple mobile nodes interconnected with a single access point and utilize a single wireless connection pathway for their communications. In a traditional wireless architecture, the wireless connection pathways are shared. In such a topology, the mobile nodes have to share the access to the medium. Furthermore, access points typically utilize a single frequency or channel that interconnects with one mobile node at a given time. Typically the access point provides the primary ways for forwarding information from the given mobile nodes to the local area network (LAN) utilizing a back haul connection pathway. In a traditional wireless network the back haul connection is typically a wired interface to the local area network.

In a conventional wireless network, one of the compelling performance limitations is packet latency. Latency in this context refers to the time delay between when a given mobile node is ready to make a request to the access point for transferring a packet, and the time when access point is prepared to accept the packet transfer and so informs the mobile node. If a given mobile node makes a request to an access point that it has a packet ready for transfer, but the access point has already arbitrated access of the medium to a different mobile node then the first mobile node has no choice but to wait until the medium is available once again. One of the prevalent problems with such a traditional wireless network is that the access to the network from the first mobile node's perspective is unpredictable. Such a variation in the access of the medium results in a lack of quality of service and is of paramount concern in real time network services. Furthermore, as more mobile nodes enter the range of an access point, the average bandwidth available to each mobile node decreases by virtue of the shared medium.

Thus, an integrated switching wireless telecommunications network capable of supporting multiple applications, multiple streams in a scalable and reliable manner is needed.

SUMMARY OF THE INVENTION

A wireless network having a real-time channel allocation is described herein. In one embodiment, an exemplary network architecture includes, but is not limited to, multiple access points coupled to a wired network, where each of the access points is capable of communicating with one or more mobile nodes over a wireless network. The exemplary network architecture further includes a controller coupled to the access points over the wired network. The controller maintains one or more parameters that control one or more characteristics of each access points. The controller adjusts and communicates the one or more parameters to each of the access points in response to a detection of real-time conditions changed.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 3B illustrates an exemplary mobile node 1 (MN1).

FIG. 11 illustrates an exemplary single parameter control plane.

DETAILED DESCRIPTION

Figure 20:
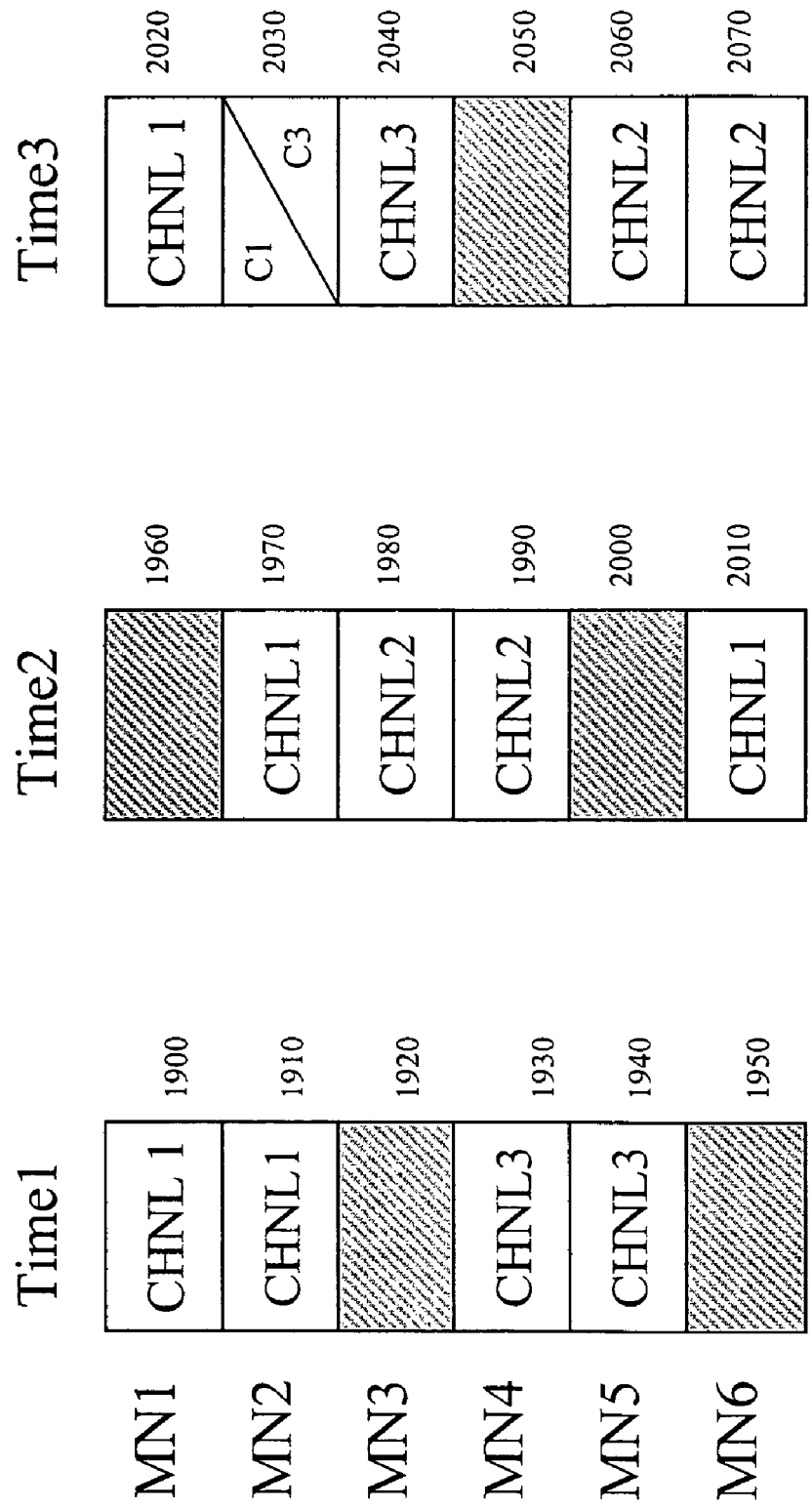
FIG. 20 is an exemplary simultaneous real-time channel usage diagram within the scalable wireless network architecture.

A wireless network having a real-time channel allocation is described herein. In one embodiment, exemplary network architecture includes multiple access points coupled to a wired network, where each of the access points is capable of communicating with one or more mobile nodes over a wireless network. The exemplary network architecture further includes a controller coupled to the access points over the wired network. The controller maintains one or more parameters that control one or more characteristics of each access points. The controller adjusts and communicates the one or more parameters to each of the access points in response to a detection of real-time conditions changed. FIG. 20 illustrates an example of a wireless network having a real-time channel allocation according to one embodiment.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

According to one aspect of the invention, an apparatus includes an intelligent system controller enabled as a physical device or as a virtual distributed functionality. The intelligent system controller has the capability to get statuses from one or more intelligent access points and intelligent network interface modules within the network and to cooperate with the intelligent components in establishing command and control to provide a scalable, reliable network. The access points have the capability of either working independently or in conjunction with the intelligent controller and the intelligent mobile nodes to deliver advanced services within a scalable wireless network.

According to the invention, a system controller includes a single chassis or multi chassis resident in a centralized location, capable of accessing one or more distributed access points. The access points may be located or collocated either with the central controller or they may be distributed across a large network that may be physically segregated from the central location. Multiple intelligent access points have the capability of connecting to one or more intelligent network interface modules (NIMs). The intelligent NIMs may be located in a computer or an intelligent device such as in a network appliance or a PDA. The intelligent access point aggregates one or more network interface modules and provides advance services, including, for example, quality of service, traffic segregation, and traffic prioritization, etc.

According to one embodiment, the system controller may further include disparate multiple chassis, where the controller functionality is provided in a cooperative virtual distributed manner. The functionality of the controller may be achieved within one or more of the intelligent controllers, intelligent access points, intelligent network interface modules or disparate operational units such as computers.

According to one embodiment, the system controller includes a single or multi chassis incorporating one or more processing functions which are able to deliver the processes and control functions and demands to the access points on a as needed basis. The system controller is cognizant of the local traffic and other conditions at one or more intelligent access points.

In another embodiment, a method for a real-time scalable wireless switching network is provided via an intelligent controller residing at a central location. The intelligent controller can be distributed at remote sites and communicates to one or more access points. The access points can be distributed across a wide network. According to one embodiment, the intelligent controller has the capability of communicating and controlling the functionality of these intelligent access points.

The controller has the capability of communicating with one or more access points within a large network and providing the location based and subscriber based information to additional upstream controllers. Note that multiple controllers may be interconnected to provide a distributed large scalable network for a service provider. In one embodiment, a method of interconnection of intelligent access points to network interface modules (NIMs) is provided. Both the access points and the NIMs may be within the same physical network or segregated across multiple networks.

In a further embodiment, a method for communication between the system controllers, the intelligent access points and the intelligent NIMs is provided, such that information can be passed across the system and intelligent decisions can be made regarding the topology of the network and the immediate conditions of one or more parameters. The information regarding one or more parameters can be used to make intelligent decisions regarding traffic policies, quality of service, and other performance and service related parameters including frequency and power usage, etc., within the wireless network.

In one embodiment, variable classes of service may be delivered within the context of a unified wireless network, where one or more subscribers may be treated differently based on the subscriber's profile, or the application's profile, or the combination thereof.

According to one embodiment, a control and command plane may be segregated from the actual traffic data plane within the scalable wireless network. The access points and mobile nodes are flexible in their configuration. The network needs to communicate with these elements from time to time to configure their functionality such as channel usage, frequency usage, and power usage. The intelligent components may maintain policy control regarding the quality of service, diversified routing capability and other information for the optimized management of the intelligent components. Traditional wireless access points and networks utilize the same communication pathways for communicating the management and control information that is used for communicating the data to be transferred. According to one embodiment, a separate link may be utilized for the control and command packets, while the data traffic is being transferred over another link.

The incorporation of a segregated control and data plane provides a degree of traffic forecasting abilities. The system incorporates the ability to queue one or more transactions based on a plurality of parameters such as quality of service (QoS), class of service, and application type, etc. By use of intelligent queuing technologies, it is able to have a degree of predictability in regards to future transactions. Furthermore, a mechanism is provided for storing and retrieving a history of previous transaction to be used in aiding future queuing decisions.

The segregation of the control plane and the data plane rely on the principal that where resources are limited, efficiency is improved by only transacting low priority traffic once all the higher priority traffic has been transacted. It is advantageous in comparison to the traditional technologies in that a system is able to predict the future state of the network and make early decisions to determine if a grant of a present request could lead to a future conflict. Traditional wireless technologies generally have the ability of either granting a given transaction or otherwise refusing a given transaction. By virtue of using a single plane for command and control plane and data plane, the conventional technologies cannot receive a transmission request until the preset transaction is complete. This approach is inferior in that the resultant transaction is unpredictable and even a slight delay in making the request can lead to losing the arbitration sequence. The higher priority losing mobile node has little choice but to wait for the next arbitration time slot and to try to assert itself in the arbitration request. It is further advantageous in that once the intelligent controller or access point has received the request, the requesting node will be notified using the control and command channel. Upon receiving the notice from the controller, the requesting node can proceed to continue the transaction.

According to one embodiment, active congestion avoidance may be supported. Current technologies generally rely on information regarding only the present state of the network, and have only an instantaneous view of the network. According to one embodiment, the system makes intelligent decisions with a view towards predicting the effect of the communication request grant on the likely state of the network in the future. Alternative routes for the completion of the transaction request may be provided. Any communication request is viewed by the controller as a request to communicate from an originating node to a terminating node and based on the quality and class requirements of the transaction, alternative paths may be utilized for the completion of the transaction.

According to one embodiment, a persistence tag may be associated with a given communication request and for treating the given request as a transaction. Thus, a given request is classified in terms of its likely-hood of continuing to use the network resources. In an exemplary voice call transaction, the network attributes a high persistence to the transaction request, where a single transaction data packet may have a lower persistence associated with it. It is advantageous in that the transaction persistence tag may be utilized to assist in congestion prediction and control.

In one embodiment, the control plane and the data plane may be virtually segregated. In such a topology, both the information requested and the information provided are within the same device and possibly even on a single channel. Such an embodiment is advantageous in cases of severe interference or other conditions that may limit the use of a fully segregated control and data plane. In one embodiment, the intelligent nodes switch between a control channel and a data channel to maintain virtual control plane segregation. In another embodiment, a single channel is used and the control plane and data plane share the channel to communicate.

In a further embodiment, the control plane and the data traffic plane may be segregated on separate multiple channels. In such an embodiment, the information regarding the management and control of the intelligent access points, mobile nodes, and other network components is segregated into a separate physical channels. Thus, for example, if the subscriber(s) information is being transmitted and received on a given frequency channel, the command and control information is being transmitted and receive on a different frequency channel. One of the advantages of such a network is that the command and control information may not demand the same performance as the subscriber's traffic on the data channel. In one embodiment, the command and control channel characteristics remains fixed, while the connectivity of the traffic channel is dynamic and may vary on a number of subscriber based or application based parameters, such as QoS, traffic class, and application type.

In one embodiment, the control plane is primarily responsible to collate the traffic information, analyze the information, and optimize the network performance in regards to one or more parameters such as frequency, power and other characteristics of the wireless network. The control plane may alter in real-time physical characteristics of the intelligent access points, mobile nodes and other components within the network with a view of the overall network topology. Mobile nodes may travel amongst multiple access points. The system is able to analyze the permutations and pre-select command and control parameters to provide a more efficient hand-off from one access point to another access point for a given mobile node. Furthermore, as the command and control information may be provided to the intelligent access points in advance of the data transaction, the data transaction my continue in a seamless manner.

The multi-stream segregated control plane mechanism may be advantageous in that for the given mobile nodes to communicate with the intelligent controller, a reservation of resources may be requested without affecting the data operations. When such a command and control request is made without using the data channel, the inefficiencies of the traditional collision detection and contention resolution are minimized. The segregated multi-stream control plane mechanism provides the predictive usage allocation by the intelligent controller, such that a given frequency usage may be highly optimized. Consequently, the network is better able to deliver and manage high performance real-time services.

In one embodiment of the invention, parameter storage is provided across one or more intelligent access points and intelligent mobile nodes for use in cooperation with the controller. The contents of the parameter storage may include information used in computation of the network optimization. The parameter storage may be shadowed within the controller or it may simply be distributed across the intelligent controllers. The parameter storage is made available to the local intelligent components and is advantageous when interconnection with the controller may be lost. In another embodiment of the invention, the parameter storage is located centrally within a controller and is broadcast to the appropriate intelligent components from time to time.

In one embodiment of the invention, multiple connectivity may be established between an intelligent access point and a given intelligent mobile node. The multi-link connectivity can be used to segregate the control plane from the traffic plane or to simply provide one or more connections across the given data plane. In one embodiment, the system transmits the command and control information on a given link, while the data between the mobile nodes can be transmitted on a separate link. In an alternative embodiment of the invention, the system can utilize either multiple links for command and control and multiple links for traffic plane, both, or a combination of either. The multi-link connectivity is advantageous in that the network can differentiate classes and quality of service and select the most appropriate link for the given transaction. As new requests arrive at the intelligent component, the system may elect to utilize an alternative link for such a transaction without interrupting the transaction in progress.

In another embodiment of the invention, multiple communication links are available and used to provide multiple communications pathways. In such an embodiment, the multiple communication pathways enable the network to use one or more of the communication pathways as the primary communications channels, while using the other communication pathways as the secondary communications channels. The network may use the primary and the secondary communication pathways interchangeably.

In another embodiment of the invention, the controller may utilized multiple pathways to perform load balancing of the network in that traffic is distributed on a relatively even basis. In such an embodiment, the multi-path mechanism delivers a reliable bandwidth to each of the mobile nodes, such that real time services can be carried over the existing infrastructure in a load balanced manner.

The multi-path mechanism is advantageous in that the resultant network can be overlaid on top of existing traditional wireless network nodes. In such an exemplary deployment, if a given traditional mobile node only has the ability of operating on a single frequency at a time, the system simply treats the secondary channels as unavailable. Where multiple channels and frequencies are available within intelligent mobile nodes, the secondary channels are utilized to support either a segregated command and control plane, or simply used to support data traffic.

One of the innovative characteristics of an embodiment of the invention is that cut-thru forwarding is supported. In such an exemplary network, a high speed direct communication between nodes may not possible due to one or more factors, such as the relative distance between the nodes or interference, etc. The mobile nodes may request service from the controller. Once the controller receives the request, the controller may inspect the current spectral disposition of the network and determines the optimal path and bandwidth for the communication between the mobile nodes. The controller may elect for the mobile nodes to form a member group consisting of the originating mobile node, a terminating mobile node, and one or more forwarding mobile nodes. Alternatively, the controller may elect to form multiple member groups to form a chain of cut-thru forwarding member groups. The first group may include the originating mobile node and the first forwarding node at a given channel, and the last group may include the last forwarding node and the terminating node at an alternative channel, and one or more mobile nodes may be implemented as one or more intermediate forwarding nodes. With use of multi-link connectivity, the system may perform cut-thru forwarding, where the forwarding nodes do not have to wait for the complete reception of the packet from the originating or prior forwarding node before starting to relay the packet to the mobile nodes.

In one embodiment, the controller may cooperate with the individual mobile nodes to select a combination of traditional forwarding mechanisms and to select the intelligent forwarding mechanisms. The segregated group members are formed in a manner, such that the controlled may elect to operate certain intelligent mobile nodes in traditional mode based on system wide optimization while operating other intelligent mobile nodes in an intelligent cut-thru forwarding mode.

In one embodiment, semi-hoc operation mode may be supported, where the intelligent component may substantially simultaneously operate as an infrastructure access point component and an ad-hoc mobile component. Traditional ad-hoc networks allow mobile nodes to communicate with each other, where traditional infrastructure networks require mobile nodes to communicate with access points that in-turn provide the routing and forwarding services. Traditional wireless networks operate in one of two modes, either ad-hoc or infrastructure. According to one embodiment of the invention, in the semi-hoc mode, the intelligent components simultaneously operate as an ad-hoc network and as an infrastructure based network. Based on the requirements of the service requested, the command and control request for service is established on one operational model, while the connection is established over another operational model. The intelligent access points may communicate with one or more operational modes, such as ad-hoc, infrastructure, and semi-hoc. Alternatively, segregating operational modes may be based on traffic classes or qualities, such as data service versus voice traffic.

In one embodiment of the invention, multiple links may be established simultaneously within the wireless network. The behavior and the allocation of the multiple links may also be controlled in real-time.

The real-time channel allocation mechanism provides the capability, where an intelligent mobile node may communicate with another intelligent component, such as another intelligent mobile node, on a given channel. The intelligent node, in cooperation with other intelligent mobile nodes, access points and intelligent controllers, may then elect to change the priority and preference of the given channel in real-time. In association with such a real-time alteration of the channel characteristics, the transaction in progress or additional transactions in queue are reallocated to the new condition of the network in real-time.

In one embodiment of the invention, the intelligent nodes may support multiple channels for communications. In such an embodiment, the intelligent node may utilize one of the channels to communicate with the intelligent components, such as another mobile node. Further, one of the other channels may be utilized for communication with additional required intelligent components. It is advantageous in that the command and control channel may be utilized by other intelligent components to request to interrupt a given data channel already in use in real-time. The intelligent node may alter the priority of a given communication link and the priority and preference associated with the channel in real-time.

In one embodiment, the controller may dynamically elect an intelligent component to cooperate with one or more non-intelligent (e.g., traditional) mobile nodes and serve as a non-intelligent access point. In this embodiment, the elected mobile node serves as a forwarding node to aggregate one or more non-intelligent mobile nodes and enforce one or more policies established by the intelligent controller. It is advantageous in that while the given non-intelligent mobile nodes are unable to cooperate with the controller, the elected intelligent component has the ability to share its distributed capability with the non-intelligent components and provide the advanced service capabilities. Furthermore, an intelligence encapsulation mechanism may provide the capability of cooperating with an existing non-intelligent network and rapidly deploying the intelligence mechanisms of the present invention in an overlay manner and without requiring alteration of the existing network.

In one embodiment, a local adaptation model is supported. The intelligent controller, on a recurring basis, may poll one or more access points or mobile nodes for local information to refresh its information database. In such an embodiment, the intelligent controller utilizes the queried information to implement a local adaptation model (LAM) and make intelligent policy decisions based on either a packet-by-packet basis or with finer or courser granularity. The LAM provides enables the intelligent controller to maintain a network wide scope and distribute the parameter policy information to the respective intelligent components for local implementation.

In one embodiment, the availability of parameter information is maintained within the intelligent controller. In such an embodiment, if communication connectivity is lost between the intelligent controller and any of the intelligent components, the intelligent controller can approximate the behavior of these components based on the previous information collected. The controller then utilizes the approximated values to provide a best effort system wide approximation for the rest of the intelligent components. Once the communication link with the inaccessible intelligent components is re-established the controller will then revert to a true network wide LAM.

Furthermore, from the perspective of the intelligent component that has lost connectivity to the intelligent controller, the component may detect the connectivity loss and begin operating independently and provide a seamless operating environment. Once the connectivity is re-established, the intelligent component reverts to cooperating with the controller to provide a network wide LAM.

In traditional wireless networks, transmission effectiveness in a wireless network is affected by a number of phenomenon such as atmospheric interference and interference from other mobile transmission sources. Due to the real-time nature of the wireless link, the LAM provides adaptation and control to compensate for the local time-variant conditions of the network in real-time. Time variant phenomenon may result in changes in capacity for a given wireless link or in some cases the complete loss of communication on a given link. The LAM is advantageous in that QoS requirements of the mobile nodes can be maintained as the network adapts to the changing local conditions and routing around any wireless obstacles.

In one embodiment, the capability of local and network wide adaptation is supported, where subscriber service can be continued even in the case of loss of comprehensive command and control capability. In such an embodiment, the notion of resilient adaptation network (RAN) is advantageous, where the intelligent network components that have lost connectivity with its peers or superior network components may act on the behalf of the inaccessible device. The intelligent components may elect to utilize the expanded functionality of the RAN to aid the peers or superior components in expanding the functionality of the network. In such an embodiment, an intelligent access point has a capability to act on behalf of a local controller and a mobile node has the capability to act on behalf of an intelligent access point. With RAN, the inferior networking components may continue operation by the virtual replacement of the superior networking components with minimal impact on the performance of the network.

In one embodiment, a mobile node is able to provide routing and forwarding services on behalf of its superior components such as an intelligent access point. The mobile node then has the capability to take over the functionality of the intelligent access point when it is so required. It is advantageous in that it provides an alternative way for providing network services in case of temporary or permanent service outages.

In one embodiment, the local controller may elect to request a given mobile node connected to a given intelligent access point to operate in the RAN mode while electing to request other mobile nodes to operate in traditional mobile node modes. The model node may provide temporary local routing means for communication to or from mobile nodes that has limited range. While operating in the RAN mode, the affected network components are able to make intelligent decisions in the absence of communication with superior components, such as intelligent access points or system controllers. Thus, intelligent mobile nodes are able to select parameters for optimizing the operation within their local scope.

In an alternative embodiment, one or more of the mobile nodes may act as a local controller or an intelligent access point for the benefit of other mobile nodes. It is further advantageous in that it presents a single elected controller device to coordinate multiple mobile nodes within its range, rather than having them optimized individually. In one embodiment, the command and control functionality may be overlaid over an existing wireless network. In such an overlay operation, the intelligent controller, intelligent access points and the intelligent mobile nodes co-exist with non-intelligent wireless devices such as traditional wireless access points, and traditional mobile nodes. In such an overlay operation, the intelligent nodes may continue to support the intelligent features and function for the intelligent devices, while providing traditional functions and features for the traditional wireless devices.

According to one embodiment, an alternative secondary communication path may be established by requesting a mobile node to forward the traffic to one or to one or more forwarding mobile nodes and to establish a local area network (LAN) interconnection. Once the intelligent access point has established the secondary path, some or all of the traffic originally directed to the primary path can be re-routed thru the secondary path. In one exemplary network topology, the primary communication path from the intelligent access point is wireless. In yet another exemplary network topology, the intelligent access point acts as an aggregation device for one or more mobile nodes where the primary port used is also a wireless connection.

According to another embodiment, the intelligent components may cooperate in providing network services such as routing, switching, and forwarding. The intelligent nodes may cooperate with the controller in establishing policy control such as stream bit rates, quality of service, traffic class, among others. In this embodiment, the intelligent mobile nodes and the intelligent access points operate in a distributed fashion to implement the policies of the controller. The controller cooperates with the mobile nodes to gather information regarding the dynamic requirements of the network and to process the policy requirements based on the immediate conditions of the network. The controller further communicates the computed information to the individual mobile nodes. Multiple mobile nodes may operate in an enforcement mode to ascertain that the overall network requirements are continually met without requiring the computational resources and other resources for the entire network. It is further advantageous in mitigating administrative communication overhead, as well as reducing the resource requirements of the intelligent controller in case of a deteriorated connection to the controller.

In one embodiment, subscribers, their applications, and the traffic associated with the combination may be classified in a dynamic elected class of service. The system may elect to subdivide or aggregate different classes of service as may be convenient to meet the intelligent command and control parameters selected by a given intelligent controller. Based on the information received from the intelligent controller, the intelligent access points or intelligent mobile nodes may adjust traffic types, priorities and other policies with the classes of service in order to be able to comply with the overall requirements of the network. The controller may elect to set or change in real-time the class of service of a given subscriber, his applications, or the combination of both. The intelligent components treat such parameters as volatile, and would incorporate the changes to its routing and other policies associated with the prescribed change in the classes of service in an expedient manner. It is further advantageous in compensating for unpredictable real-time behavior of the wireless network by alternating the class of service for downstream forwarding nodes to make up for inadequate performance of upstream forwarding nodes.

In one embodiment, groups of members may be dynamically formed to utilize a common characteristic channel. The group membership of a given set of intelligent nodes may be adjusted to further subdivide and dynamically alter the group members. An exemplary dynamic member set may first include a given set of mobile nodes. In a given exemplary mode of operation, these members may utilize a given channel for command and control, and utilize another given channel for the traffic data plane. In such an operational mode, if one mobile node needs to communicate with another mobile node the controller may be notified of the request on the command and control channel and based on one or more parameters the controller may elect to maintain the data plane group membership to the whole set of mobile nodes. Alternatively, the controller may elect that the subset of mobile groups requiring communication are temporarily segregated to form a separate subgroup with a different channel for both command and control as well as data plane or a combination of either. In such an exemplary scenario, the remaining nodes continue as member to the original group and are free to communicate without having knowledge, interference from or access to the information exchanged between the new subset of mobile nodes.

In one embodiment, the intelligent components may provide capacity aware routing. As new mobile nodes enter the network, the total capacity and performance requirements of the network change based on the additional requirements and resources of the entering node. In one embodiment, an ingress based policy control is supported. As new mobile nodes enter the range of an intelligent component they negotiate policy and physical characteristics parameters with the intelligent controller either directly or indirectly. The intelligent controller in return evaluates the new node's requirements, and provides the parameters that are least intrusive on existing smart intelligent devices. The new mobile node instead cooperates synergistically with the other intelligent components within the network. The controller continues to ascertain the requirements of the incoming node, establish its proper class of service and other traffic policy conditions and its impact on other components within the network by querying regularly from the new device.

In one embodiment, routing decisions may be made based on the current dynamic state of the network. This is especially advantageous in wireless networks since the wireless links by their very nature are time variant. If certain links become inoperable or the capacity partially deteriorates, the affected intelligent components provide this information to the intelligent controllers. The intelligent controllers re-adjust the parameters as required and provide alternate routing paths for the various intelligent components. Furthermore, the controller may elect to request inferior intelligent components to activate expanded functionality and initiate assisting their superior components. In such an embodiment, a mobile node may be selected to operate as an intelligent access point and aid in providing infrastructure support to the network.

In one embodiment, virtual routing is supported. The virtual routing capability provides for a mechanism where the packets received by the intelligent access point from the intelligent mobile nodes are aggregated at a selected intelligent node such as an intelligent controller, an intelligent access point or at a selected mobile node. The selected intelligent component then analyzes and selects the optimal routing path. The information is distributed to the required intelligent components and thereafter, the packets follow the optimal path from source to destination. These routes are virtually allocated such that the pathways can be dynamically reassigned. The reassignment of the virtual path make it feasible to be able to dynamically change the routing characteristics of the network in a convenient manner.

The intelligent controller may elect to support subscriber application based routing. In such an alternative embodiment, the intelligent components may cooperate with the intelligent controller to query the application type and other characteristics of the transaction. The controller may elect to have the intelligent components route the traffic based on the application information gathered.

In one embodiment, the intelligent access points and the intelligent mobile nodes may gather and analyze application data. In such an embodiment, the classification of traffic types with regard to specific subscriber applications is made. The traffic types per subscriber allow the subscriber to cooperate with the network to establish differential traffic policies for one or more subscriber applications. Thus, a given wireless mobile node is able to have a specific voice application treated with a specific policy, while another voice application from the same subscriber may be treated with a different traffic policy.

In one embodiment, multiple routing pathways from a given mobile node may be established with another node within the network. The intelligent components may elect to route the applications within a specific mobile node in a diversified manner, where a specific application from a originating/terminating node may be routed differently from a different application or from the same originating/terminating node. In one embodiment, the resilient adaptation mode is utilized to provide the diversified routing pathways for carrying one or more traffic types. In such an embodiment, multiple communications channels are utilized by an intelligent access point, or a mobile node, to provide diversified connectivity. If the number of available routes is inadequate for an exemplary embodiment, the intelligent controller may elect to utilize the resilient adaptation model and request the mobile nodes to operate as their superior counterparts, namely intelligent access points. Such an embodiment is advantageous as it provides greater routes for diversified routing. In one embodiment, a given voice application occupies a separate channel, while a different voice application occupies a different communications channel, while a data application occupies yet a third communication channel.

In one embodiment, a network may treat upstream routing traffic differently from the downstream routing traffic. Thus, as data is received from a mobile node, the upstream routing from the mobile node to the network can be rerouted over a given separate channel while the downstream routing from the network to the mobile node is routed on a different channel. In such an embodiment, the access point further functions as a switch. The access point is able to select specifically which of the available channels is utilized for routing traffic for a given subscriber and for a given traffic type. In one embodiment, the intelligent access point's selection criterion may be based on bit rate capacities of the given channels. In one embodiment, the intelligent access point has the capability of supporting multiple channels that can provide differing qualities of service.

In one embodiment, ingress based predicted routing capability may be implemented based on the combination of diversified routing and resilient adaptation network capabilities. In such an embodiment, the intelligent access points query certain mobile nodes in order to minimize latency and collision. Specifically, the controller may elect to have a given channel of the intelligent access point enforce an ingress based traffic policy control. In such an embodiment, the controller may elect to have specific mobile nodes to join the predictive channel based on the QoS requirements of the devices and the network wide capacity. Once the criteria is met, the controller selects the forwarding or routing policy and the information is distributed to the intelligent components within the network. In such an embodiment, the intelligent controller is able to predict the timing requirements of the authorized nodes based on the QoS requirements and the queried information from the nodes. The controller may elect to disallow a given mobile node due to violations of authorized traffic policy. Further, the controller may elect for a given intelligent component to participate in forwarding, routing, or relaying traffic within the predictive channel. However, it may not have the privileges to generate or terminate traffic to the predictive channel. In an alternative embodiment, a channel may be a virtual channel, rather than a physical separate channel. Thus the controller elects to enforce traffic policy by simply denying nodes that are not a member of the Ingress based predictive routing sub-network.

In one embodiment, dynamic security policies may be established based on individual communication pathway used for a given transaction. Accordingly, the existing frequency band is utilized in a much more conservative and predictable manner. In addition, multiple frequencies may be utilized to achieve better resource availability for one or more mobile devices. Furthermore, by using security characteristics based on the individual, communication pathways helps mitigate any security breaches as only a given communication pathway is compromised and the controller may update the security characteristics from time to time. The communication pathways provide a more resilient network and greater permutations for securing the transactions.

In one embodiment, an intelligent access point functionality can be derived by attaching an access point to a fixed personal computer such as a desktop computer or a workstation. One of the peripheral busses such as a universal serial bus (USB) or PCMCIA, etc., may be utilized for interconnecting the access point to the fixed PC. It is advantageous in that the fixed PC generally already had access to the wired network and the use of the access point enables it to serve as an intelligent component within the wireless network as well. In one embodiment, the fixed PC is configured to provide bridging services for mobile nodes to interconnect to the wired network, thereby reducing the need for installing dedicated standalone access points within the network. The fixed PC in cooperation with the access point can provide the functionality of an intelligent access point by utilizing the fixed pathways within the fixed PC to interconnect the mobile nodes to the local area network. Further, it is advantageous when the fixed connectivity pathway experiences degradation in service, the fixed PC utilizes the wireless pathway using the attached access point and gains access to the networking resources through the wireless network.

In one embodiment, virtual mobile nodes may be implemented, where an intelligent mobile node module can be attached to a fixed PC, rather than a mobile device such as a laptop, by utilizing one or more peripheral busses such as a USB or PCMCIA, etc.

In one embodiment, a local controller may cooperate with one or more additional controllers across the network. In one embodiment, the intelligent components connected within the network communicate with the local controller. The local controller in-turn communicates with other intelligent controller(s), to access a network wide-information database to provide a comprehensive network wide intelligent policy for command and control decisions. The local controller may elect to rely on one or more of one or more controllers to analyze and provide the required information for the intelligent components within its local scope. Alternatively the local controller may elect to simply utilize the information from other controllers to make a more intelligent local command and control decision.

In one embodiment, the local controller may maintain network wide parameter information within the local controller. In such an embodiment, if communication connectivity is lost between the local controller and other controllers, the local controller can approximate behavior of these controllers based on the previous information collected. The local controller is then able to utilize the approximated values to provide a best effort system wide approximation for the local intelligent components. Once the communication link with the inaccessible controller or controllers is re-established the local controller may then revert to a multiple controller model.

In one embodiment, the controllers may cooperate with other controllers in providing network services. The controllers may elect to cooperate in establishing policy controls such as stream bit rates, quality of service, and traffic class, among others. A highly scalable distributed network is provided, which is capable of enabling advanced services at a network wide scope while the policy enforcement takes place at a local scope.

In one embodiment, an intelligent controller that is logically co-located with other intelligent access points or intelligent mobile nodes is resident in a physically segregated network. Such a segregated network may be interconnected to the local intelligent components by utilizing a connection across the Internet or otherwise by utilizing a private connection. In an alternative embodiment, intelligent access points communicate with a controller that is resident at an offsite network. The controller queries the required intelligent components in order to make intelligent decision regarding one or more parameters, such as, frequency, power and service authorization. In an alternative embodiment, the required components receive command and control information from the offsite controller across the Internet in a secure fashion to be able to provide a coherent optimized wireless network. It is advantageous in that a single controller may be utilized in a remote fashion to control a wide span of optimized wireless networks. Furthermore, it is further advantageous in case of a failure of the local intelligent controller wherein the remote controller can cooperate with the local intelligent components to continue to provide optimized wireless services.

In one embodiment, one or more intelligent network controllers may interconnect and cooperate together to form a highly scalable wireless network. In one embodiment, the intelligent controllers can communicate with other intelligent controllers. The intelligent controllers can be either in a single co-located central facility, where multiple controllers can be required due to computational requirements of the network. Alternatively, the intelligent controllers may be located separately and interconnected over the Internet or over a private interconnection network. The controllers may either act as dedicated sub-network resources, or cooperate with each other and provide a network wide resource, or a combination of the two.

In one embodiment, one or more intelligent components cooperate to provide the virtual distributed controller functionality. In such an embodiment, the controller functionality is not centralized within a single chassis. Rather, the functionality is distributed amongst the intelligent access points or intelligent mobile nodes. In certain embodiments, a single intelligent component may be elected to provide the controller functionality for other intelligent components. In an alternative embodiment, each intelligent component may be elected to provide the controller functionality required for the benefit of downstream intelligent controllers, such as an access point providing the intelligent controller functionality to one or more downstream intelligent mobile nodes.

In a virtual distributed controller embodiment, the individual mobile nodes making a communication link analogous to an intelligent controller. However, the request is rather served by the elected virtual distributed controller rather than a single physical controller. The system may interpret the destination of a given controller based on the originating nodes identity. Thus, a given mobile node making a request to a controller would in fact be interpreted differently than a different mobile node making the same request. The virtual controller is composed of one or more intelligent components and thus a given request is processed by the appropriate virtual component.

In traditional networks, as new nodes enter the domain of the existing wireless network, they act as resource sinks in that they require network service resources from the existing wireless network such as routing, forwarding and management. The virtual distributed controller is advantageous in that the new nodes entering the wireless network domain also provide additional resources to the wireless network, such as computational resources and switching resources, and the ability to support network services such as routing, forwarding and management. The use of forwarding with quality and class of service policies further provides the network with additional routes to be able to provide the required service for the nodes within its domain. The virtual distributed controller functionality specifically deals with the distributing the management aspect of the wireless network.

In one embodiment, the mobile nodes have the capability to switching from one wireless channel to another wireless channel in a real-time manner based on one or more factors. Generally, the system controller may elect to use certain channels for certain types of transactions. Thus, voice traffic may receive a lower bandwidth channel with low interference, while data channels may be allocated on a higher bandwidth but worse interference characteristics. A channel may allocated based on the transaction in real-time. Thus, a controller may elect to allocate one channel for a given class of service for a given mobile node while allocating a different channel for a different class of service from the same given mobile node.

In one embodiment, the controller utilizes network transactions in optimizing the anticipated behavior of the network and to optimally select the switched real-time channel allocation behavior. The controller utilizes previous transactional history to aid in optimizing the anticipated behavior of the network.

In one embodiment, simultaneous real-time channel allocation may be supported. A given intelligent component may utilize one channel for one transaction, and as the need arises for another simultaneous transaction, the intelligent component may request the use of another channel from the intelligent controller. Based on the configuration of the intelligent controller and the service requirements of the intelligent component, the controller may elect to direct the intelligent component to use another channel simultaneously for the new transaction. Based on the channels available and other factors the intelligent component may further elect to use channels as the need arises.

In one embodiment, the intelligent access points and intelligent mobile nodes have capability of simultaneously establishing communications with other intelligent access points and other intelligent mobile nodes. These channels may be used by the intelligent controller as a general pool of network resources.

In certain embodiments, transactions are analyzed based on the requirements for service class, QoS, class of service, originating node, terminating node, etc., to classify the historical transactional state of the wireless network. In one embodiment, the resultant information is analyzed to provide a forecasted state of the network. In one embodiment, intelligent optimization is performed based on the forecasted state of the network rather than the immediate present state of the network. A transaction may be analyzed on a packet-by-packet basis. Alternatively, a set of packets related to a specific connection may be analyzed, such as a voice call, and treating it as a single transaction with a associated persistence.

In certain embodiments, non-active nodes cooperate with the intelligent components in accumulating transactional information regarding the network. It is advantageous in that the information may be collected by the intelligent components, such as intelligent mobile nodes, intelligent access points and intelligent controllers to identify and track down wireless nodes originating the transaction. Such an embodiment can further be utilized in tracking down rogue wireless nodes in a dynamic manner. Furthermore, accumulated physical characteristics data can be used to help triangulate the source of the transmitting station.

Exemplary Wireless Networks

Figure 1:
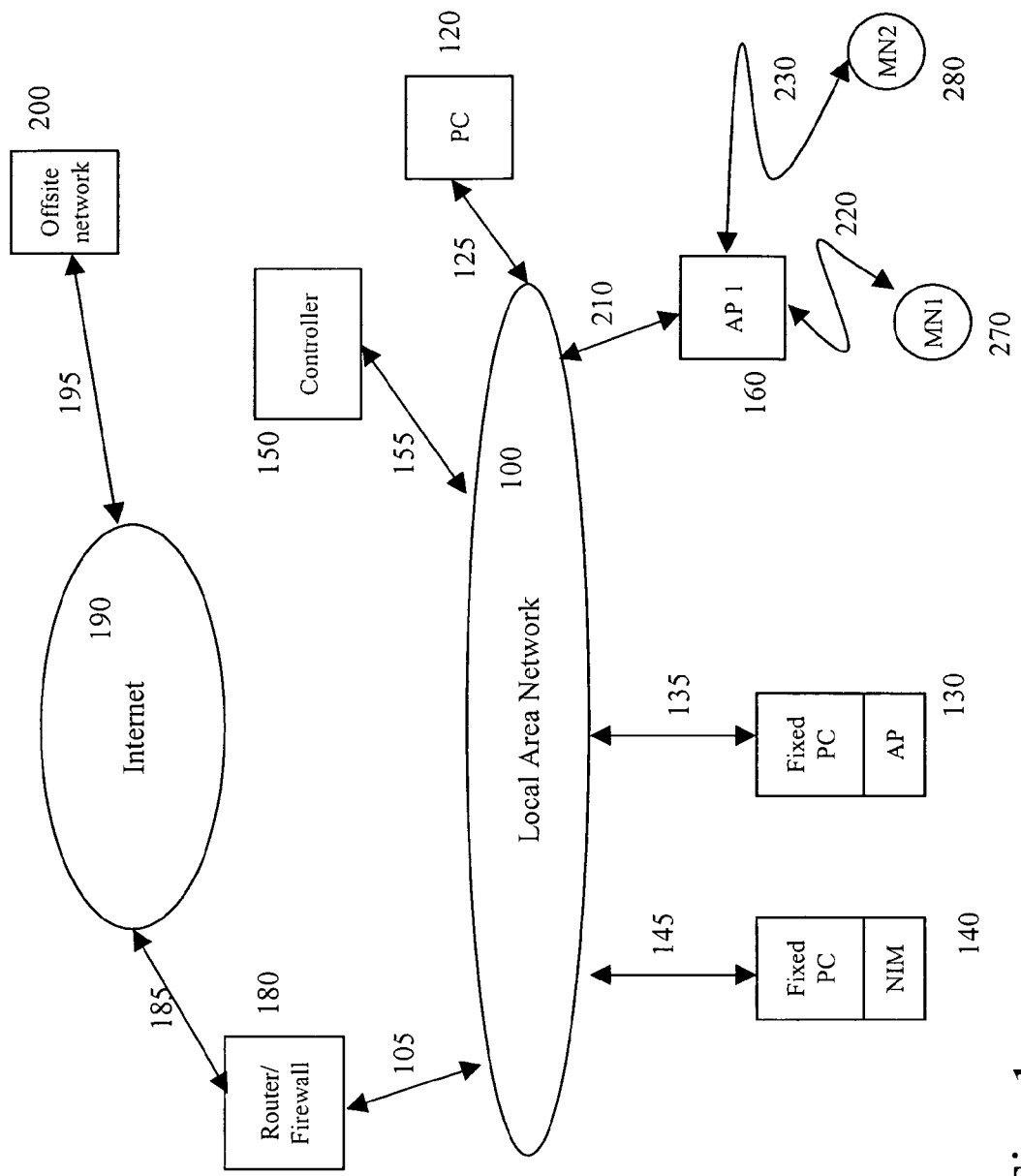
FIG. 1 is a diagram of an exemplary local area network (LAN) with a connection to the Internet according to one embodiment.

FIG. 1 is a block diagram illustrating an exemplary realtime scalable wireless switching network according to one embodiment of the present invention. As shown in FIG. 1, the exemplary system includes a number of components that are either physically co-located or physically segregated based upon a specific configuration. A typical network includes a central local area network (100) composed of the components. The local area network (LAN) (100) includes network components such as multiple fixed personal computers (140), multiple fixed personal computers with other peripherals attached (130), and a system router or firewall (180). The embodiment illustrated in FIG. 1 requires that the personal computer (120) and other components have the capability of accessing various other resources across the LAN 100. In certain exemplary networks some components require accessing offsite network components across a router or a firewall (180), across an Internet (190), to an offsite network (200). FIG. 1 further illustrates various roaming mobile nodes such as MN1 (270) and MN2 (280) within the exemplary network.

In one embodiment, multiple mobile nodes communicate with access point (160), which in turn, through either fixed pathways or wireless pathways (210), communicates to the local area network (100). In one embodiment, a wireless network interface module (NIM) (140) is added that allows a fixed personal computer to communicate within a wireless network. In addition, access point nodes can be added to a fixed personal computer (130), which forms a fixed PC access point that enables a fixed personal computer access point to operate in cooperation with a wireline network (135).

In one embodiment, a system controller (150) is connected to the network topology through pathway 155 to communicate with the mobile nodes MN1 (270), mobile node MN2 (280), intelligent access points AP1 (160), fixed personal computer with access point (130), fixed personal computer with NIM (140) and other components within the wireless network and the LAN (100). One or more of these components may communicate with the controller and the controller may query the required components to make intelligent decision regarding one or more parameters such as, frequency, power, and service authorization, among others.

Further, the controller can reside at an offsite network (100) across the Internet (190). In an alternative embodiment, the intelligent access point 160 communicates with the controller that is resident at an offsite network 200. The offsite alternative controller queries the required components (270, 280, 160, 130, and 140) to make intelligent decisions regarding the parameters such as, frequency, power and service authorization. In such an alternative embodiment of FIG. 1, the required components receive command and control information from the offsite controller across the Internet (190) in a secure fashion to provide a coherent optimized wireless network.

FIG. 1 further illustrates the ability to segregate the control plane and the data plane. In one embodiment, a mechanism is provided for segregating a control and command plane from the actual traffic plane within the scalable wireless network. In an embodiment, the access points AP1 (160), Fixed PC AP (130) may cooperate with the network interface modules MN1 (270), Fixed PC NIM (140) and MN2 (280) within the wireless network to accumulate and analyze data and traffic patterns and assemble this information on behalf of the controller (150). The controller (150) may query the required components (270, 280, 160, 130, 140) to make intelligent decisions regarding one or more parameters such as, frequency, power, and service authorization, among others. In such an alternative embodiment, the queried components would be requested to accumulate and analyze such data and then be requested to forward either the raw data, the results, or both to a requesting controller. The controller may be either collocated with the queried components, or it may be physically segregated from them. The queried information may then be utilized by the controller in making intelligent decisions regarding parameters such as frequencies, power and the other characteristics of the wireless network. Such an embodiment is advantageous in that the scalable wireless switching network is able to provide optimized network wide policy management and further provide advanced services with superior quality and class of service.

The advantageous nature of command and data plane segregation of embodiments of the present invention is evident when analyzing the behavior of the network during a forwarding operation. If mobile node MN1 (270) is requesting that information be transferred to mobile node MN2 (280) and the intelligent access point AP1 (160) would be required to forward the packet from MN1 to MN2. In a converged control and data plane scenario once the AP initiates the transfer of the information from MN1 to MN2, any additional mobile nodes within the range of AP1 are effectively stalled. If one of the other mobile nodes has higher priority information to be forwarded to MN2 it has no way of communicating this requirement to the access point. In a multi-channel embodiment, the mobile node with a higher priority transaction makes a request with the intelligent access point over the control and command channel. Once the request is received by the intelligent access point AP1 (160) it can interrogate the state of the present transfer and make an intelligent decision regarding if the present transaction needs to be terminated, or if it should be completed before initiating the new higher priority traffic. Traditional approaches rely on the IP header of a given packet to communicate the characteristics of the packet to be transferred. Unfortunately such an approach can only operate in a present state. In one embodiment, a command and control plane is utilized to communicate information with forwarding nodes regarding the state of the queues of packets that have not been received by the forwarding nodes yet. The forwarding nodes are able to utilize anticipated demands from the plurality of mobile nodes to ascertain that the required performance of the network will be met. In general, the command and control plane focus on transactions related to the management and control of the network, such as sharing routing information, traffic classification, scheduling, buffer management, signaling, admission control, service level agreements, provisioning and traffic engineering. The data traffic plane in comparison focus on transactions related to the forwarding of the actual packets from one node to another.

The exemplary network of FIG. 1 further illustrates the topology wherein parameter values provided to the access point (160) and the network interface modules within the mobile nodes MN1 (270) and MN2 (280) may be stored centrally within a system controller (150). In an alternative embodiment the parameter values may be provided to the intelligent devices such as the access point (160) or the mobile nodes MN1 (270) or MN2 (280) for local storage. An embodiment of the present invention further incorporates the ways for the controller (150) to store and maintain the parameters in a distributed manner within the intelligent components to minimize command and control traffic from the intelligent components for subsequent cycles.

In one embodiment, multiple links can be established between an access point (160) and a given mobile node MN1 (270). The multi-link connectivity is used to segregate the control plane from the traffic data plane. In such an embodiment, the system transmits the command and control information on one given link, namely channel 1, while the data from the mobile node can be transmitted on a separate link, namely channel 2. The intelligent access point (160) further has the capability for utilizing yet another link, namely channel 3, for transmitting additional data traffic. In such an exemplary network, the intelligent access point has the simultaneous use of three channels namely channel 1, channel 2, and channel 3.

FIG. 1 illustrates an exemplary network with connectivity for the network controller to poll the access point (160) or the mobile nodes MN1 (270) or MN2 (280) for local information on a recurring basis. In one embodiment, the network controller utilizes the queried information to implement a local adaptation model (LAM) to make intelligent policy decisions based on either a packet by packet basis or with finer or with courser granularity. The LAM provides the ways for the controller (150) to maintain a network wide scope and distribute the parameter policy information to the respective intelligent components.

Furthermore, from the perspective of an intelligent component that has lost connectivity to the controller (150), a mechanism is provided for the component to detect the connectivity loss and to begin operating independently and provide a seamless operating environment. Once the connectivity is re-established, the intelligent component (160, 270, or 280) reverts to cooperating with the controller to provide a network wide LAM.

FIG. 1 further illustrates an embodiment to support the multiple controller model according to one embodiment of the present invention. The intelligent controller (150) may cooperate with other controllers that may reside across the LAN (100). In one embodiment, certain subsets of the intelligent components connected within the wireless network communicate with the local controller. The local controller in-turn communicates one or more controllers to access the information for a more comprehensive network wide intelligent policy command and control decision.

The exemplary network of FIG. 1 illustrates the topology where the intelligent controller (150) may elect to operate the mobile node NIM (140) in a resilient adaptation model (RAM). In such an exemplary mode, the network interface module (NIM) (140) attached to the fixed PC receives a communication from the intelligent controller (150), through the LAN (100), through the communication link (145) to operate in the RAM mode. In one embodiment, a network interface module (NIM) has the ability of providing routing and forwarding services on behalf of its superior component such as an intelligent access point. The NIM further has the capability to take over the functionality of the intelligent access point, such as AP1 (160) when so required by the local controller (150). Such an embodiment is advantageous in that it provides an alternative way for providing network services in case of temporary or permanent service outages.

In one embodiment, the local controller may elect to request a given NIM (140) to operate in the RAN mode while electing to request other mobile nodes MN1 (270) and MN2 (280) to operate in traditional intelligent mobile node modes. One exemplary advantage to operate in such a mode is to provide temporary local routing ways for communication to or from mobile nodes that have limited range.

In one embodiment, the capability of virtual routing is supported. Routes from source to destination are virtually allocated such that the pathways can be dynamically changed in an easy manner. The intelligent components, such as mobile nodes and intelligent access points are organized in a table that supports at least a single level of indirection. Thus the address resolved by the incoming value for a given packet, simply fetches another new virtual final value. The first virtual value represents a source and destination packet wherein the value can be expediently changed by updating the new data value at the "address" of the indirect memory location. The value at the indirection location represents a path wherein the value may be used in identifying which route the packet must take. The reassignment of the virtual path makes it feasible to dynamically change the routing characteristics of the network in a convenient manner. In one embodiment, the intelligent controller assigns unique route numbers to the alternative routes for a given source and destination pair. These routes are broadcast with the packet or alternatively on a fixed scheduled manner to expediently broadcast the selected dynamic packet route.

In one embodiment, the communication paths 220 and 230 are alternate pathways and serve as the multi-path mechanism of the invention. Communication pathway 230 is established on a given channel or frequency while a different channel or frequency is utilized for communication pathway 220. In such an embodiment, the multiple communication pathways provide the ways for the network to use one of the communication pathways as the primary communications channel, while using the other communication pathways as the secondary communications channel. The network uses either the primary or the secondary communication pathways interchangeably. In one embodiment, the intelligent access point may alternate between using communication path 220 and 230 from time to time.

In reference to FIG. 1, the LAN (100) includes Internet appliances, network servers, and personal computers (120), which interact with each other utilizing the interconnections of the LAN (100). The personal computer (120) in FIG. 1 represents the such network devices within a typical local area network (100). Personal computer (120) interconnects to the LAN (100) through a physical pathway 125 typically either a gigabit Ethernet or 100-base Ethernet in traditional wired networks.

In one embodiment, an access point is attached to a fixed PC (130) by utilizing a bus such as a Universal Serial Bus PCMCIA, for example. In one embodiment, the fixed PC (130) is able to access both the wired network, as well as the wireless network. The fixed PC (130) is configured to provide bridging services for mobile nodes to interconnect to the wired network, thus reducing the need for installing dedicated access points within the network.

In one embodiment, an intelligent mobile node module is attached to a fixed PC (140) by utilizing one of a peripheral bus such as a Universal Serial Bus or PCMCIA, for example.

FIG. 1 further illustrates the connectivity of the LAN (100) to the Internet community and the use of a router or firewall mechanism (180) for providing various security and network services. In one embodiment, a mechanism is provided for an offsite network (200) to be interconnected to the LAN (100) through the interconnection pathway (195), through the interconnection pathway (185), through the router and firewall (180), and finally through the interconnection pathway (105).

In an alternative embodiment, an intelligent controller (150) is connected to the local area network (100) through an interconnection pathway 155. The intelligent controller (150) may be either physically co-located with the local area network (100) or it may be located within the offsite network (200). The intelligent controller (150) provides the ways for optimizing wireless network parameters attached to the LAN (100) while the intelligent controller (150) is located within an offsite network (200). In one embodiment, a mechanism is provided to select the update rate for parameters and the traffic update report consistent with the available bandwidth. The exemplary network of FIG. 1 illustrates the interconnection of the multiple intelligent controllers. The intelligent controller (150) cooperates together other intelligent controllers that may be interconnected to the intelligent controller either at the local area network or else across the Internet (190) at an offsite network (200) through the interconnection pathway (195).

Figure 2:
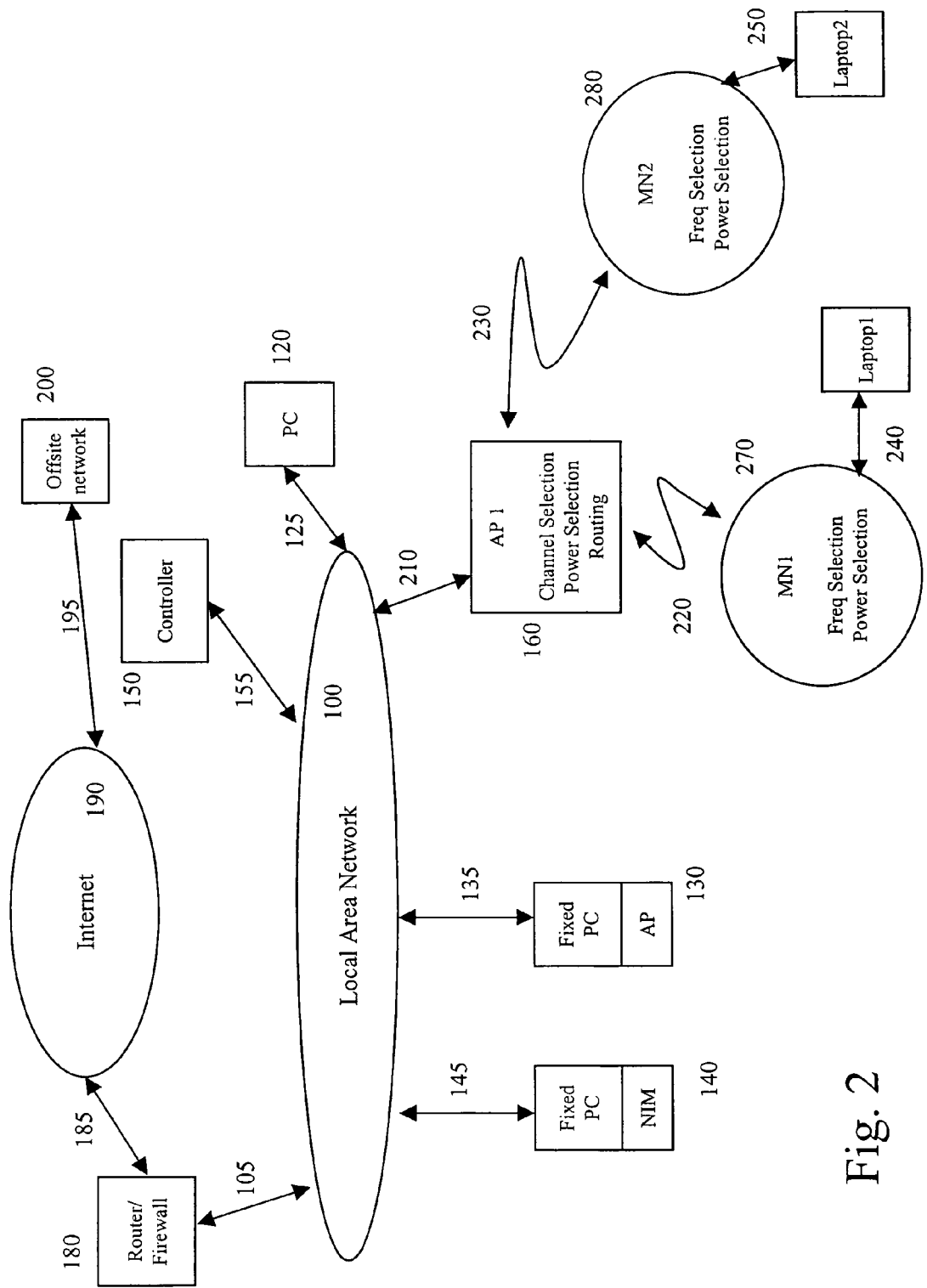
FIG. 2 is a diagram of an exemplary a local area network (LAN) connected to the Internet according to an alternative embodiment.

FIG. 2 illustrates a typical LAN (100) connected to the Internet (190). FIG. 2 provides further details illustrating the wireless access point AP1 (160) and mobile nodes MN 1 (270) and MN 2 (280) and some of the functionality of these components. In one embodiment, the LAN and the wireless network of FIG. 2 are to interconnect the fixed PCs (120) and the mobile nodes (270 and 280) to each other, to the network resources such as printers and servers and to the Internet (190). The interconnection is generally provided using routers and firewalls (180) to provide security and other network services and to provide a way to provide access to an offsite network (200) across the Internet (190).

In one embodiment, FIG. 2 outlines a wireless network composed of intelligent access point AP1 (160) and mobile nodes MN1 (270) and MN2 (280). FIG. 2 illustrates some of the additional functionality of the scalable wireless switching network.

In one embodiment, MN2 280 is a mobile network interface module node includes a network interface module that is installed in a mobile device such as a laptop (250) and is interconnected to the laptop through a peripheral bus such as a PCMCIA interface.

In one embodiment, a request made by the user at laptop 2 (250) will be provided to mobile node MN2 (280). MN2 (280) in-turn would need to request access to network resources by forwarding a request to the wireless access point AP1 (160) for access to the wireless network. In order to provide a highly reliable and a multi-service network, access to the LAN (100), wireless network link (230), and other network resources must be available in a predictable manner. In the case where mobile node MN2 (280) has to negotiate across link 230 to reach access point AP1 (160) to request use of the wireless link 230 resources, the arbitration of the link 230 becomes a critical factor. In a traditional wireless network, this is sometimes done using a carrier sense multiple access with collision avoidance mechanism (CSMA/CA). Unfortunately, such a mechanism is disadvantaged in that the mobile node making such a request is unaware of the network wide quality of service requirements and may arbitrarily capture the wireless link 230 away from higher priority traffic. Such a condition would cause a delay in releasing the bus back to the higher priority mobile node and subsequently the high QoS performance would deteriorate.

In one embodiment, a mechanism is provided for reducing the impact of such a bus arbitration request by providing selectable physical parameters such as frequency selection, band selection, and/or power selection. In a further embodiment, a mechanism is provided for command and control segregation from data traffic segregation.

At times when service is required by MN2, according to one embodiment, generally MN2 is aware of its own QoS requirements of the service being requested. By utilizing an appropriate selection from the physical characteristics such as frequency selection, bandwidth selection, band selection and power selection, MN2 has a better perspective to negotiate a request. In one embodiment, intelligent nodes utilize one or more channels to communicate with the access point AP1 (160) and request access to the LAN (100). The intelligent access point interprets the request for media access into a class of service category. The innovative methodology within embodiments of the present invention utilizes real-time information to optimize the request for media access. The real-time media access methodology is advantageous in its characteristic that only lower or equivalent classes of service are affected by the media access request, while the higher classes of service being served by the intelligent access point remain unaffected.

In one embodiment, the classes of service access can be segregated based on packet traffic types. Alternatively, the classes of service access can be segregated based on bandwidth requirements. Furthermore, the intelligent mobile node shadows the access point AP1 (160) and monitors the media grants to other mobile nodes within the network. In a particular embodiment, the intelligent mobile node maintains a table of traffic types and classes of service. The intelligent mobile node inspects such a table and can more intelligently determine what access policy to utilize to gain access to the wireless network. In general, MN2 (280) utilizes dynamic and changing network conditions to request access to the network with awareness of class and quality of service of existing traffic.

The intelligent mobile node 2 MN2 (280) establishes a control link with the access point AP1 (160) to request communication services. Once the access point AP1 (160) has received the request from MN2, the access point inspects the current condition of the network and may elect to ask MN2 to delay the request for a specific period of time. Once the intelligent mobile node 2 MN2 (280) is granted access to the wireless network, the originating laptop 2 is informed. In one embodiment laptop 2 completes establishing the communication link, and information begins to flow across the PCMCIA interface (250) of laptop 2, into intelligent mobile node MN2 (280) and into the access point AP1 (160). Furthermore, AP1(160) forwards the information to the local area network (100).

In certain embodiments, the network incorporates the communication information to go across routers and switches which route the information as required to reach the termination nodes such as computers PC (120) interconnected to the LAN (100), fixed PC (135) or the fixed PCs with NIM (140) and (130) respectively. The exemplary network of FIG. 2 outlines a topology wherein multiple mobile node parameters are optimized to apply the required quality and class of service.

The intelligent access point AP1 (160) communicates with a multiple mobile nodes to provide network based resources, such as routing, switching, virtual private networking, among others. In one embodiment, the intelligent access point AP1 (160) provides the service independently or by utilizing other resources cross the LAN (100). The mobile nodes MN1 (270) and MN2 (280) provide a simple bridging functionality between the laptop nodes laptop1 and laptop2 to the intelligent access point AP1 (160).

The intelligent mobile nodes have the scope of requirements for their own services, namely the quality and class of service requirements certain application requested by the laptop or network appliance attached to the given mobile node. The mobile nodes primarily pass through information from one port to another, such as the PCMCIA interface (250) to the wireless link (230). The intelligent access points further have the scope of requirements for a multiple mobile nodes. The intelligent access point functionality provides the forwarding and routing service as well, but additionally provides policy control to implement and to enforce subscription level agreements. Furthermore the intelligent access points have the capability to differentiate between multiple traffic sources and provide the functionality on the appropriate basis. In one embodiment, the intelligent access point provides aggregation functionality in addition to controlling the parameters of the communication media. The intelligent access point is to control the method of communication between the mobile nodes and the LAN (100) or to other mobile nodes.

FIG. 2 further illustrates the topology wherein the intelligent access point AP1 (160) may direct intelligent mobile nodes to communicate in an ad-hoc mode on a permanent, temporary, or on a transactional basis. In one embodiment, the intelligent access point AP1 (160) directs mobile node MN2 (280) to directly communicate information with mobile node MN1 (270) based on a class of service, among others.

According to one embodiment, the operations of the intelligent access point (AP1) include multiple operational modes. The intelligent access points may be configured to operate in either an infrastructure mode, in an ad-hoc mode, or on a semi-hoc mode. The selection of the operational modes can be elected by the intelligent controller based on one or more network wide conditions such as traffic classes of the egress or ingress traffic to the intelligent access point, traffic type such as voice or video traffic, traffic congestion at AP1, total ingress or egress traffic requirements at the intelligent access point (AP1), among others. In such an exemplary network, if two mobile nodes require communication with each other and are within each other's range of operation, the semi-hoc model provides the ways to establishment the connectivity between the mobile nodes on a ad-hoc basis. Furthermore, when these mobile nodes are no longer within each other's range of communication, the semi-hoc model provides a seamless transition to an infrastructure mode of operation. During a semi-hoc model of operation, a given mobile node can be simultaneously operating in an ad-hoc fashion with a given mobile node while operating in an infrastructure fashion with another mobile node. FIG. 2 further provides the capability where multiple mobile nodes cooperate to provide dynamic service between mobile nodes on a connection basis.

In one embodiment, the intelligent mobile nodes and the intelligent access points provide semi-hoc service based on the parameters, such as traffic class, illustratively voice calls, video conferencing, or any other class of service. In one embodiment, intelligent access point AP1 (160) may receive a request from intelligent mobile node MN2 (280) that the laptop2 requires communication with laptop 1. In such a scenario, AP 1(160) may direct intelligent mobile node MN1 (170) to switch over to a given channel and allocate the resources for MN1 to directly communicate with MN2. The segregated control plane mechanism allows connection commands to be originated by either the local intelligent access point or by the intelligent controller within the network. In such an illustrative scenario, the service connection itself will then take place over the wireless interface directly rather than going through the local area network or the intelligent access point.

Exemplary Access Point

Figure 3A:
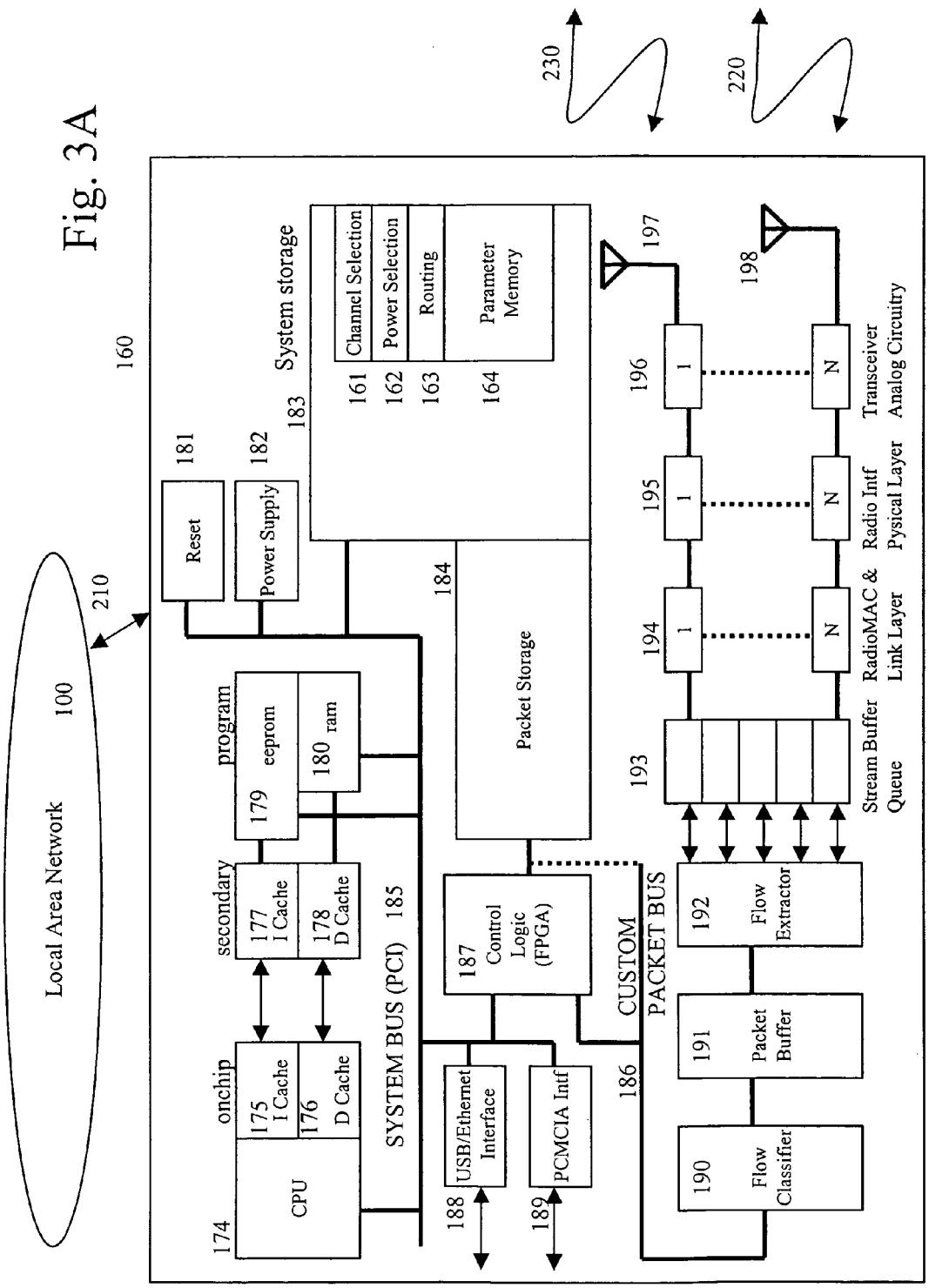
FIG. 3A illustrates an exemplary wireless access point (AP).

FIG. 3A is a block diagram illustrating an exemplary intelligent access point AP1 (160) according to one embodiment. Referring to FIG. 3A, specific information and parameters are stored locally within the intelligent access point. The exemplary network of FIG. 3A outlines some of the usages of both network service awareness, such as routing (163), and of physical awareness, such as channel selection (161) and power selection (162) for intelligent network management. More generally, the intelligent access point AP1 may store, maintain and collect network related information from either the interconnected devices, and/or from traffic carried by the intelligent access point (AP1). In one embodiment, the intelligent access point AP (160) may store the required parameters locally within parameter memory (164). The parameter memory uses semiconductor memory such as volatile, non-volatile, or cached memory, such as static random access memory (SRAM), dynamic random access memory (DRAM), read only memory (ROM), flash memory, among other, or a combination of these. Alternatively, the parameter memory may use file memory such as disk storage or flash drives among others. The intelligent access point AP1 (160) retrieves the network and physical parameters from the parameter memory (164) upon power-up or a reset condition and may initiate operation in a default mode. Alternatively, the intelligent access point AP1 (160) may request the parameters be updated from an intelligent controller (150) across the LAN or from an intelligent controller from an offsite network (200) across the Internet (190) and through the LAN (100).

The intelligent access point AP1 includes modules for the control and operation of the unit including the CPU (174), the on-chip ICache (175), the on-chip DCache (176), the secondary ICache (177), the secondary DCache (178), the program EEPROM (179), the program RAM (180), the reset module (181) and the power supply module (182). AP1 (160) further includes of wired networking interface modules USB/Ethernet Interface (188) and PCMCIA Interface (189). AP1 (160) further includes of storage modules for packet storage (184) and system storage (183) that further include storage for channel selection (161), power selection (162), routing (163) and parameter memory (164). The interconnection of the control and operation modules, the wired networking interface modules, and the storage modules occurs across a system bus such as the PCI interface of the access point AP1. The system bus is further connected to the control logic field programmable gate array (FPGA) (187). The control logic FPGA is in-turn connected to a custom packet bus used for interconnecting the storage modules and the packet processing modules within the access point AP1. The packet processing modules include the flow classifier (190), the packet buffer (191), the flow extracter (192), multiple stream buffer queues (193), multiple radio MAC & link layers (194), multiple radio interface physical layers (195), multiple transceiver analog circuitry, and multiple antennas (197, 198). The signals from the access point AP1 (160) are transmitted across wireless links 220 and 230 using one or more wireless transmission and reception protocols such as WiFi, WiMax, 3G cellular, among others.

The operation of the access point AP1 (160) is controlled by the central processing unit, CPU (174). AP1 has a power supply module that is responsible to deliver the required voltages and power sequencing to the module within AP1 (160). Upon powering up or upon software reset the reset module (181) initiates a reset sequence to bring the AP1 into a known state. The CPU (174) cooperates with the reset module (181) to initiate a sequence of commands to bring the access point AP1 (160) into a known state. The CPU further comprises of on-chip instruction cache (ICache) (175) and on-chip data cache (DCache) (176). The on-chip instruction and data cache are present within the CPU to help improve the timing delay in fetching data from the storage modules such as the program EEPROM (179), program RAM (180), packet storage (184), and system storage (183). The access point AP1 (160) further comprises of a off-chip secondary instruction cache, secondary ICache (177), and off-chip secondary data cache, secondary DCache (178). The secondary cache modules 177 and 178 further cooperate with the on-chip ICache (175) and onchip DCache (176) in improving instruction and data fetch performance of the CPU (174).

The intelligent access point AP1 (160) further comprises of network interfacing modules USB/Ethernet interface (188) and PCMCIA interface. The networking interfacing modules enable the access point to interconnect within a LAN (100) via wired networking pathway 210. In one embodiment, the access point may interconnect with a LAN (100) using Ethernet interfacing. In such a configuration, the access point interconnect with routers, switches, and hubs that comprise the LAN to get access to additional resources within the LAN such as other computers, printers, and servers. Once a mobile node interconnects to the access point AP1 via wireless pathways 230 and 220, these mobile nodes can further have access to the plurality of network resources interconnected to the access point AP1.

The packet processing modules cooperate with the CPU (174) across the control logic FPGA (187) in processing the priority and performance of the communication across the wireless pathways 230 and 220. The operation of the packet processing module is understood when following the flow of a packet that is received from one wireless interface for example 230 and then processed and forwarded to another wireless link 220. In such an exemplary transaction, the incoming signal is received at the antenna 197 and the signal is forwarded to the transceiver analog circuitry (196). The transceiver analog circuitry includes one or more components to process the signal so that it is capable of interfacing to the radio interface physical layer (195). The function of the radio interface physical layer is to synchronize and frame up to the incoming signal so that the information can be formatted in a manner to interface to the radio MAC and link layer (194). The radio MAC and link layer is primarily responsible to format and extract the information so that the resulting information is transparently forwarded to the stream buffer queue module (193) without regard to the details of the physical radio mechanisms used. In an exemplary embodiment of the present invention the Internet protocol (IP) is used to provide a standardized interfacing mechanism between the radio MAC and link layer (194) and stream buffer queue. Other mechanisms such as ATM or frame relay can also be utilized for such standardized interfacing. Once the information is queued within the stream buffer queue (193) CPU is notified through the use of the custom packet bus (186) and the control logic FPGA (187). The CPU interrogates the system storage to compute the action regarding the received packet by use of the channel selection (161), power selection (162), routing (163), and parameter memory (164). Once the CPU has determined the course of the action as agreed upon with the intelligent controller, the CPU informs the flow extraction module 192. The flow extraction module forward the information and the queue over to the packet buffer 191 based on the required action. The flow extractor module further has the ways to bypass the packet buffer (191) and directly reschedule the packet to be retransmitted using the radio MAC and link layer. This is especially advantageous where cut-through forwarding is requested by the intelligent controller. The flow extractor is able to initiate the forwarding action without the need for waiting to complete the reception of initial packet. Based on the radio protocol implemented within the radio MAC and link layers (194) and the radio interface physical layers (195), the flow extraction module cooperates with the CPU to minimize the latency between receiving the packet and forwarding the received packet.

Alternatively, the flow extractor module may elect to forward the packet to the packet buffer (191) wherein the packet may be temporarily stored for later forwarding scheduling. The packet buffer (191) cooperates with the flow classifier module (190) to organize and schedule the interrogation of the newly received packet in cooperation of the requirements of the pool of packets within the packet buffer. The flow classifier and the CPU cooperate to help schedule the packet inspection and transmission and inform the flow extractor to schedule as required by the quality of service (QOS) and other traffic related requirements requested by the controller.

In another exemplary packet flow, the packet may be designated for transmission utilizing the Ethernet interface (188). In such an embodiment, the packet would be classified by the flow classifier (190) and buffered at the packet buffer (191) and would be forwarded by the flow extractor (192) through the control logic FPGA (187) to the Ethernet interface (188). In general, the packet processing modules cooperate with the CPU and the intelligent controller through the use of the parameter memory (164) and the plurality of selection cretiria for routing, channel selection and power selection in providing network services.

The intelligent access point AP1 (160) provides network services for the intelligent mobile nodes such as routing, bridging, aggregating, forwarding, and virtual LAN, among others. Furthermore, the exemplary network of FIG. 3A illustrates the local parameter storage of the physical and network parameter at the intelligent access point AP1. The parameters stored within the parameter memory include parameters with local scope as well as network wide scope based on the configuration of the network, the network controller, the access points, and the mobile nodes. One of the advantages of the local storage is that the intelligent access point can make decisions regarding local parameters even in absence of a connection to the network. Furthermore, the effect of these changes takes place more efficiently as it is not subject to any further delays within the local area network. In an exemplary network with an intelligent controller (150) that is offsite this advantage is further highlighted, as the delays associated across the Internet can be even more significant. Such an embodiment is further advantageous in that local intercommunication can continue even in case of a complete failure to the intelligent controller. Once network connectivity is re-established, the intelligent access point AP1 (160) re-establishes contact with the intelligent controller, and any accumulated data, statistics, and other information is communicated between the intelligent controller (150) and the intelligent access point AP1 (160). Subsequently, the intelligent access point is again able to provide optimized service for the mobile nodes with a network wide scope, rather than just with a local scope.

In one embodiment, the intelligent components are interconnected in a hierarchical manner, where operation of the intelligent mobile nodes can continue even in case of a loss of communication across the primary communication channel. The storage of local physical and network parameters within the parameter memory (164) of the intelligent access point AP1 (160), coupled with the cooperation from the intelligent mobile nodes the present invention provides a more scalable, resilient and robust wireless network.

Exemplary Mobile Nodes

FIG. 3B is a block diagram illustrating an exemplary mobile node according to one embodiment. Referring to FIG. 3B, specific information and parameters are stored locally within the intelligent mobile node. The intelligent mobile MN1 (270) may store, maintain and collect network related information from either the interconnected devices, and/or from traffic carried by the intelligent mobile node MN1 (270). The intelligent mobile node MN1 (270) may store the required parameters locally within parameter memory (274). The parameter memory may use semiconductor memory or file memory, among others, as outlined in FIG. 3A above. The intelligent mobile node MN1 (270) retrieves the network and physical parameters from the parameter memory (274) upon power-up or a reset condition and may initiate operation in a default mode. Alternatively, the intelligent mobile node MN1 (270) may request the parameters be updated from an intelligent access point AP1 (160), intelligent controller (150) across the LAN or from an intelligent controller from an offsite network (200) across the Internet (190) and through the LAN (100).

FIG. 3A and FIG. 3B, the difference in the exemplary architecture of the mobile node MN1 from that of the intelligent access point AP1 is that the mobile node MN1 does not require a dedicate CPU and the related modules. The mobile node MN1 (270) relies on the host computer's CPU to carry out the required processing by installing a small sequence of commands within the host computer's storage referred to as a device driver code.

Referring to FIG. 3B, intelligent mobile node MN1 includes multiple modules for the control and operation of the unit including the reset module (181) and the power supply module (199). MN1 (270) further includes wired networking interface modules USB/Ethernet Interface (188) and PCM-CIA Interface (189). MN1 (270) further includes of storage modules for packet storage (184) and system storage (183) that further include storage for channel selection (271), power selection (272), and parameter memory (274). The interconnection of the control and operation modules, the wired networking interface modules, and the storage modules occurs across a system bus such as the PCI interface of the mobile node MN1 (270). The system bus is further connected to the control logic FPGA (187). The control logic FPGA is in-turn connected to a custom packet bus used for interconnecting the storage modules and the packet processing modules within the mobile node MN1. The packet processing modules include of the flow classifier (190), the packet buffer (191), the flow extractor (192), the stream buffer queues (193), the radio MAC & link layers (194), a radio interface physical layers (195), the transceiver analog circuitry, and the antennas (197, 198). The plurality of signals from the mobile node MN1 (270) are transmitted across the wireless link 220 using one or more wireless transmission and reception protocols such as WiFi, WiMax, 3G cellular, among others.

The operation of the mobile node MN1 (270) is controlled by the host computer across the peripheral interface such as the PCMCIA interface (189), or the USB interface (188) across the wired interface 240. In one embodiment of the invention, the mobile node MN1 is a small plug in adapter card that can be installed in the PCMCIA slot within a laptop computer. MN1 has a power supply module that is responsible to deliver the required voltages and power sequencing to one or more modules within the MN1 (270). Upon powering up, upon software or hardware reset from the host computer the reset module (181) initiates a reset sequence to bring the MN1 into a known initial state. The host computer cooperates with the reset module (181) to initiate a sequence of commands to bring the mobile node MN1(270) into a known state. The mobile node further has a programmable sequence of commands in the form of a device driver that are resident within the host computers' storage memory such as RAM or file storage memory such as an IDE hard drive. This sequence of control code is executed by the host computer to cooperate with the modules within the mobile node MN1 (270) to control the operation of the modules within MN1.

The packet processing modules within the mobile node MN1 (270) cooperate with the host computer across the control logic FPGA (187) in processing the priority and performance of the communication across the wireless pathway 220. The operation of the packet processing module is understood when following the flow of a packet that is received from one wireless interface for example one mobile node at the wireless link 220 and then processed and forwarded to another mobile node across the wireless link 220. In such an exemplary transaction, the incoming signal is received at the antenna 197 and the signal is forwarded to the transceiver analog circuitry (196). The transceiver analog circuitry includes one or more components to process the signal so that it is capable of interfacing to the radio interface physical layer (195). The function of the radio interface physical layer is to synchronize and frame up to the incoming signal so that the information can be formatted in a manner to interface to the radio MAC and link layer (194). The radio MAC and link layer is responsible to format and extract the information so that the resulting information is transparently forwarded to the stream buffer queue module (193) without regard to the details of the physical radio mechanisms used. In one embodiment, Internet protocol (IP) is used to provide a standardized interfacing mechanism between the radio MAC and link layer (194) and stream buffer queue. Other mechanisms such as ATM or frame relay can also be utilized for such standardized interfacing. Once the information is queued within the stream buffer queue (193), the host computer's device driver code is notified through the use of the custom packet bus (186), the control logic FPGA (187) and the PCM-CIA interface module (189). The host computer's device driver code may interrogates the system storage to compute the action regarding the received packet by use of the channel selection (161), power selection (162), routing (163), and parameter memory (164). Once the host computers device driver code has determined the course of the action as agreed upon with the intelligent controller, the host computer informs the flow extraction module 192. The flow extraction module forwards the information and the queue over to the packet buffer 191 based on the required action. The flow extractor module further has the ways to bypass the packet buffer (191) and directly reschedule the packet to be retransmitted using the radio MAC and link layer. This is especially advantageous within the present invention where cut-through forwarding is requested by the intelligent controller. The flow extractor further has the ways to be able to initiate the forwarding action without the need for waiting to complete the reception of initial packets. Based on the radio protocol implemented within the radio MAC and link layers (194) and the radio interface physical layers (195), the flow extraction module cooperates with the host computers device driver code to minimize the latency between receiving the packet and forwarding the received packet.

Alternatively, the flow extractor module may elect to forward the packet to the packet buffer (191) wherein the packet may be temporarily stored for later forwarding scheduling. The packet buffer (191) cooperates with the flow classifier module (190) to organize and schedule the interrogation of the newly received packet in cooperation of the requirements of the pool of packets within the packet buffer. The flow classifier and the host computer's device driver code cooperate to help schedule the packet inspection and transmission and inform the flow extractor to schedule as required by the QOS and other traffic related requirements requested by the controller.

In another exemplary packet flow, the packet may be designated for transmission utilizing the USB interface (188). In such an embodiment, the packet would be classified by the flow classifier (190) and buffered at the packet buffer (191) and would be forwarded by the flow extractor (192) through the control logic FPGA (187) to the Ethernet interface (188). In general, the packet processing modules of the intelligent mobile node MN1 (270) cooperate with the host computer's device driver code and the intelligent controller through the use of the parameter memory (164) and the plurality of selection cretiria for routing, channel selection and power selection in providing network services.

According to one embodiment, a hierarchical network provides the mobile node MN1 (270) to continue operation even in case of a loss of access to the intelligent access point AP1 (160), the primary communication channel. The storage of local physical and network parameters within the parameter memory (274) of the intelligent mobile node MN1(270), coupled with the cooperation from other mobile nodes the present invention provides a more resilient and robust wireless network.

In addition to the advantages presented during power-up and reset, it is further advantaged during real-time loss of communication to the intelligent access point, such as channel interference. The mobile node MN1 (270), in cooperation with access point AP1 (160) and the controller (150) may modify the default settings for the secondary connectivity path so that in the next similar episode the network is further optimized. In one embodiment, the intelligent controller (150) and the intelligent access point AP1 (160) cooperate with the intelligent mobile node MN1 (270) to finalize the default parameters used in the conditions, such as power-up, reset, or loss of communication. The physical parameters channel selection (271) and power selection (272) are among one of the parameters that may be stored, maintained and collected at the scope of the intelligent mobile node MN1 (270).

Intelligent mobile node MN1 (270) utilizes a wireless link 220 as it is primary communication path, and utilizes a PCMCIA interface (240) as its communication path with the terminating or originating communications node.

Exemplary Packet Processing Policies

Figure 4A:
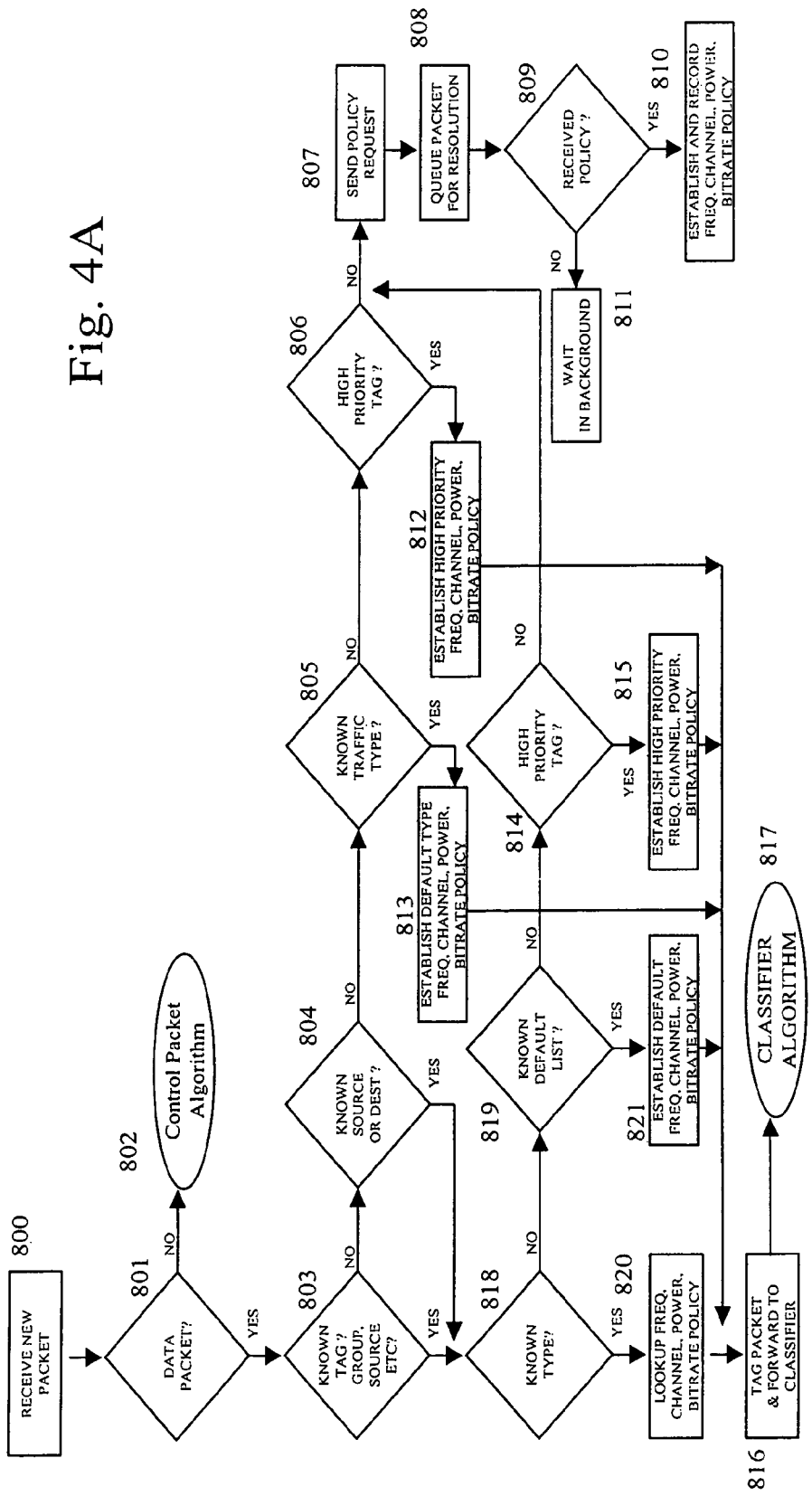
FIGS. 4A-4C are flow diagrams illustrating exemplary processes for processing packets.

FIG. 4A is a flow diagram illustrating an optimization packet policy according to one embodiment. Exemplary process may be performed by a processing logic that may comprise hardware (circuitry, dedicated logic, etc.), software (such as is run on a dedicated machine), or a combination of both. In one embodiment, a highly optimized spectral efficiency is provided in order to meet the stringent requirements of a highly scalable wireless network. In general transmission across a shared wireless media is susceptible to outside interference and changing spectral characteristics. The statistics are maintained regarding the historical efficiency of meeting the required service level agreements. In addition, one or more databases are maintained regarding the performance requirements of the packet flows anticipated. In one embodiment, a default database related to default parameters of the anticipated packets is maintained in order to meet the best performance for the network. The tables and databases are populated and maintained as a management function and generally utilize best effort background processes to avoid interferring with the forwarding of data packets. In general, the packets associated with the management and operation of the intelligent components is termed control packets, while the action for forwarding packets not involved in control packets is classified as data packets. In one embodiment, incoming packets are classified as either data or control packets on the conditions. An exemplary diagram of control packet algorithm is outlined in FIG. 4C and throughout this document. The embodiments of the present invention further provide the ability to treat all packets as data packets, to treat all packets as control packets, to first check for data packets or to first check for control packets in initiating classification of the incoming packets. The diagram of FIG. 4A illustrates a presumption of control packets and only known data packets optimally flow through to participate in the forwarding services provided by the exemplary network over the data plane. Such a rigorous ingress based policy control is established to minimize the impact on the data flow within the intelligent components. Unknown packets eventually flow to the state analyze known packet type (849) in FIG. 4C to be classified as to the type of packet and to then update the tables and classification information.

Figure 4B:
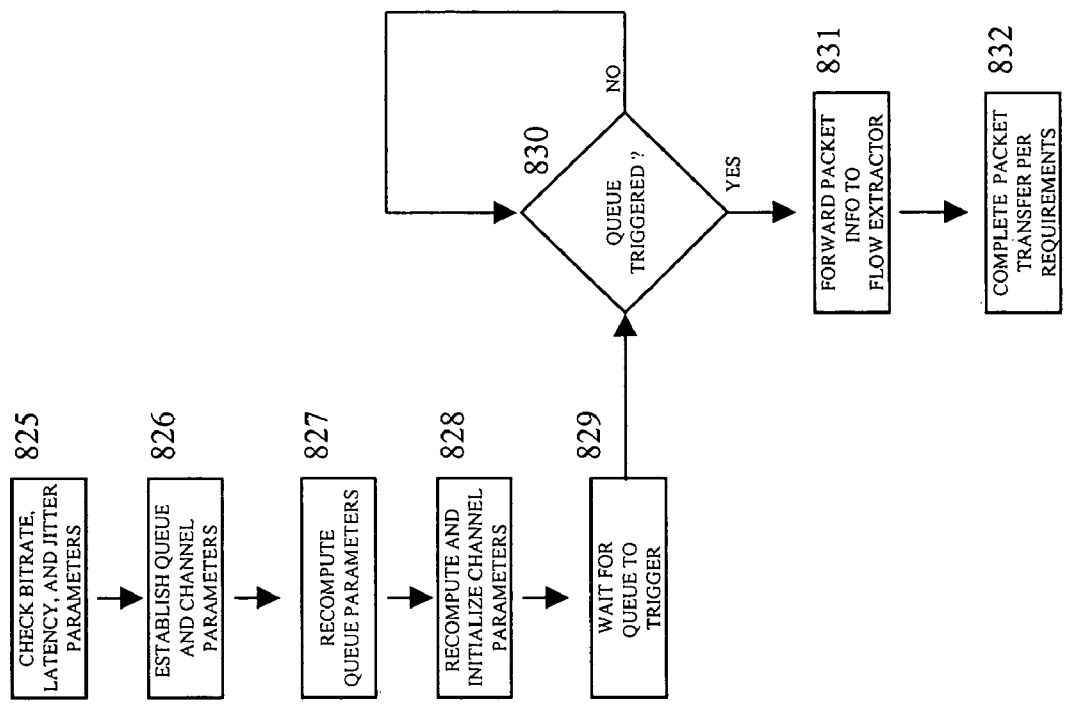
Figure 4C:
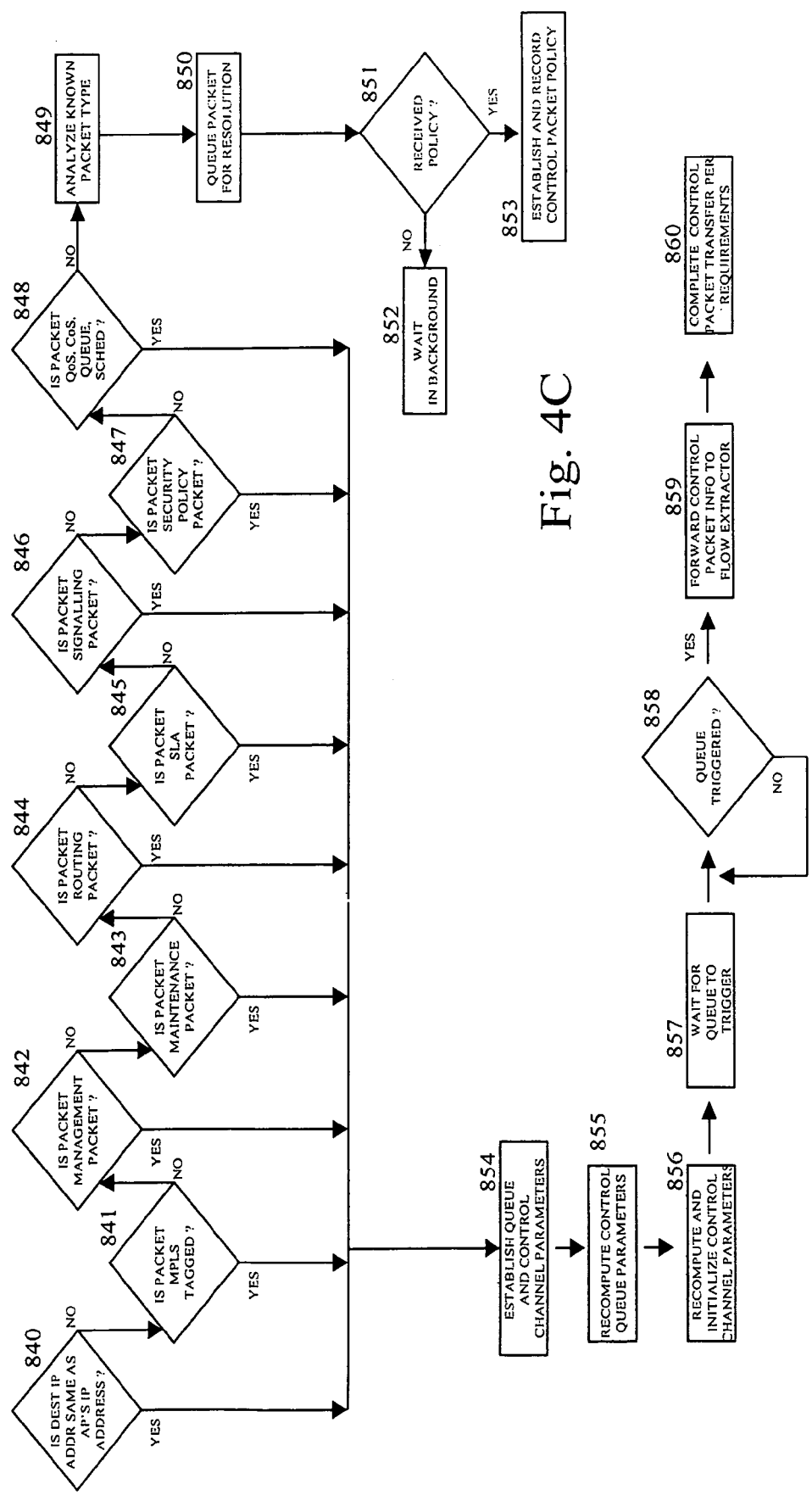

The intelligent mobile node or intelligent access point cooperate with the controller to provide the required packet transport and forwarding services once the requirements information has been populated adequately within its classification tables to initiate service. FIG. 4A includes a control packet algorithm (802) and a classifier algorithm (817). The control packet algorithm is illustrated in FIG. 4C, and the classifier algorithm (817) is illustrated in FIG. 4B in more detail, according to certain embodiments.

Referring to FIG. 4A, at the top of the diagram a new packet is received by the module (800). Once the packet is received adequately for classification, the partial packet or the completed packet is forwarded to the module data packet (801). This module interrogates the packet information to determine if this is a known data packet. A variety of consideration are utilized in determining if a packet is a data packet including known routing tables, MPLS (multiprotocal label switching)

tags, known IP addresses, known traffic types and port numbers, or if any processing tags within the IP header such as high priority tag can be used for classification. If the packet is not deemed to be known data packet, the exemplary flow of FIG. 4A assumes the packet is a control packet and forwards the control of the packet to the control packet algorithm (802), which will be covered in more detail in the discussion regarding FIG. 4C. If the packet is deemed to be a data packet, the next task for the exemplary diagram of FIG. 4A is to establish the appropriate service requirements in regard to bitrate, latency, and jitter based on the service level agreements of the source and the destination nodes. For simplicity of illustration the flow of FIG. 4A outlines a fixed priority based flow in that attributes to determine bitrate, latency and jitter are checked sequentially. However the classification priorities can be interrogated simultaneously and the order of priority checking can be rearranged in order to provide the least interrogation time for the highest priority packets.

In FIG. 4A, if the packet is deemed to be a data packet the packet is forwarded to determine if the packet contains a known tag, group or source (803). The network support advanced routing protocols such as MPLS wherein a shim header is inserted ahead of the IP packet to provide information regarding the quality of service requirements of the IP packet. The MPLS header provides a tag that is used by the exemplary optimization packet policy flow to specify the frequency, channel, power and bitrate policy. If the packet contains a known tag, or is a member of a known group or set of source IP addresses, the packet is tagged and the control proceeds to determine if the packet has a known type (818). If the packet type is know, the control proceeds to lookup the appropriate frequency, channel, power characteristics and bitrate policy (820) regarding the bitrate, latency and jitter. The control then proceeds to tag packet & forward to classifier (816). The control then proceeds to the classifier algorithm (817). FIG. 4B outlines the details of the exemplary classifier algorithm according to one embodiment.

Once the packet has been interrogated in the state known tag, group, source etc (803) and the packet is deemed to not be tagged control proceeds to determine if the packet is from a previously known source IP address or a known destination IP address (804). If the source or destination of the packet is previously know, the packet is tagged and control proceeds to the known type state (818). If the source or destination of the packet is not previously known the control proceeds to known traffic type (805). In this state, the packet is interrogated to determine if the type of traffic it is carrying is a known type with a defined default policy. If the packet is of a known traffic type with default policy control proceeds to establish default type for frequency, channel, power and bitrate policy (813). Thereafter control proceeds to tag the packet and forward to classifier (816).

Once the packet has been interrogated in the known traffic type (805) and the packet is deemed to not be of a known traffic type control proceeds to determine if the packet is of a high priority tag (806). If the packet has a high priority tag with a default policy the packet is tagged and control proceeds to establish the default high priority frequency, channel, power and bitrate policy (812). If the packet is deemed to not have a high priority tag (806) control proceeds to send policy request (807). In the policy request state, the packet is deemed to be unknown data packet, and the intelligent component requests the intelligent controller to establish a policy for the frequency, channel, power, and bitrate policy. The packet is then queued for resolution (808). In this state, the packet information is gathered and tagged and the packet is prepared to be queued. The control then proceeds to received policy (809) and waits for a specific timeout to receive a policy resolution. If the policy is not received within the timeout period, control proceeds to wait in background (811). In this state, the packet is queued and a timer set for the controller to send a policy resolution. If a policy resolution is not received within the timeout period, the packet is then tagged to be best effort packet and the packet is queued with the lowest priority best effort tag. If the controller forwards an appropriate policy resolution, control proceeds to establish and record the frequency, channel, power and bitrate policy (810).

Once the packet has been interrogated in the known type (818) and the packet is deemed to not be of a known traffic type, control proceeds to determine if the packet is of a known default list (819). The known default list is maintained for a category of packet types. If the packet type is within a default list, control proceeds to establish default frequency, channel, power, and bitrate policy (821). If the packet is not within the known default list (819), control proceeds to determine if the packet has the high priority tag (814) asserted within the IP header. If the high priority tag is asserted, control then proceeds to establish high priority frequency, channel, power, bitrate policy (815). If the packet does not have the high priority tag asserted, control proceeds to send a policy resolution request (807) to the intelligent controller. The intelligent controller upon receiving the resolution request from the intelligent access point or the intelligent mobile node utilizes an ingress based policy control for determining the optimal network wide frequency and channel allocation based on maximizing spectral efficiency. The overall target for the intelligent controller is to transfer successfully the most highest priority packets. Thus all incoming packets are assigned a weight that is proportional to the quality of service parameters regarding bitrate, latency, and jitter. Upon successful completion of the packets, the respective allocated weight of the packets is accumulated to determine the overall spectral efficiency.

FIG. 4B is a flow diagram illustrating an exemplary classifier algorithm according to an alternative embodiment. Exemplary process may be performed by a processing logic that may comprise hardware (circuitry, dedicated logic, etc.), software (such as is run on a dedicated machine), or a combination of both. In the optimization packet policy flow of FIG. 4A, the packet was finally tagged and forwarded to the classifier (816) and the control proceeded to the classifier algorithm (817). Once the packet has been tagged and forwarded to the classifier algorithm, control proceeds to check bitrate, latency and jitter parameters (825) associated with the established tag of the packet. Based on the results, the tag is interrogated to establish the queue and channel parameters (826). Once the queue and channel parameters have been established, control then proceeds to insert the new packet within the existing queues. Once the packet has been queued, control proceeds to recompute all queue parameters (827) to reflect the change in any existing queues and to absorb the new packet within the existing pool of packet queues. Once the packet has been queued, control proceeds to recompute and initialize channel parameters. In this state, the system analyzes the state of the queues and coorperates with the controller in determining the best channel usage policies. Once the system has recomputed and initialized channel parameters (828), the packet waits for the queue requirements and its scheduled conditions to be met in the state queue triggered (830). Once the queue trigger (830) is asserted, control proceeds to forward the packet info to the flow extractor module (831). In this state the flow extractor state control schedules the packet and negotiates the appropriate radio and transmission characteristics so that the packet can begin to be transmitted. Thereafter the system then proceeds to complete packet transfer per requirements (832).

FIG. 4C is a flow diagram illustrating an exemplary control packet algorithm according to another embodiment. Exemplary process may be performed by a processing logic that may comprise hardware (circuitry, dedicated logic, etc.), software (such as is run on a dedicated machine), or a combination of both. The exemplary network of FIG. 4C presumes that all packets are control packets. FIG. 4A outlined the process where one of the initial states in optimizing the packet flow is to establish if the packet is a known data packet (801). If the data packet is not a known data packet control proceeds to the control packet algorithm (802) state.

Similar to the process of FIG. 4A, for simplicity of illustration the flow of FIG. 4C also outlines a fixed priority based flow in that attributes to determine packet type classification are checked sequentially. However, multiple classification priorities can be interrogated substantially simultaneously and the order of priority checking can be rearranged in order to provide the least interrogation time for the highest likelihood control packet types. Referring to FIG. 4C, the packet is tagged with the identified packet type and once it is identified, the system proceeds to establish queue and control channel parameters (854). The exemplary order of checking starts with determining if the destination IP address is the same as the IP address of the access point (840) and ends with determining if the packet is a management packet involved in passing of maintenance information for its packet QoS, CoS, queue, and scheduling (848). If at any point within the checking sequence the packet is identified as one of the packet types, control forwards to establish queu and control channel parameters (854). In one embodiment, it is checked if the packets destination IP address is the same as the access points IP address (840). If not, it is checked if the packet contains an MPLS shim header in the state is packet mpls tagged (841). If so, it is checked if packet is a general management packet in the state is packet management packet (842). If not, it is checked if the packet is a maintenance packet in the state is packet maintenance packet (843). If not, it is checked if the packet is a routing management packet such as ARP in the state is packet routing packet (844). If not, it is checked if the packet is SLA maintenance or management packet in the state is packet SLA packet (845). If not, it is checked if the packet is a signaling packet such as sip in the state is packet signaling packet (846). If not, it is checked if the packet is a security policy packet in the state is packet security policy packet (847). If not, it is checked if the packet is a QoS, CoS, Queue or scheduling packet in the state Is packet QoS, CoS, Queue, schedule (848). If the current packet is not deemed to be any of the checked packet types, the system continues to cooperate with the intelligent controller in attempting to analyze known packet types and ascertain the nature of the packet as either a control packet or a data packet. If the system is unable to identify the packet, it is assumed to be a low priority best effort packet and is scheduled accordingly.

If the packet is deemed to not be of a known control packet type, control proceeds to send policy request to the controller and queue the packet for resolution in the state queue packet for resolution (850). In the policy request state, the packet is deemed to be unknown control packet, the intelligent component requests the intelligent controller to establish a policy for the frequency, channel, power, and bitrate policy for the control packet. The packet is then queued for resolution (850). In this state, the packet information is gathered and tagged and the packet is prepared to be queued. The control then proceeds to received policy (851) and waits for a specific timeout to receive a policy resolution. If the policy is not received within the timeout period, control proceeds to wait in background (852). In this state, the packet is queued and a timer set for the controller to send a policy resolution. If a policy resolution is not received within the timeout period, the packet is then tagged to be best effort packet and the packet is queued with the lowest priority best effort tag. If the controller forwards an appropriate policy resolution, control proceeds to establish and record the frequency, channel, power and bitrate policy (853).

If the packet is deemed to be of a known control packet type from states (840-848) or the controller has established and recorded the control packet policy (853), FIG. 4C outlines the exemplary diagram of establishing the queued packet. In the state establish queue and control channel parameters (854) the resultant tag is interrogated to establish the queue and control channel parameters (854). Once the queue and control channel parameters have been established, control then proceeds to insert the new packet within the existing queues. Once the packet has been queued, control proceeds to recompute control queue parameters (855) to reflect the change in any existing queues and to absorb the new packet within the existing pool of packet queues. Once the packet has been queued, control proceeds to recompute and initialize control channel parameters (856). In this state, the system analyzes the state of the queues and cooperates with the intelligent controller in determining the best channel usage policies. Once the system has recomputed and initialized control channel parameters (856), the packet waits for the queue requirements and its scheduled conditions to be met in the state wait for queue to trigger (857). Once the queue triggered (858) is asserted, control proceeds to forward the packet information to the forward control packet information to flow extractor (859). In this state, the flow extractor state control schedules the packet and negotiates the appropriate radio and transmission characteristics so that the packet can be transmitted. Thereafter, the system then proceeds to complete control packet transfer per requirements (860).

The algorithms of FIGS. 4A-4C illustrate exemplary ways for establishing optimized packet forwarding and segregation of data and control packets. The embodiments of the present invention further provide the ways for the algorithms to initially start with completely undefined packet type and classification tables and then progressively learn as additional packets are processed. Thus as the system progresses it continues to become more intelligent and operate at higher optimization.

Exemplary Wireless Network Operations

Figure 5A:
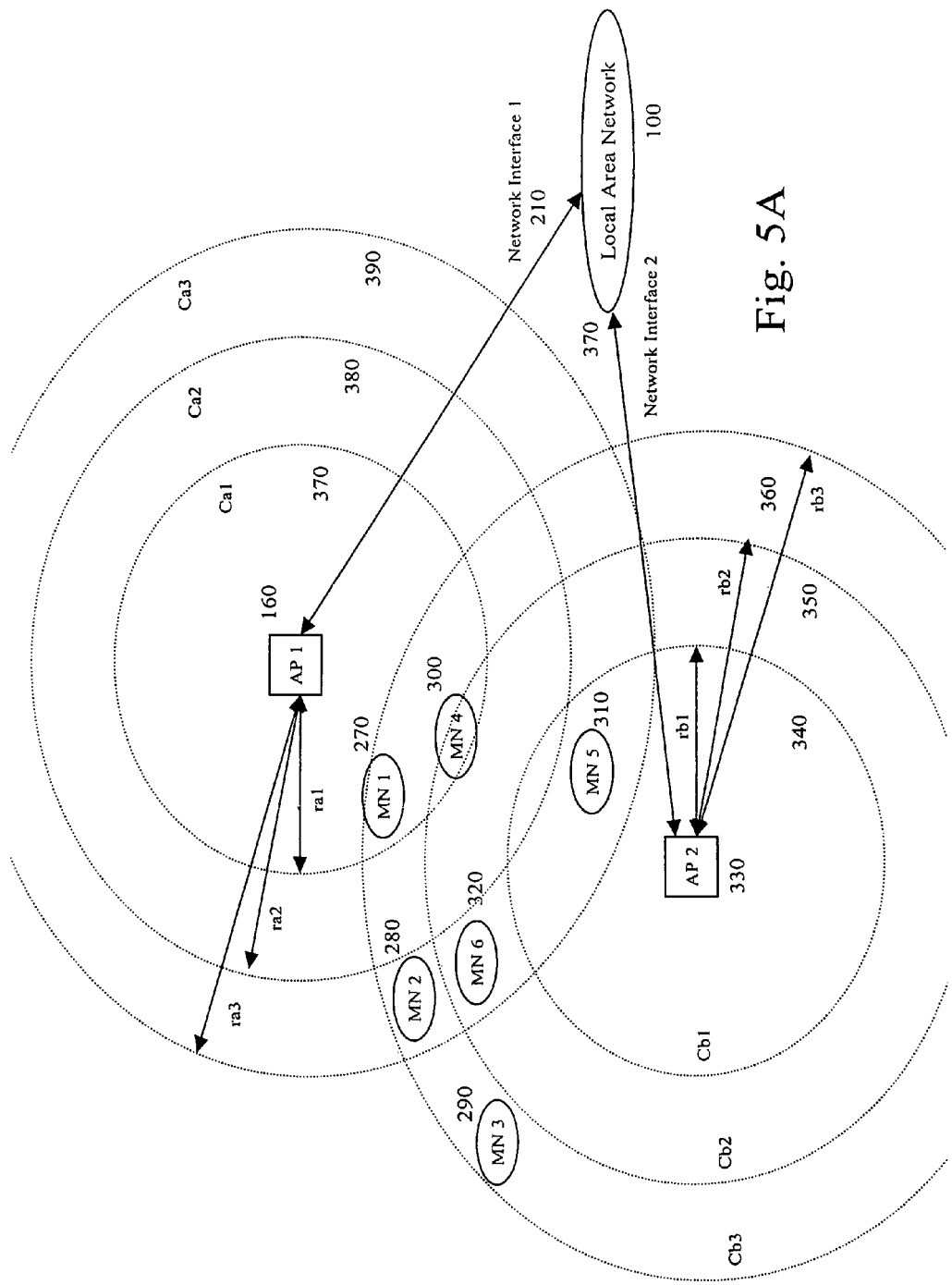
FIGS. 5A-5B are a diagrams illustrating wireless networks according to certain embodiments.

FIG. 5A is a diagram of wireless network operating in an infrastructure based operational model according to one embodiment. FIG. 5A outlines the nature of realized performance and the physical interconnectivity of the LAN (100), intelligent access point AP1 (160) and intelligent access point AP2 (330). FIG. 5A illustrates the inverse dependency of the actual realized performance of a given mobile node to the distance from the access point.

As distance increases between access point AP1 (160) with increasing radius ra1, ra2 and finally ra3 the effective performance deteriorates. FIG. 5A simplifies the dependency into 4 regions, namely ra1 with the highest performance, ra2 as the medium performance, ra3 as the lowest performance, and finally beyond ra3, with no performance. FIG. 5A further outlines the region Ca1 (370) of a circle with radius ra1 associated with the highest performance for mobile nodes from AP1 (160). The region Ca2 outlines a circle with radius ra2 associated with the medium performance for mobile nodes from AP1. Finally the region Ca3 outlines a circle with radius ra3 associated with the lowest performance for mobile nodes from AP1. For the purpose of this exemplary network, the circle Ca1 realizes a bandwidth of 54 mega bits per second (mbps), the circle Ca2 realizes a bandwidth of 10 mbps, the circle Ca3 realizes a bandwidth of 2 mbps, and finally the circle falling outside Ca3 realizes a bandwidth of 0 mbps.

Similarly for AP2 (330), the first circle Cb1 (340) about AP2 of radius rb1 realizes a bandwidth of 54 mbps. The middle circle of Cb2 (350) of radius rb2 realizes a bandwidth of 10 mbps. The third circle of Cb3 (360) of radius rb3 realizes a bandwidth of 2 mbps. Finally the circle outside the radius rb3 realizes a bandwidth of 0 mbps.

FIG. 5A illustrates the relationship that when there are multiple mobile nodes, MN1 (270), MN2 (280), MN3 (290), MN4 (300), MN5 (310) and MN6 (320), these mobile nodes due to the nature of their portability will transverse multiple access points at varied and changing distances, and would consequently receive varying performance. Thus in the exemplary topology illustrated in FIG. 5A, the mobile node MN3 (290) is only accessible by AP2 (330) and lies within the circle cb3 and realizes a performance to the LAN (100) at a bandwidth of 2 mbps.

Alternatively MN1 (270) can be accessed by either AP1 with a realized bandwidth of 54 mega bits, as it resides within the circle Ca1 (370). Alternatively, MN2 (270) can be accessed by AP2 (330) with a realized bandwidth of 2 mbps, as it resides within the circle Cb3. FIG. 5A illustrates that the choices are possible for establishing connectivity to the LAN (100) and the realized performance is a dynamic function of the immediate proximity of the mobile node to the access point.

Figure 5B:
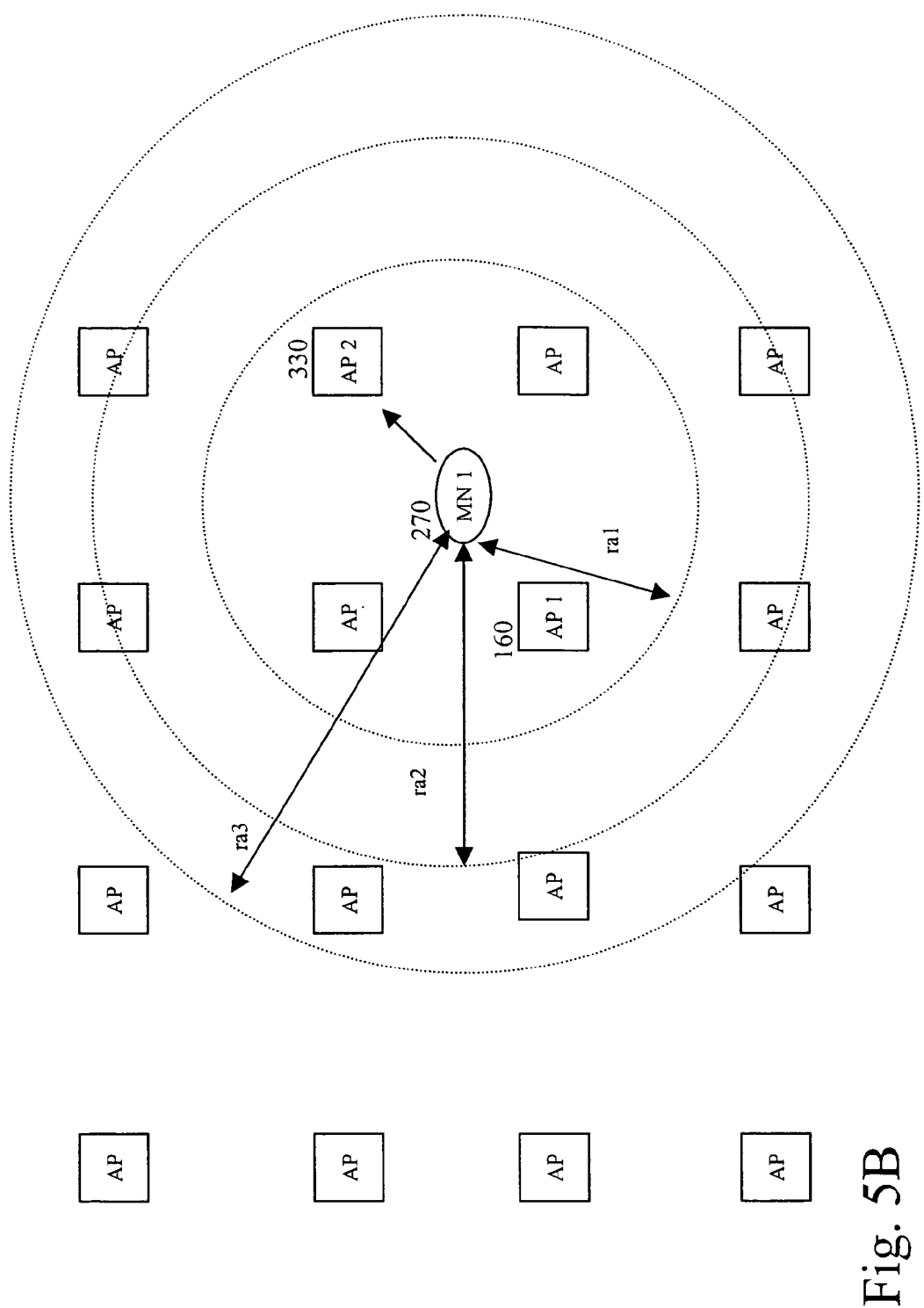

Referring to FIG. 5B, traditional wireless networks generally utilize static association of mobile nodes with the access points in that the mobile node and access point association is typically made based on the physical proximity of the mobile nodes to the access points as in the case of nearest neighbor association. Alternatively traditional wireless networks utilize signal strength as the ways for association between mobile nodes and access points. In such an association as a mobile node transverses from one access point towards another access points, the signal strength between the first access point and the mobile node continues to decrease while the signal strength between the second access point and the mobile node continues to increase. At some points, the mobile node would switch its association from one access point to the other access points.

In one embodiment, the access point and mobile node association utilizes real-time network conditions in addition to signal strength in determination of access point to mobile node association. The exemplary network of FIG. 5A illustrates a given deployment having access points. These access points are physically located in a manner to provide uniform high-speed wireless coverage for the mobile nodes. FIG. 5B illustrates such a topology wherein access points are organized in a grid formation. The grid formation is organized such that mobile node MN1, or any other mobile nodes, can travel anywhere within the grid and continue to receive access to at least one access point at a prescribed high bit rate performance. The access points are further arranged in such a fashion as to minimize interference amongst each other. Subsequently access points utilize different frequencies from their nearest neighbors. In FIG. 5B, as mobile node MN1 travels away from AP1 towards AP2, the intelligent controller is notified of the relative signal strengths of signals received from AP1 and AP2 in one of two ways, either from a mobile node report, or from an access point report.

FIG. 5B further illustrates the range of transmission for mobile node MN1 (270) with concentric circles about MN1. The first circle about MN1 (270) has a radius of ra1 and indicates the highest effective realized bandwidth of 54 mbps. The middle circle has a radius of ra2 and indicates the medium effective realized bandwidth of 10 mbps. The final circle about MN1 (270) has a radius of ra3 and indicates a realized bandwidth of 2 mbps. And the region outside the circle with radius ra3 has an effective ralized bandwidth of 0 mbps. As seen in FIG. 5B the exemplary network in a grid formation allows for the mobile node MN1 to associate with up to 4 access points at the highest bit rate. The mobile node MN1 may associate with up to 8 APs with the medium bit rate. Finally the mobile node MN1 may associate with up to 11 access points at the lowest bit rate.

In one embodiment, a multiple access point association utilizes these two characteristics prevalent within the deployed networks. While networks are designed to provide a prescribed high bit rate association between mobile nodes to access points on a one-to-one association, if the user is willing to accept a lower bit-rate, a one-to-many association is possible. In addition, due to the nearest neighbor interference constraints at high bit-rates, the use of non-interfering nearest neighbors allows for a one-to many associations of mobile nodes to access points at lower bit rates.

Figure 5C:
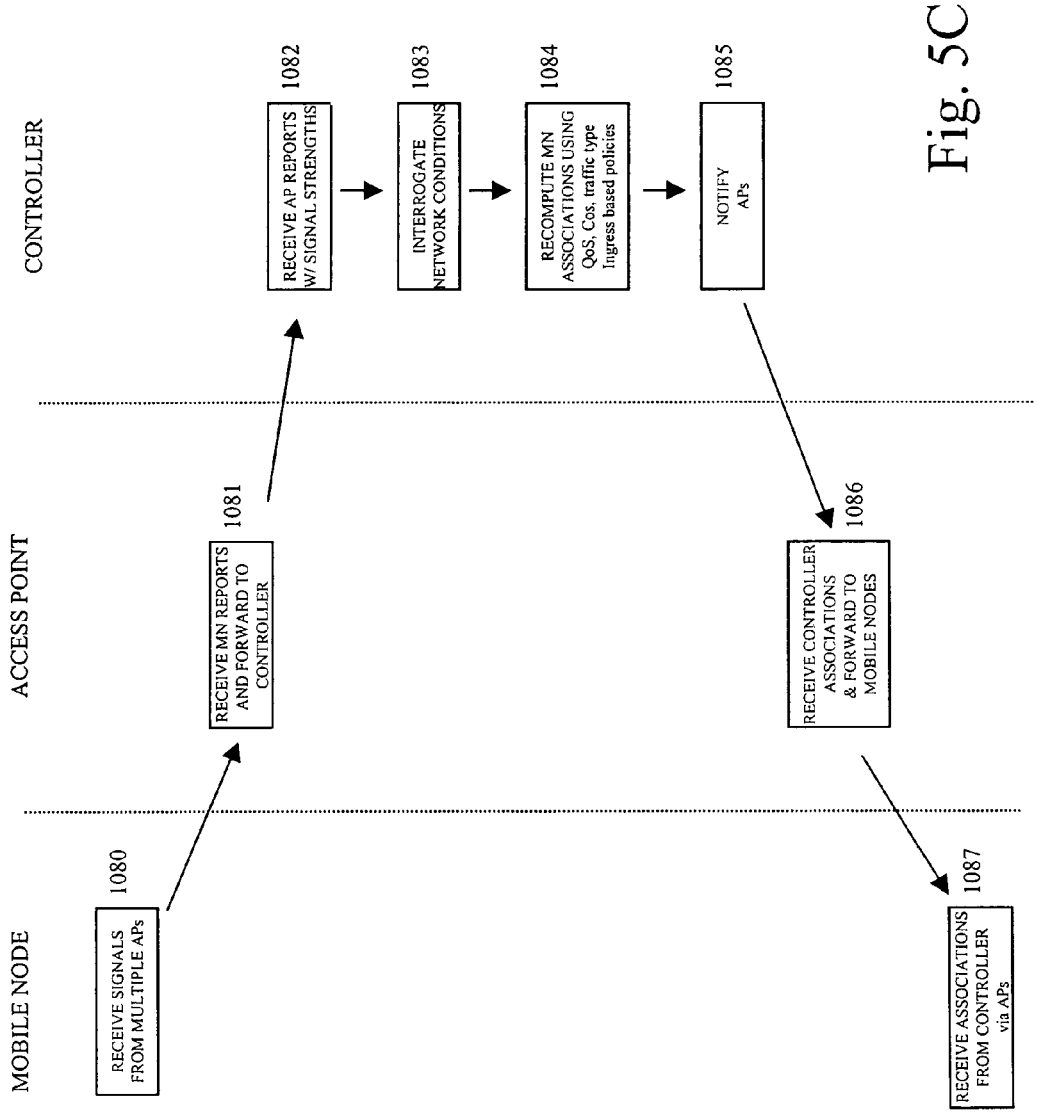
FIGS. 5C-5D are flow diagrams illustrating exemplary multiple AP association according to certain embodiments.

FIG. 5C is a flow diagram illustrating an exemplary process according to one embodiment, where a mobile node may monitor one or more access points within its range of reception and maintain a table of the relative signal strengths of the multiple access point associations. Exemplary process may be performed by a processing logic that may comprise hardware (circuitry, dedicated logic, etc.), software (such as is run on a dedicated machine), or a combination of both. In one embodiment, this can be accomplished by substantially simultaneously tuning to multiple channels associated with multiple access points. Relative signal strength is determined by analyzing the amount of energy received in all or part of the channels received. Alternatively, the access point may elect to tune to a single channel at a time, and gather this information by repeating the operation in a round robin or other scheduling manners. The mobile node gathers the information by monitoring activity of the signals received from multiple APs (1080) in FIG. 5C, or otherwise by initiating communications to the access points within its range of reception and transmission (1091) in FIG. 5D.

In FIG. 5C, once the mobile node has received signals from multiple APs (1080), signal strengths are computed and the information is forwarded to the command and control access point. The command and control access point then forwards this information to the intelligent controller (1081). Upon receiving the mobile node signal strengths from the access point reports (1082), the controller proceeds to interrogate the current network conditions (1083). The controller may elect to utilize the statistical and physical conditions to recomputed mobile node association. The exemplary network of FIG. 5C utilizes the QOS requirements, the service level agreement, class of service type such as voice traffic versus data traffic, and ingress based policy control to determine which access points can serve the traffic demands of the mobile node using QoS, CoS, traffic type Ingress based policies (1084). Once the determination of optimized mobile node to access point association is made, the controller proceeds to notify the access points involved in the re-association (1085). Upon receiving the controller report for mobile node to access point association (1086), the access point proceeds to notify the mobile nodes. Upon receiving the notification from the access points (1087), the mobile nodes proceed to implement the changes as requested by the controller.

Figure 5D:
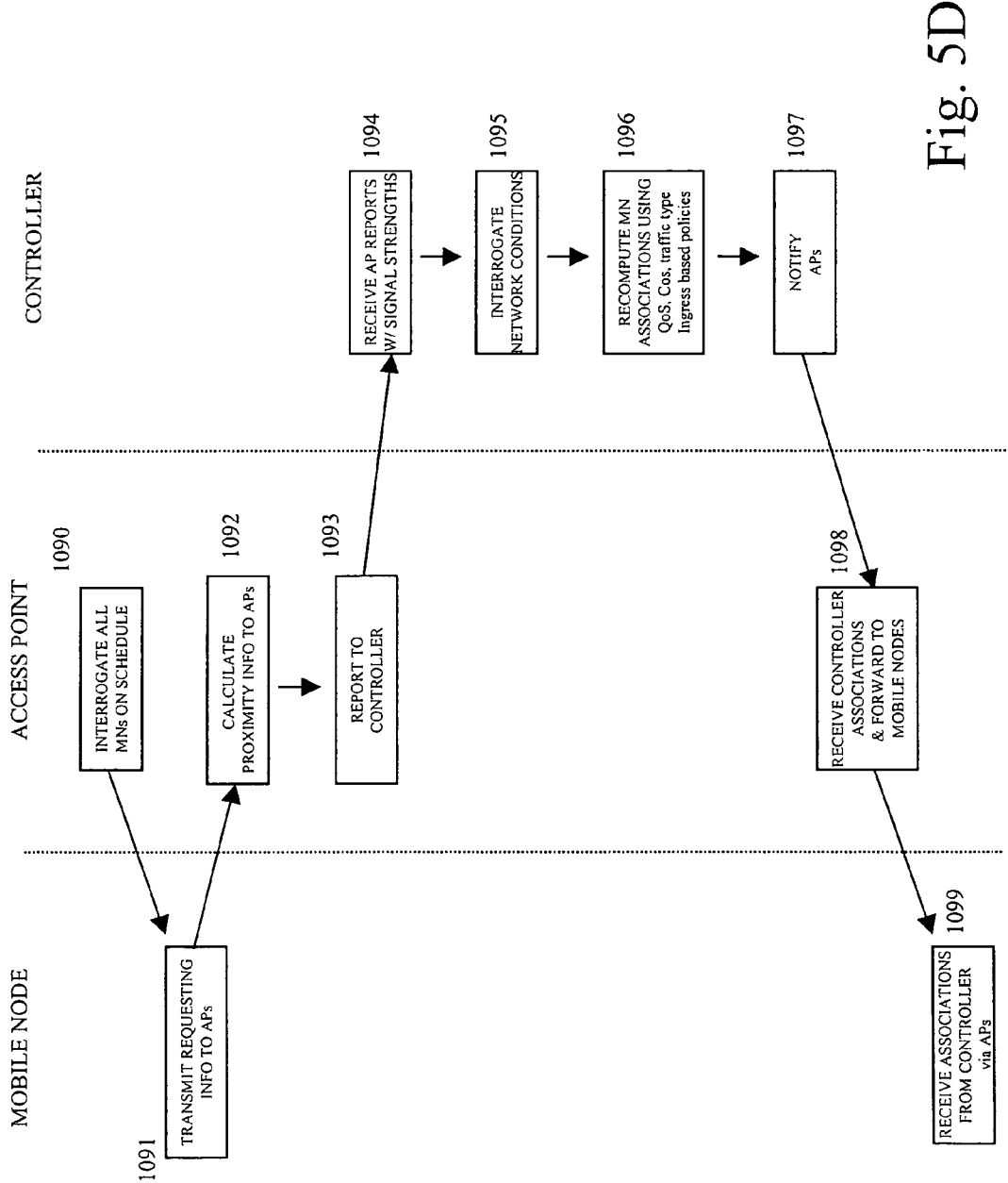

FIG. 5D is a flow diagram illustrating an exemplary process according to one embodiment, where an access point may monitor one or more mobile nodes within its range of reception and maintain a table of the relative signal strengths of the multiple mobile nodes and the mobile node to access point association. Exemplary process may be performed by a processing logic that may comprise hardware (circuitry, dedicated logic, etc.), software (such as is run on a dedicated machine), or a combination of both. In one embodiment, this can be accomplished by having the access point to initiate a sequence of interrogation from the mobile nodes on a round robin or a time-to-time basis (1090). Once the mobile node receives the signal from the access point, it proceeds to transmit the requested information packet from the mobile node to the access point (1091). The receiving access point may elect to cooperate with multiple access points to determine the relative signal strengths of all the receiving access points, or alternatively elect to generate the signal strengths of all the mobile nodes on an independent basis. Upon receiving the responses from the mobile nodes, the access point proceeds to calculate the signal strengths of the mobile nodes (1092) and then proceeds to forward the information to the intelligent controller (1093). Upon receiving the mobile node signal strengths from the access point reports (1094), the controller proceeds to interrogate the present network conditions (1095). The controller may elect to utilize the statistical and physical conditions to recomputed mobile node associations (1096). The exemplary network of FIG. 5D utilizes the QOS requirements, the service level agreements, class of service types such as voice traffic versus data traffic, and ingress based policy control to determine which access point can serve the traffic demand of the mobile node. Once the determination of optimized mobile node to access point association is made, the controller proceeds to notify the access points involved in the re-association (1097). Upon receiving the controller report for mobile node to access point association (1098), the access point then proceeds to notify the mobile nodes. Upon receiving the notification from the access points (1099), the mobile nodes proceed to implement the changes as requested by the controller.

According to another aspect of the invention, the association of the mobile node with the access points can be modified in real-time on a channel-by-channel basis. The multi-channel aspect of the present invention enables a given mobile node to be associated with the access points or mobile nodes substantially simultaneously. In one embodiment, one channel of a given mobile node can be associated with one access point or one mobile node, while another channel of the given mobile node is associated with another access point or another mobile node. In such an exemplary network, the network conditions as outlined in FIG. 5C and FIG. 5D above can be utilized to route traffic across the plurality of channels based on QOS requirements of the given mobile node, the service level agreements, the class of service types such as voice traffic versus data traffic and the ingress based policy control to determine which access point can serve which service requirements of the mobile node.

Exemplary Network Models

Figure 6:
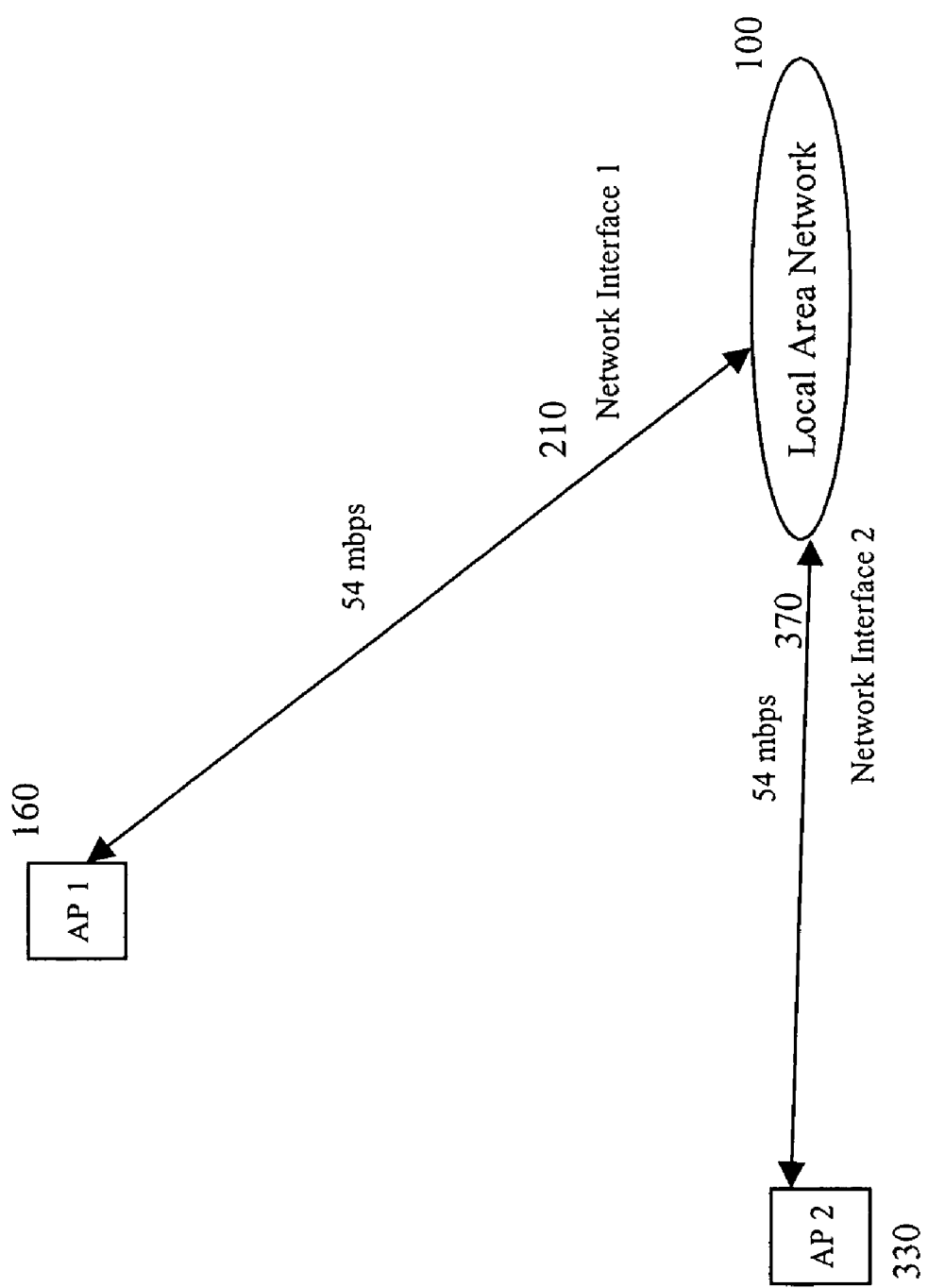
FIG. 6 is a diagram of the realized performance of an infrastructure based wireless network.

FIG. 6 illustrates a diagram of a typical infrastructure based capacity model. In a traditional network the access point AP1 (160) is typically interconnected to the LAN (100) by utilizing a wired network interface (210) such as Ethernet. The traditional infrastructure based networking model utilizes the access point AP1 (160) as an aggregation device to enable connectivity between the mobile nodes to the LAN (100). The nature of the wireless connectivity of a traditional wireless network is such that the aggregate realized capacity will always be the lower of either the wireless channel between the mobile nodes to the access point, or the backhaul connectivity between the LAN and the access point. In the current traditional wireless networks, typically, the wireless link between the mobile nodes and the access point is about 54 mbps while the backhaul link between the access points to the LAN (100) is typically 100 mbps. FIG. 5A illustrates such an exemplary traditional network and outlines the limited realized performance of an infrastructure based wireless network to be 54 mbps. Similarly the realized performance of the access point AP2 (330) is also limited to 54 mbps.

The aggregate capacity of the network illustrated in FIG. 6 will be the aggregation of the traffic from AP1 (160) and AP2 (330) for an aggregated capacity of 108 mbps. All mobile nodes within the scope of the network of FIG. 6 must share this aggregate capacity. With the topology of the 6 mobile nodes MN1 (270), MN2 (280), MN3 (290), MN4 (300), MN5 (310), and MN6 (320) of FIG. 5A, the average maximal realized bandwidth would be 108 mbps/6 nodes=18 mbps. As the proximity of access points to the mobile nodes is taken into account the average realized bandwidth would further deteriorate.

Figure 7:
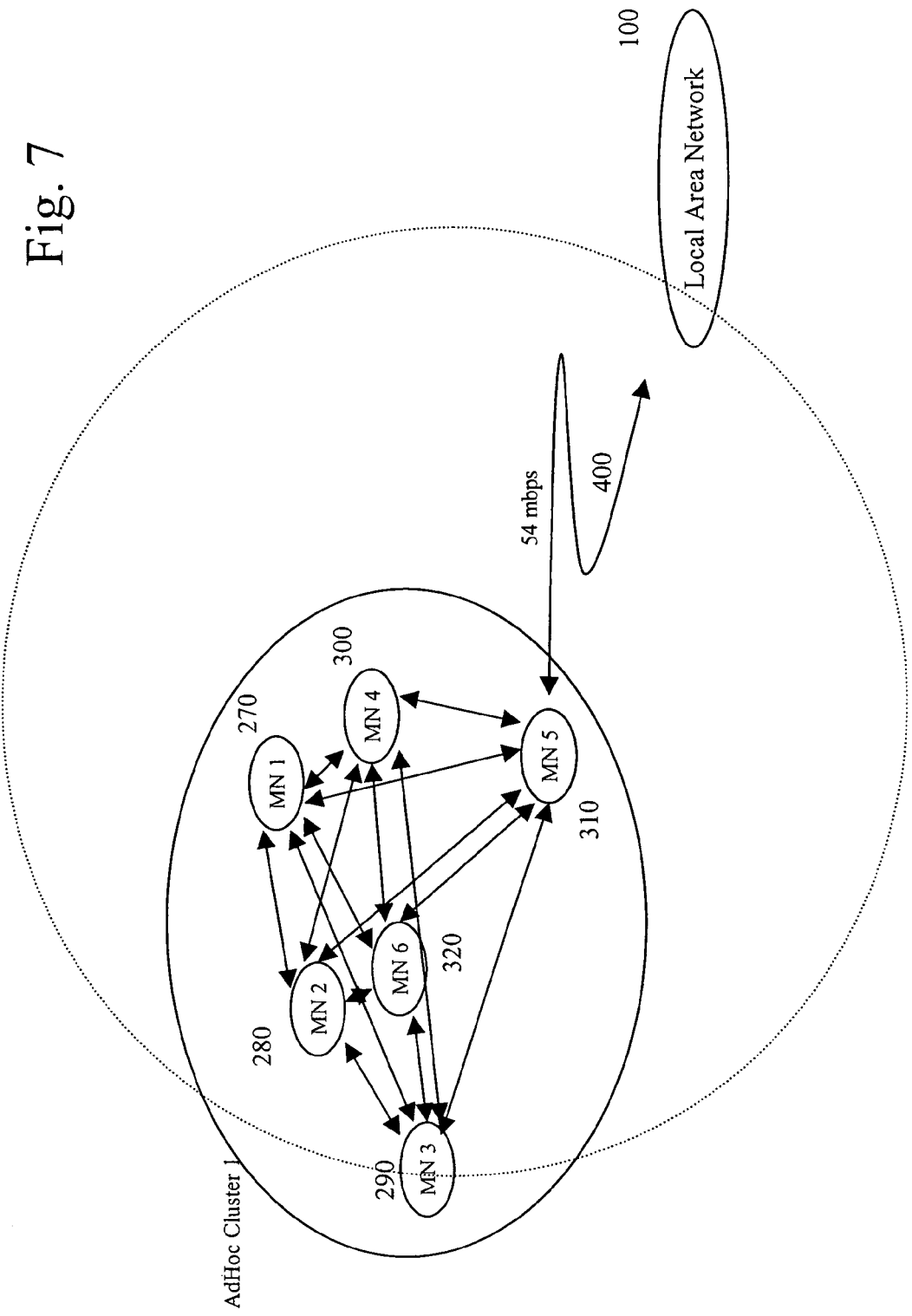
FIG. 7 is a diagram of an Ad Hoc based wireless network.

FIG. 7 illustrates a diagram of a traditional wireless network operating in the ad-hoc mode. In an ad-hoc operational model, the mobile nodes have the capability to intercommunicate with each other directly and do not require the use of an access point. Traditional ad-hoc wireless networks are disadvantaged in that a given wireless channel is shared between multiple wireless mobile nodes and the effective realized bandwidth is poorer. A single shared channel is utilized and multiple mobile nodes take turns in a well-behaved manner to access the channel, the predictability of access to the network in generally unreliable. Ad-hoc mobile nodes can also participate in forwarding traffic not destined for the given node to an upstream or a downstream mobile node. Traditional ad-hoc models generally agree to utilize a given wireless channel and information is exchanged on a best effort basis.

FIG. 7 illustrates multiple interconnections among the mobile nodes MN1 (270), MN2 (280), MN3 (290), MN4 (300), MN5 (310), and MN6 (320). FIG. 7 further illustrates the interconnection between mobile node MN5 (310) to the LAN (100) through the wireless link (400). The connection to the LAN (100) can be made using either an access point, or simply another mobile node with a direct physical connection to the LAN (100). In the traditional ad-hoc topology depicted in FIG. 7 the highest realized bandwidth is 54 mbps if traffic is originated or terminated at mobile node MN5 (310). If MN5 needs to participate in forwarding traffic from or to other mobile nodes, the wireless channel must first be used to forward the information to MN5 (310) and subsequently MN5 (310) forwards the traffic to the LAN (100). The half duplex nature of the operation results in decreasing the throughput by a factor of 2.

The mobile nodes MN1 (270), MN2 (280), MN3 (290), MN4 (300), MN5 (310), and MN6 (320) in aggregate are identified in FIG. 7 as an Ad-hoc cluster 1. All the nodes within the cluster share a channel and can communicate to each other either directly or indirectly. The nodes within the Ad-hoc cluster 1 take turns accessing the wireless media as outlined above. When communication takes place directly between members of the Ad-hoc cluster 1, the realized bandwidth is at the link capacity of 54 mbps. Alternatively, indirect communication between members is effectively at half duplex. Ad-hoc mode of operation is generally limited to a small group of Ad-hoc mobile nodes. An inherent limitation of traditional Ad-hoc mode of operation is that to form a cluster, each node must have a channel access to the other nodes. Traditional methodology is to share a common wireless channel and enable all the given Ad-hoc nodes to forward traffic on behalf of other nodes. Unfortunately, an artifact of such a traditional ad-hoc network is that the realized bandwidth is inversely proportional to the number of hops between the mobiles nodes trying to communicate to each other. Traditional approach to this limitation is to decrease the size of each Ad-hoc cluster by increasing the number of connections to the LAN (100).

Figure 8:
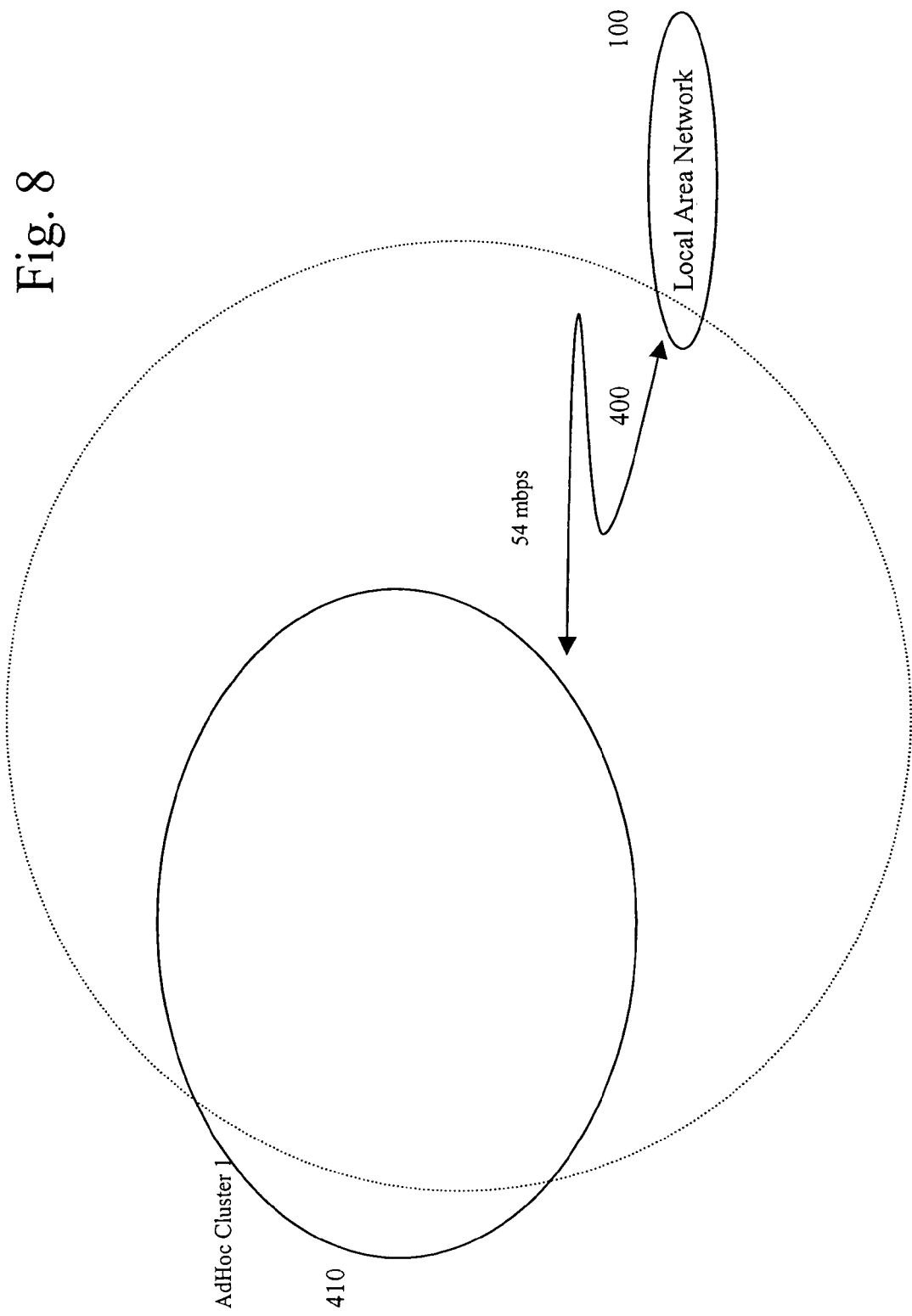
FIG. 8 is a diagram of the realized performance of an Ad Hoc based wireless network.

FIG. 8 is a diagram of a typical Ad-hoc based capacity model. Ad-hoc cluster 1 (410) is an aggregate of multiple mobile nodes that share a communication channel. FIG. 8 further illustrates a wireless link (400) between the Ad-hoc cluster 1 (410) and the LAN (100) at 54 mbps. As shown in FIGS. 7 and 8, the maximum realized capacity is 54 mbps of such an exemplary traditional ad-hoc network when communicating from the Ad-hoc cluster 1 (410) to the LAN (100). Furthermore, when members within the same Ad-Hoc cluster 1 (410) intercommunicate amongst themselves, again the maximum realized capacity is 54 mbps as a consequence of the shared channel. With the topology of the 6 mobile nodes MN1 (270), MN2 (280), MN3 (290), MN4 (300), MN5 (310), and MN6 (320) of FIG. 6 and FIG. 7, the average maximal realized bandwidth would be 54 mbps/6 nodes=9 mbps. As the proximity of mobile nodes to each other, and the number of hops to intercommunicate are taken into account the average realized bandwidth of the exemplary traditional ad-hoc wireless network would further deteriorate.

Figure 9:
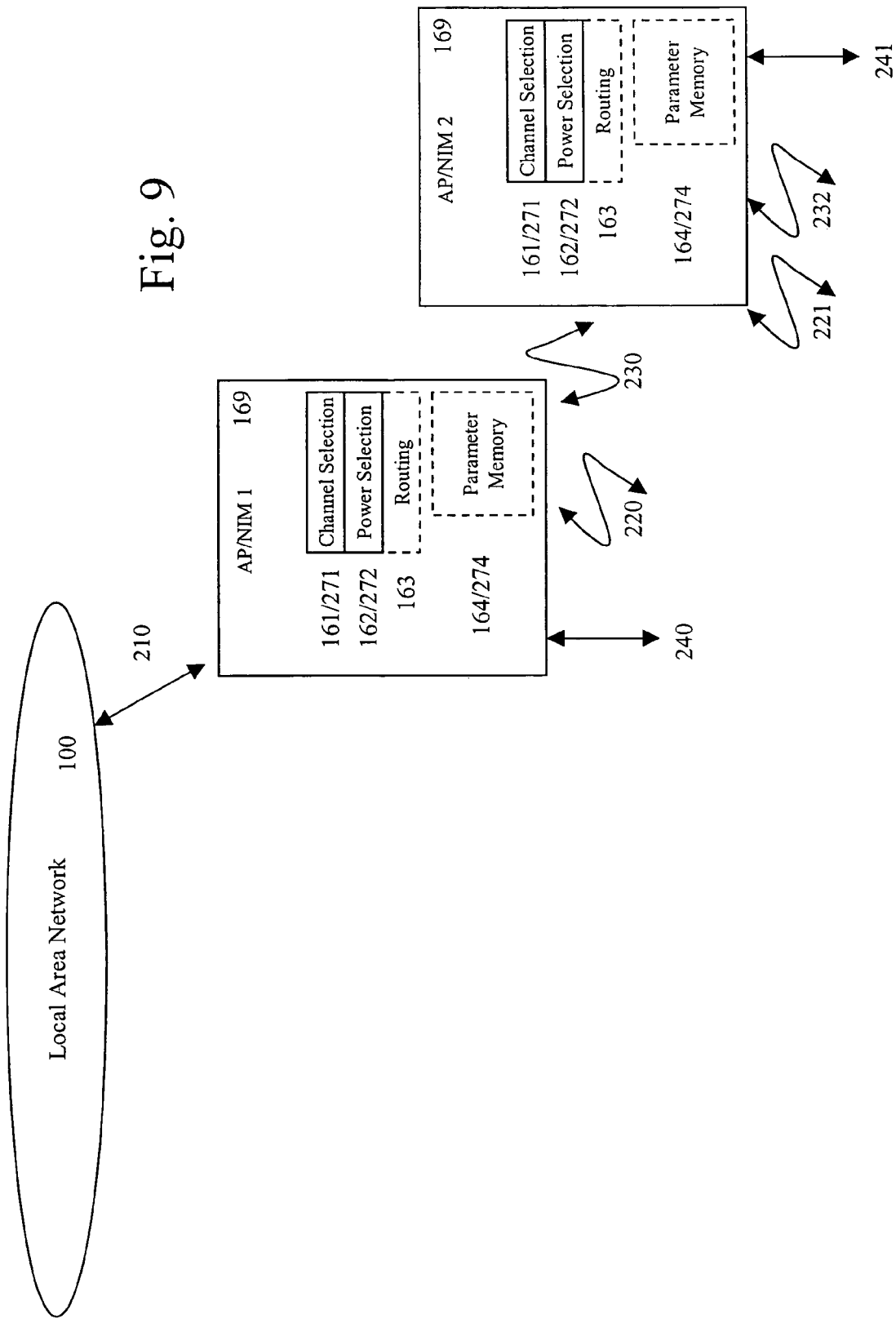
FIG. 9 illustrates a converged wireless access point (AP) and network interface module (NIM) based wireless network.

FIG. 9 is a block diagram illustrating an exemplary network model according to one embodiment. In this embodiment, a semi-hoc mode of operation is described. The semi-hoc model utilizes both functionalities of access points and network interface modules. The details of a converged intelligent access point AP1 and network interface module (NIM1) are illustrated in FIG. 9, herein referred to as a converged AP. The converged NIM may store, maintain, and control one or more network and physical parameters such as channel selection (161/271), power selection (162/272), and routing (163), among others. Furthermore, the converged AP may have a storage capability locally to be used as parameter memory as outlined in FIG. 3A and FIG. 3B above. The converged AP can be either configured statically on a given initial condition such as reset, or it may be configured in real-time on one or more physical conditions, such as interference, among others. The converged APs may be configured under the direction of an intelligent controller (150).

As shown in FIG. 9, the converged AP can be operated as an intelligent access point, or as an intelligent network interface module (NIM). In either mode, the converged AP has all the components required to operate both as an intelligent access point, and as an intelligent network interface module, namely, channel selection (161/271), power selection (162/272), and routing (163), among others. Certain embodiments of the invention may further incorporate multiple interfaces to enable a single device to be used an intelligent access point or as an intelligent NIM, such as PCMCIA (240), Ethernet, a wireless radio interface (220) and USB, among others.

FIG. 9 further illustrates a second converged AP module AP/NIM2 (169) having the same elements as the AP/NIM1. Multiple wireless and wired interfaces may be provided for enabling the devices to provide a full functionality of forwarding, bridging, and routing among the interfaces. One of the exemplary service AP/NIM1 and AP/NIM2 (169) can provide bridging services between the disparate wireless networks, such as Wifi, Wimax, and HiperLAN, etc. The exemplary network of FIG. 9 illustrates a wireless interface (230) as the primary communications link between the AP/NIM1 and AP/NIM2. AP/NIM2 is in-turn connected to the wired infrastructure with a wired interface (241). AP/NIM1 is connected to the wired LAN (100) with a wired interface 210.

Exemplary Integrations of Access Points

Figure 10A:
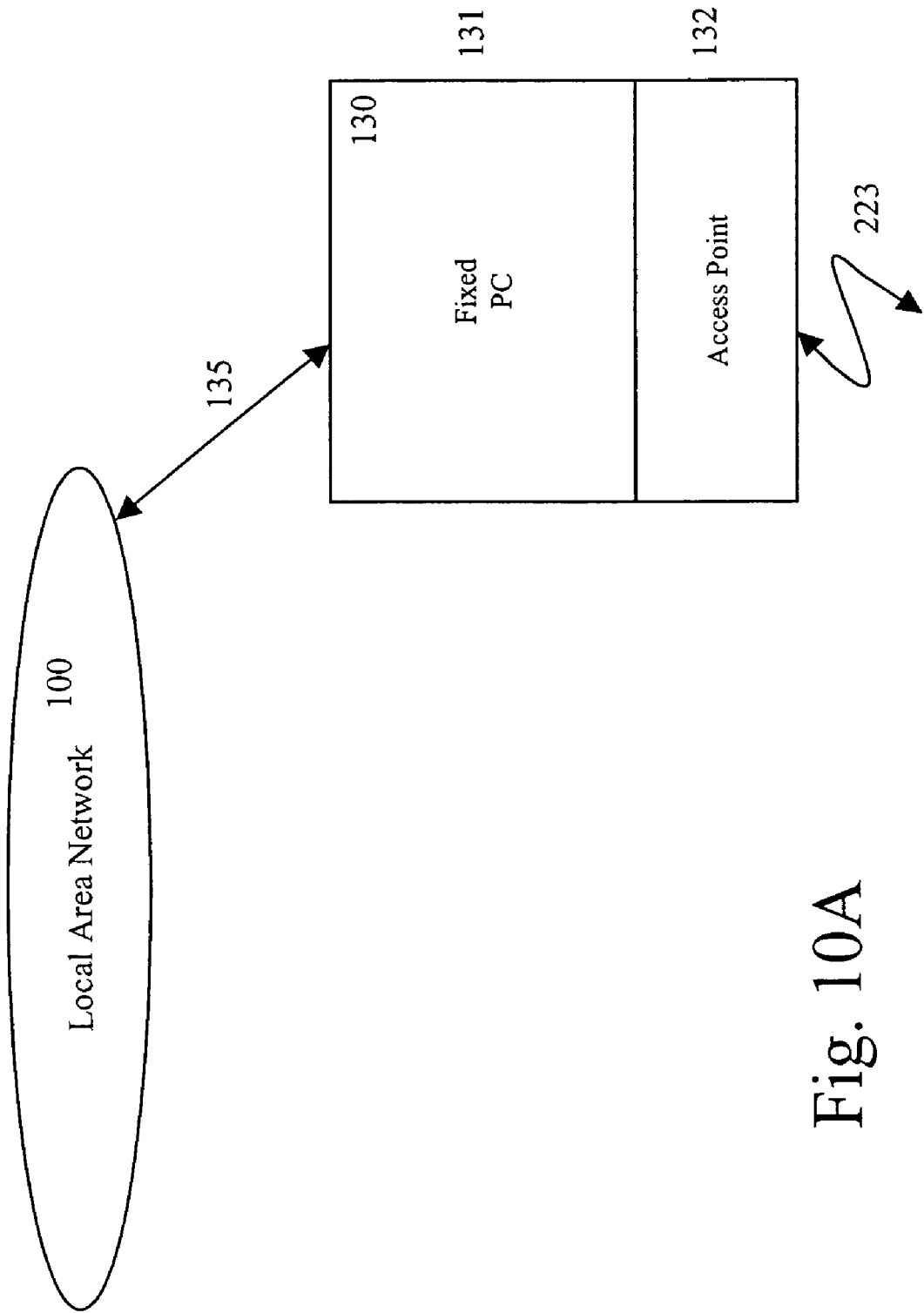
FIG. 10A illustrates a non-mobile access point.

FIG. 10A is a block diagram illustrating an exemplary access point that may be attached to a fixed personal computer fixed PC (130) according to one embodiment. In this embodiment, an access point (132) is attached to the fixed PC (131) through a local interface, such as USB, Ethernet, FIREWIRE, PCMCIA, etc. The fixed PC (131) is connected to the LAN (100) by a communication link 135 such as Ethernet, etc. The fixed PC has a direct communications link to the LAN (100) and does not require the use of the access point link for its own communications; however, the fixed PC provides the access point link as a service for communication to one or more nodes. The attachment of the intelligent access point (132) to a fixed PC (131) enables the network to support an infrastructure based wireless operational model for rapid deployment within an existing wired network. In such an exemplary configuration, the intelligent access point (132) provides network services such as bridging, forwarding, and routing, etc, to the mobile nodes communicating across the wireless link (223) with the access point (132). The information from the mobile nodes across link (223) is forwarded to the fixed PC (131) and the fixed PC (131) forwards the traffic to the LAN (100).

The intelligent access point (132) provides deployment of multiple access locations within the network in a rapid, convenient and seamless manner. Furthermore, the intelligent access point (122) serves as a secondary communications link for the fixed PC (131) to provide better redundancy and resilience in accessing the resources within the local area network (100).

In such a scenario, if connectivity through communication pathway (135) is not available to the LAN (100) for the fixed PC (131), the fixed PC (131) may use the wireless link 223 through the intelligent access point to gain access to the LAN resources. Alternatively, the fixed PC may elect to use the wireless link (223) for establishing an alternative path for providing advanced real time services based on quality or class of service, such as voice or video communications, etc.

In one embodiment, a converged access point may be used in place of an intelligent access point to provide a similar mode of operation. In such an exemplary configuration, the fixed PC (131) may alternate in real-time between the infrastructure mode of operation, the ad-hoc mode of operation, and the semi-hoc mode of operation.

Figure 10B:
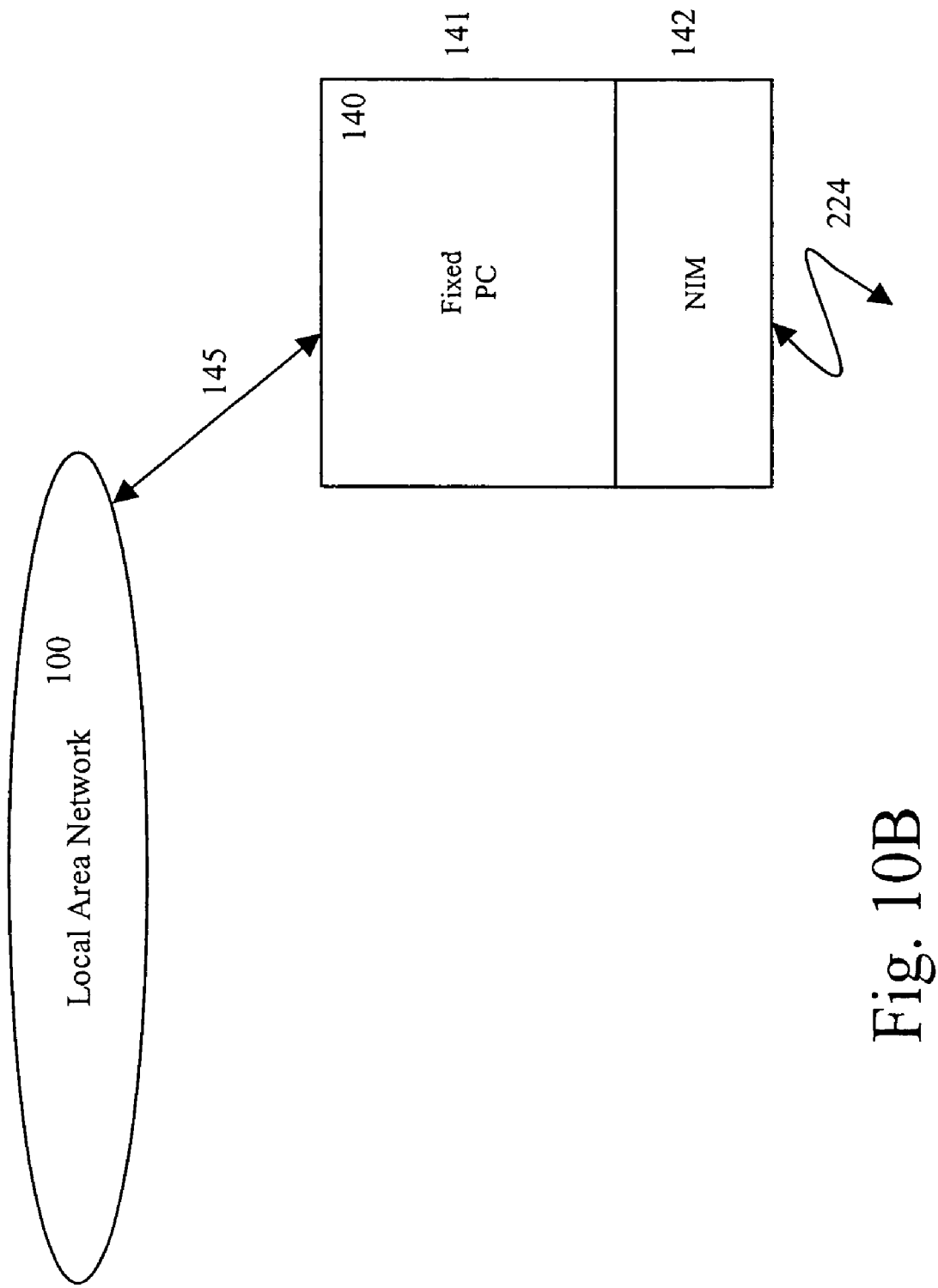
FIG. 10B illustrates a non-mobile computer with a wireless network interface module (NIM) based wireless link.

FIG. 10B is a block diagram illustrating an exemplary network interface module (NIM) (142) that may be attached to a fixed personal computer fixed PC (141) according to one embodiment. In such an exemplary configuration, the NIM (142) is attached to the fixed PC (141) through a local interface, such as USB, Ethernet, FIREWIRE, PCMCIA, etc. The fixed PC (141) is connected to the LAN (100) by a communication link 145 such as Ethernet, etc. The fixed PC (141) has a direct communications link to the LAN (100) and does not require the use of the NIM for its own primary communications. However, the fixed PC provides the NIM as a service for communications to one or more mobile nodes. The attachment of the intelligent NIM (142) to the fixed PC (141) enables the network to support an ad-hoc based wireless operational model for rapid deployment within an existing wired network. In such an exemplary configuration, the intelligent NIM (142) provides network services such as bridging, forwarding, and routing, etc, to the mobile nodes communicating across the wireless link (224) with the NIM (142). The information from the mobile nodes across link (224) is forwarded to the fixed PC (141) and the fixed PC (141) forwards the traffic to the LAN (100).

The intelligent NIM (142) provides multiple access locations within the network in a rapid, convenient and seamless manner. Furthermore, the intelligent NIM (142) interface serves as a secondary communications link for the fixed PC (141) to provide better redundancy and resilience in accessing the resources within the LAN (100). In such a scenario, if connectivity through 145 is not available to the LAN (100) for the fixed PC (141), the fixed PC (141) may use the wireless link 224 through the intelligent NIM to gain access to the resources. Alternatively, the fixed PC may elect to use the wireless link (224) for establishing an alternative path for providing advanced real time services based on quality or class of service, such as voice or video communications, etc.

In one embodiment, a converged access point may be used in place of an intelligent NIM to provide a similar mode of operation. In such an exemplary configuration, the fixed PC (141) may alternate in real-time between the infrastructure mode of operation, the ad-hoc mode of operation, and the semi-hoc mode of operation.

Exemplary Segregations of Control Planes

FIG. 11 illustrates a traditional control plane used for the configuration and management of a traditional wireless network. FIG. 11 illustrates the traditional flow of such a unified control/data plane, in that both command and control information shares a wireless link with the data information, and the traditional network multiplexes the two to utilize a given channel. The operational state diagram of FIG. 11 illustrates the traditional flow wherein upon initialization the system enters a power on reset (1000). After general housekeeping on a power on reset (1000), the system enters a state to identify a previously defined configured state (1010). Once a valid previous configuration state has been identified, the system then attempts to establish the configured state (1020) as determined from identify previous config state (1010). Once the configured state has been established, the system may query the current condition or respond to a user's request to determine if a configuration change is required from the identified configured state. If no configuration changes are required, the system enters an operational mode (1060). Alternatively, if a configuration change is required, the system transitions to an identify new configuration state (1040). Once the new configuration state has been determined, the system proceeds to establish new config state (1050). Once the system has established new config state (1050), the system then enters an operational state (1060). The system continues to cycle through the user config change required (1030) and onto the operational state (1060) based on the network requirements.

The traditional operational wireless network model is generally controlled in a static manner over a single shared control and data channel. If remote management is required, the system generally shares the bandwidth between data traffic and command and control traffic. Alternatively, an authorized user may change the configuration. Furthermore, traditional wireless networks do not share information across multiple devices to provide a network wide optimized for the network services provided.

Figure 12:
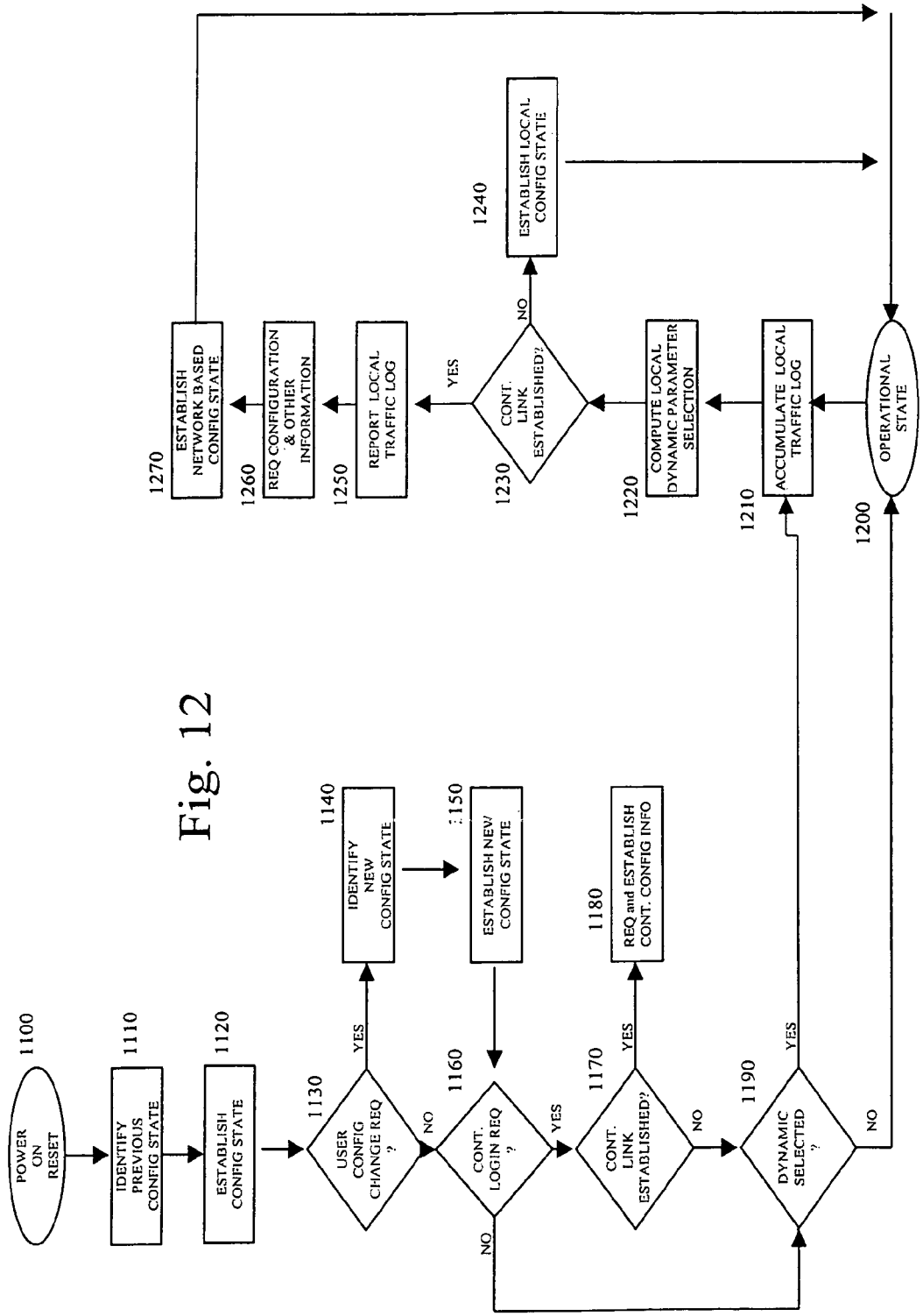
FIG. 12 illustrates an exemplary segregated parameter control plane.

FIG. 12 is a flow diagram illustrating an exemplary process of a segregated control plane according to one embodiment. Exemplary process may be performed by a processing logic that may comprise hardware (circuitry, dedicated logic, etc.), software (such as is run on a dedicated machine), or a combination of both. The individual wireless devices may cooperate with either an external controller, or to cooperate amongst themselves to establish a network wide control and command infrastructure. The local device is responsible for establishing the local state of the given configuration. One or more external agents or wireless devices may be utilized in determining the configuration state.

Once the system completes the required house keeping for the power on reset (1100) state, according to one embodiment, the system may determine the previously configured operational state (1110). The system then identifies either a previously establish config state or identifies a default initial power-up config state. The system then progresses to establish config state (1120). Once the system has established a configured state, the system at a later point enables the user to change this state as required (1130). If a configuration change is required or requested in state 1130, the system proceeds to identify new config State (1140) by querying the required agent, then establish new config state (1150). If a configuration change is not requested or required, the system proceeds to determine if a connection with the intelligent controller is required as it enters the state controller login request (1160). If the system is required to login with the controller, the system proceeds to determine if a link is available and attempts to make the connection (1170). Alternatively, if the system is not required to login with the controller, the system proceeds to determining if real-time optimization is selected (1190). If the system determines that it has to login to a controller, the system opens a connection to the controller, and reports to the controller the current system configuration state (1180). The controller is then queried to determine if a state transition is required. If so, the new state as requested by the controller is established. At this point, the system has been initialized and the system transitions to determine the operational behavior.

The system transitions to the real-time selected (1190) state after having established a configuration state either under the direction of the controller or independently. In the real-time selected state, the system determines if real-time management is required based on the settings and the configuration of the system. If real-time optimization is not required, the system enters the operational state (1200). The system at this point is either in an operational mode (1200), or else has determined that real-time management is required and is in the accumulate local traffic log (1210) state.

In one embodiment, the system may accumulate the operational information, such as traffic type, traffic density, quality of service, frequency interference, etc. and to cooperate with the intelligent controller (150) in optimizing the efficiency of the network. The real-time optimization can take place either in cooperation with the controller, in cooperation with other intelligent nodes or independently at a single intelligent node.

In the real-time management mode, the system continually accumulates local traffic data, such as destination node, termination node, application type, quality of Service required, etc. within the accumulate local traffic log (1210) state. The accumulated information is used within the compute local real-time parameter selection (1220) state to make a determination of the optimal operational parameters such as frequency usage and power usage, among others. Once the local computation is completed, the system then proceeds to determine if the controller link is still established in the cont. link established (1230) state. If the controller link is no longer available, the system accepts the local computation of the operational parameters and sets the appropriate values within the state establish local config state (1240). If the controller link is still available, the system cooperates with the controller and reports the accumulated local log information to the controller as required in the state report local traffic log (1250). The system then cooperates with the controller to get the required configuration and other information (1260). Once the network wide information has been received by the system, the system then proceeds to establish network based config state (1270). The system then enters the operational state (1200). From time to time, based on the configuration, the system may reenter some or all of the states from 1100 through 1270 based on the conditions and the configuration of the system.

The controller in turn cooperates with the intelligent access points to accumulate a real-time profile of the traffic and the physical condition of the communication links, such as frequency usage, power usage and frequency interference, etc. The controller uses multiple of algorithms to determine the optimal network wide frequency allocations. Once the parameters are determined, the controller continues to inform all the involved access points.

In one embodiment, the system may continue real-time operation even in case of a loss of link with the intelligent controller. If the system is configured for a real-time controller based operational mode and the communication link to the controller is lost or inadequate, the system reverts to a local real-time operational mode. The system continues to attempt to re-establish the link to the controller and revert back to the real-time controller based operational mode as the controller becomes available. In summary, self-recovery from intelligent node failures, intelligent controller failures or link failures may be available. The system may continue normal operations during temporary controller and link failures, including the accumulation of local traffic logs, selection of local real-time parameters, and other information as configured by the controller, based on the default configuration. Once the link or controller connectivity is re-established, the controller queries the related components for the accumulated information and seamless network operation proceeds.

Exemplary Scalable Wireless Network Operations

Figure 13:
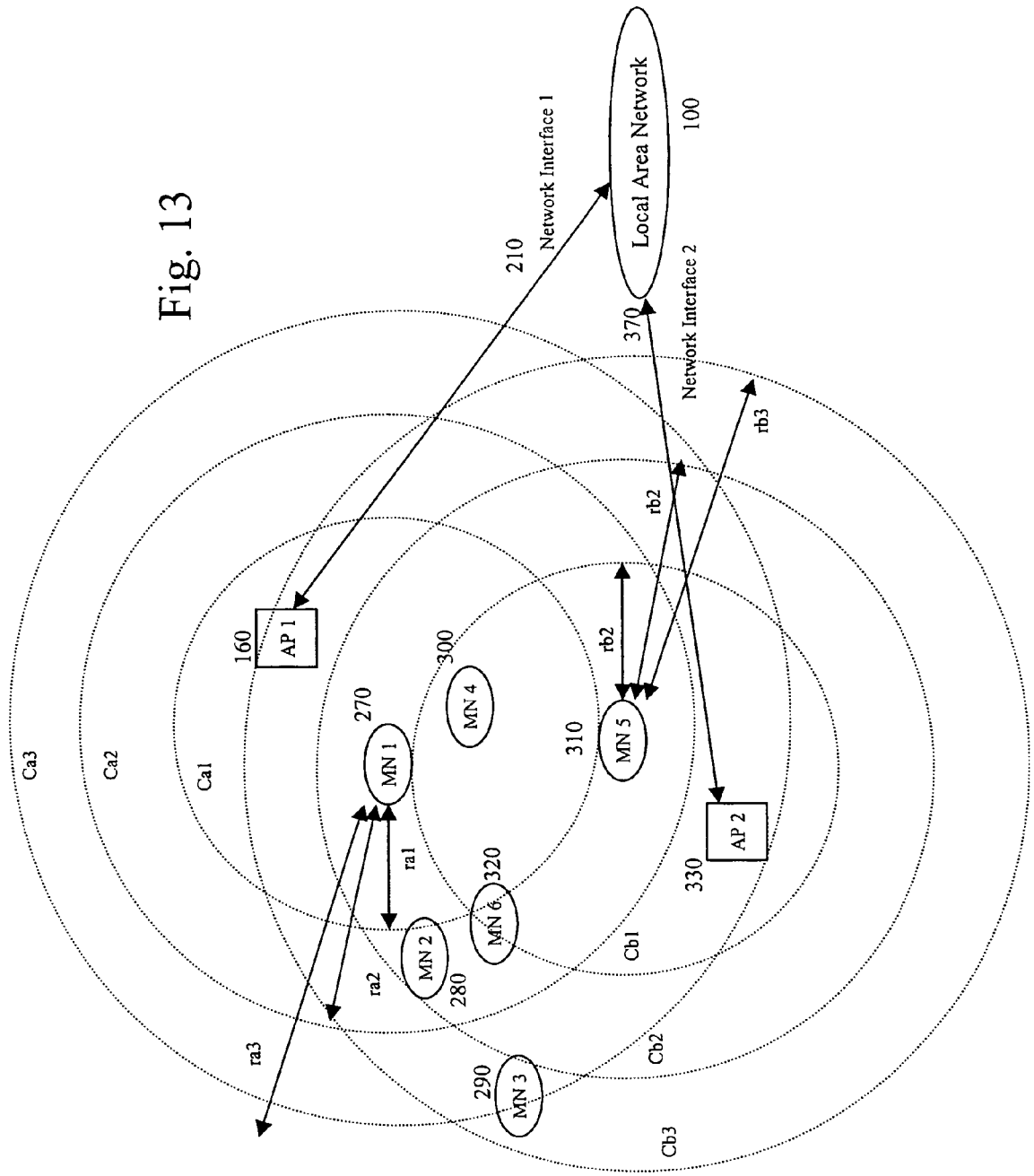
FIG. 13 is a diagram of a scalable wireless network.

FIG. 13 is a diagram illustrating an exemplary scalable wireless network according to one embodiment. As illustrated in FIG. 13, the exemplary network includes intelligent access points AP1 (160) and AP2 (330) and of intelligent mobile nodes MN1 (270), MN2 (280), MN3 (290), MN4 (300), MN5 (310), and MN6 (320). The intelligent mobile node may include either intelligent network interface modules (NIMs) or converged access points operating as mobile nodes or as individual access points, or a combination of these. Thus mobile node MN1 (270) may either operate as an access point, a NIM, or a combination of these.

FIG. 13 further illustrates the inverse relationship of the realized performance of a given mobile node to the distance from the transmitting/receiving pair. As distance increases between say mobile node MN1 (270) with increasing radii ra1, ra2 and finally ra3 the effective performance deteriorates. FIG. 13, simplifies the dependency into 4 regions, namely ra1 with the highest performance, ra2 as the medium performance, ra3 as the lowest performance, and finally beyond ra3, with no performance. FIG. 13 further outlines the region Ca1 of a circle with radius ra1 associated with the highest performance for mobile nodes from mobile node MN1 (270). In one embodiment, the highest realized bandwidth is set to 54 mbps, the medium realized bandwidth is set to 10 mbps, and the lowest realized bandwidth is set to 2 mbps, and finally the region outside circle Ca3 with the radius ra3 realizes a bandwidth of 0 mbps.

FIG. 13 further illustrates the range of effective bandwidth of mobile node MN5 with concentric circles with increasing radii and deteriorating performance; namely, Cb1, Cb2, Cb3 with realized bandwidths of 54 mbps, 10 mbps, and 2 mbps, respectively. As illustrated by the exemplary diagram of FIG. 13 access points may also participate within the network either in Ad-hoc, infrastructure, or Semi-hoc mode of operation. The network is capable of optimizing system wide performance by not only enabling physical parameter adaptability, such as frequency, and power among others, but the system may also adapt in real-time the mode of operation both between Ad-hoc, Infrastructure, and Semi-hoc, as well as full functionality such as the NIM and access point functionality.

The system further may adjust real-time group membership of a given set of intelligent nodes to further subdivide and to alter the group members in real-time. An exemplary member set may include mobile nodes MN1, MN2, MN3, MN4, MN5, and MN6. In a given exemplary mode of operation these members may utilize a given channel for command and control, and utilize another given channel for the traffic plane. In such an operational mode, if mobile node MN1(270) needs to communicate with MN5(310), the controller may be notified of the request on channel 1, the command and control channel, and based on one or more of parameters, the controller may elect to maintain the data plane group membership to the whole set of mobile nodes, namely MN1, MN2, MN3, MN4, MN5 and MN6. In this scenario, while mobile nodes MN1, and MN5 intercommunicate, the other Mobile nodes are able to intercept the transmission.

Alternatively, the controller may elect that the mobile nodes MN1 and MN5 are temporarily segregated to form a separate subgroup with a different channel for both command and control as well as data plane or a combination of either. In such an exemplary scenario, the remaining nodes namely MN2, MN3, MN4 and MN6 remain as member to the original group and are free to communicate without having knowledge of interference from or access to the information exchanged between MN1 (270) and MN5 (310).

The controller may reside anywhere on the LAN (100) within the span of the network. The controller has access to the operational mobile node clusters across the network and is in a position to optimize operations with a network wide scope.

In the exemplary diagram of FIG. 13, high-speed direct communication between node MN3 (290) and MN4 (300) may not be possible due to the relative distance between the nodes. In one embodiment, mobile node 3 (290) requests service from the controller. Once the controller receives the request, the controller inspects the current spectral disposition of the network and determines the optimal path and bandwidth for the communication between mobile node MN3 (290) and MN4 (300). The controller may elect for mobile node MN3 (290) to form a member group consisting of MN3, MN6, and MN4, where MN6 acts as a relay for the communications between MN3 and MN4 at a given channel. Alternatively, the controller may elect to form two member groups. The first group includes MN3 and MN6 at a given channel, and the second group includes MN6 and MN4 at an alternative channel. If in the given embodiment an multi-link connectivity is available, the relaying node MN6 does not have to wait for the complete reception of the packet from MN3 before starting to relay the packet to MN4.

In one embodiment, if a traditional mobile node enters the range of an intelligent access point, the controller may elect to form an independent group of traditional non-intelligent mobile nodes within a single member group, and elect to form a single separate or multiple separate intelligent member groups. The overlay nature with traditional wireless networks such as Wifi, Wimax, cellular and other wireless networks enables it to seamlessly integrate within existing deployments. The embodiments of the present invention provide mechanisms to cooperate with traditional wireless technologies and selectively, based on the parameters such as bit rate or application class, use either the traditional wireless mechanism or use the techniques described herein.

Figure 14A:
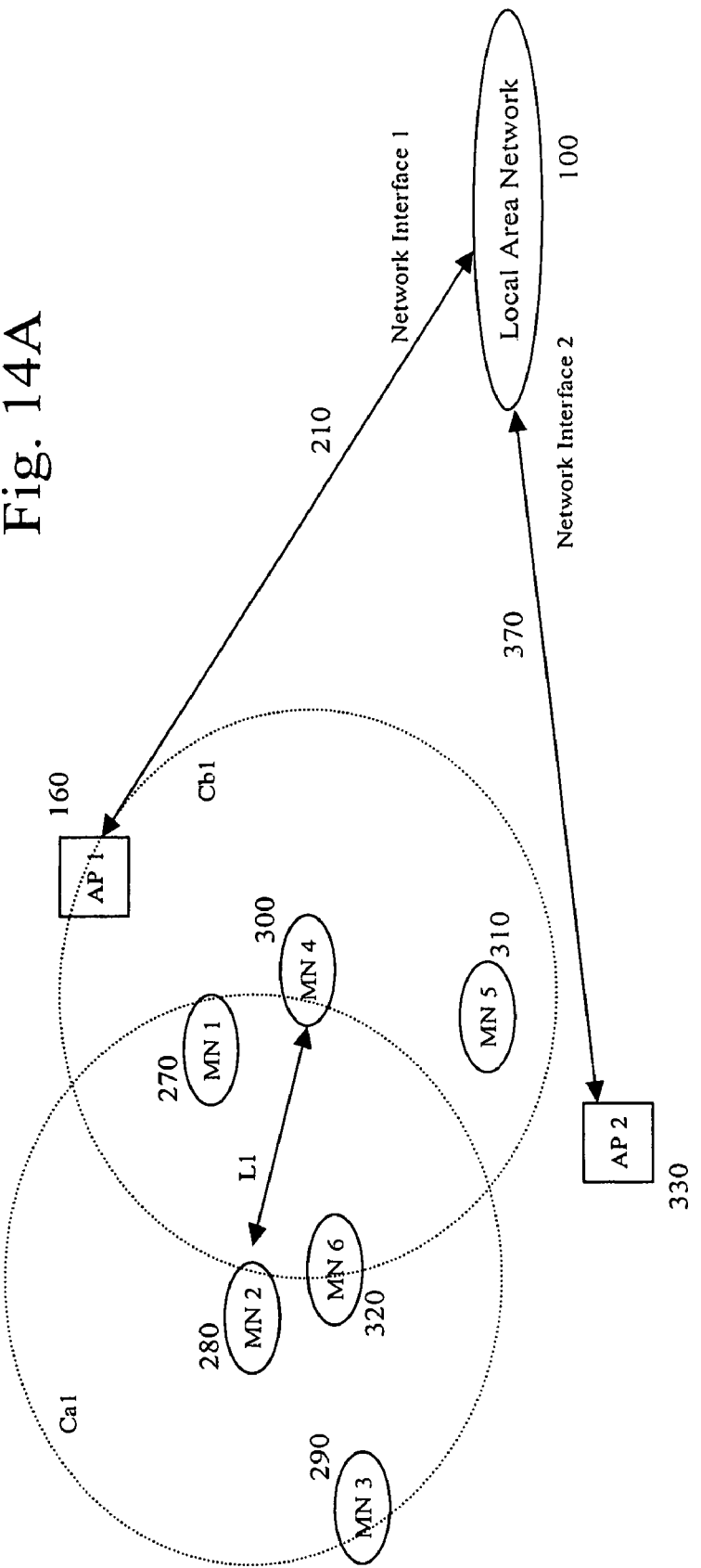
FIGS. 14A-14B are diagrams of wireless link allocation within the scalable wireless network architecture.

FIGS. 14A-14E are diagrams illustrating exemplary semi-hoc networks according to one embodiment. In this embodiment, the network may operate substantially simultaneously in an infrastructure mode as well as ad-hoc mode of operation. As illustrated in FIG. 14A LAN (100) is the primary wired network at the subscriber site. Intelligent access point AP1 (160) and AP2 (330) are two intelligent access points operating in an infrastructure mode that provide the primary connectivity for one or more mobile nodes to the LAN (100) through the use of network interface 1 (210) and network interface 2 (330). FIG. 14A further illustrates multiple mobile nodes MN1 (270), MN2 (280), MN3 (290), MN4 (300), MN5 (310) and MN6 (320) that are within the range of either AP1 (160) or AP2 (330). Further, the given mobile nodes MN1 (270) through MN6 (320) are within range of each other for direct communications.

FIG. 14A illustrates a scenario where mobile node MN2 initiates a request for communication with mobile node MN4 (300). In such a scenario, MN2 (280) makes a request either directly to the MN4 (300), either through an access point, such as AP1 (160) or AP2 (330), or through making a request to the controller. In FIG. 14A, the exemplary request was made through the controller and the controller elected to have the communication occur directly between MN2 (280) and MN4 (300) using a link L1 with specific channel related characteristics. In the exemplary diagram of FIG. 14A the control and command request to the controller residing somewhere within the LAN (100) is made through AP1 (160) or AP2 (330). In the exemplary diagram of FIG. 14A the initial member group includes MN1, MN2, MN3, MN4, MN5, and MN6. Once the controller receives the request from MN2, the controller elects to segregate the member groups into two groups. The first initial group includes MN2, MN3, MN5 and MN6 using the original communication link, and the second new group of MN2 and MN4 using the communication link L1.

The controller communicates the configuration to mobile node MN2 and MN4. Upon receiving the communication from the controller, the mobile nodes switch to the new link characteristics of Link L1 and initiate communication amongst each other. In one embodiment, each of the mobile nodes MN2 and MN4 continues to cooperate in command and control communications with the controller over the original link while carrying out the communications amongst themselves. Upon the completion of the transfer, the mobile nodes MN2 and MN4 may cooperate with the controller to rejoin the original member group at the group channel, or otherwise continue to operate as an independent segregated group.

Figure 14B:
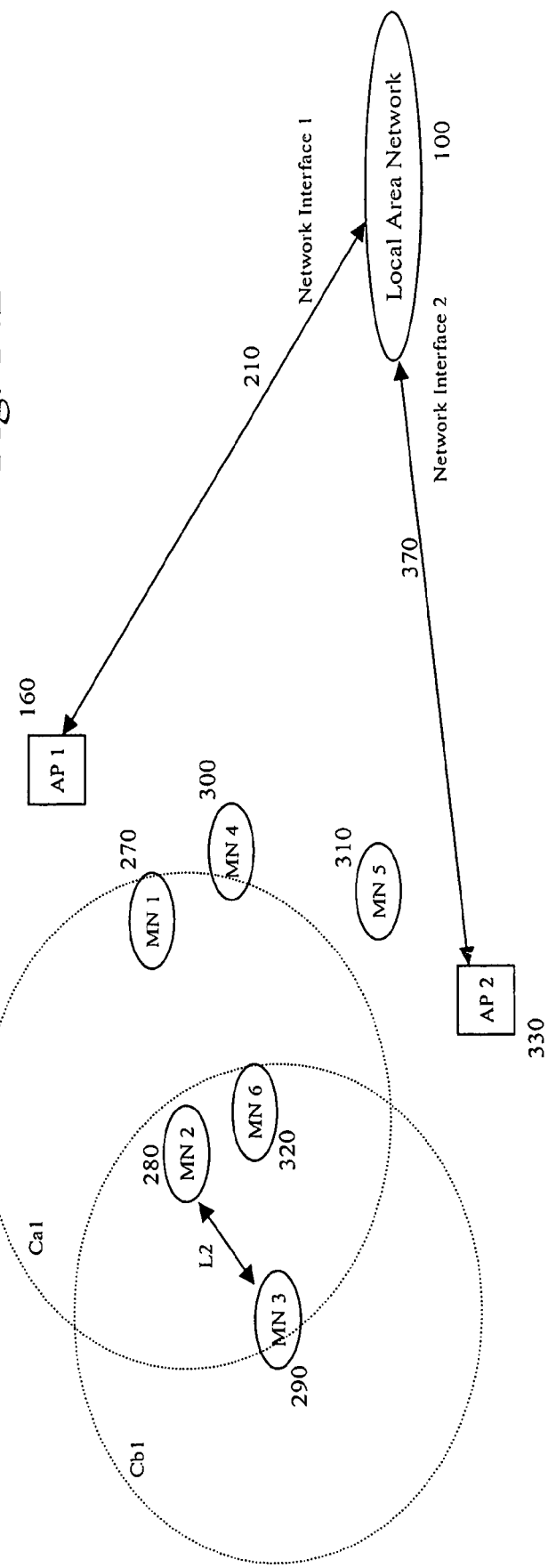

As shown in FIG. 14A, the exemplary wireless network includes one or more intelligent mobile nodes, namely MN1, MN2, MN3, MN4, MN5, MN6, and a pair of intelligent access points AP1 and AP2. The wireless network for FIG. 14B is connected to the LAN (100) through the intelligent access points AP1 by ways of a wired link network interface 1 (210) and AP2 by ways of a wired link network interface 2 (370). Similar to the configuration of FIG. 14A, MN2 (280) requests a link from the controller to communicate with MN3 (290). The controller elects to utilize the link L2 and form a segregated group with members MN2 (280) and MN3 (290) and sends the required command and control information to both MN2 (280) and MN3 (290). MN2 (280) and MN3 (290) adjust the required parameters to establish the communications link L2 to initiate communication amongst each other. FIG. 14B illustrates a need for communication between MN2 to MN3, while FIG. 14A illustrates a need for communication between MN2 (280) and MN4 (300).

FIG. 14B further illustrates a circle Cb1 about MN3 that outlines the region of coverage about MN3 with the highest bandwidth capability of 54 mbps. The region Cb1 incorporates MN2 (280), MN3 (290) and MN6 (320). Furthermore, FIG. 14B illustrates a circle Ca1 about MN2 that outlines the area of coverage about MN3 with the highest bandwidth capability of 54 mbps. The region Ca1 incorporates MN2 (280), MN3 (290), MN6 (320), MN1 (270), and MN4 (300). In one embodiment, the intelligent nodes may adjust transmission power to increase or decrease range, or radii, of the circles Ca1 and Cb1. The controller cooperates with one or more intelligent mobile nodes to adjust power levels to mitigate any unnecessary interference between the intelligent controllers.

In one embodiment, multiple links may be established in cooperation with the controller to form multiple member groups. The first group may include MN2 and MN4 utilizing link L1 from FIG. 14A. The second group may include MN2 and MN3 utilizing link L2, and the remaining MN6, MN1, and MN5 utilizing the original link. The three subgroups may intercommunicate within their group members without the potential of interference from other member groups. In certain embodiments of the invention, the system includes of intelligent nodes with single radio capability. In such an embodiment, the intelligent nodes may belong to multiple groups, but due to the limitation of a single radio, they may only be active within one group at a time. In such an embodiment, MN2 of FIG. 14B multiplexes between link L1, L2 and the original link on a repetitive basis. In an alternative embodiment, the system includes of intelligent nodes with multiple radio capability, where two or more simultaneous channels are available for communications from a given mobile node. In one embodiment, the intelligent nodes may belong to multiple groups and each of these groups may intercommunicate on a separate link simultaneously. In one embodiment, MN2 of FIG. 14B utilizes channel 1 for the original link, channel 2 for link L1, and channel 3 for link L2. In such an exemplary network, the system has the capability of providing cut through forwarding between the member group (MN2, MN3) and (MN2, MN4).

Figure 14C:
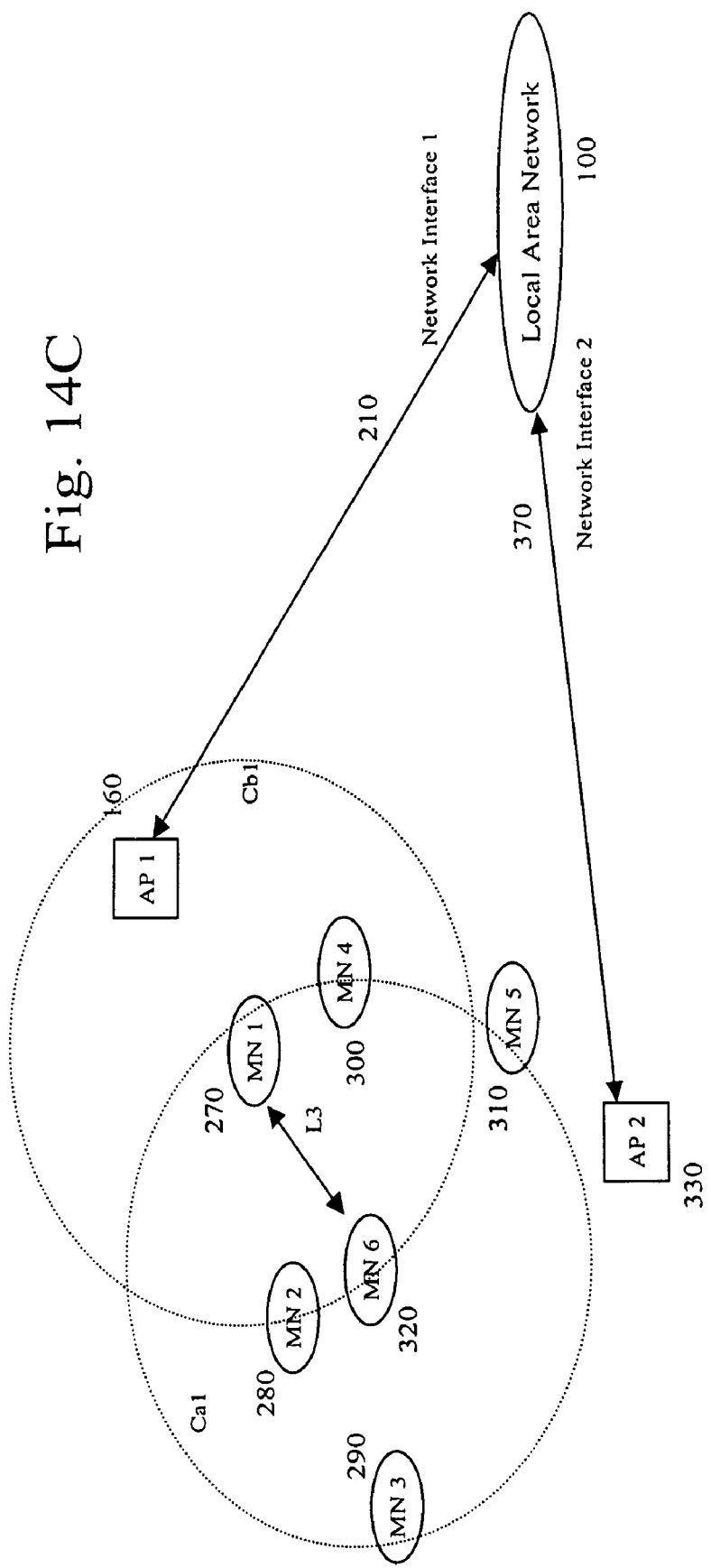

FIG. 14C illustrates another exemplary communication link request between mobile node MN1 (270) and mobile node MN6 (320). Mobile node MN1 (270) makes a request for communication with MN6 in cooperation with the controller. The controller elects to enable communication between MN1 and MN6 utilizing communication link L3. As described above with respect to FIGS. 14A and 14B, MN1 and MN6 in cooperation with the controller segregate to form a separate group membership to establish the communication link L3. The controller may elect to either enable communication within the original group membership using the original channel or elect to have the nodes involved in the communication transition to form a new group membership at a new channel. Furthermore, the new group membership may include MN1 and MN6, or otherwise it may include additional mobile nodes based on one or more factors such as the class or quality of service.

In one embodiment, a non-blocking wireless network is provided that reduces latency, increases capacity and improves performance. It is further advantageous in that it provides a ways for the network to achieve better real-time performance.

Figure 14D:
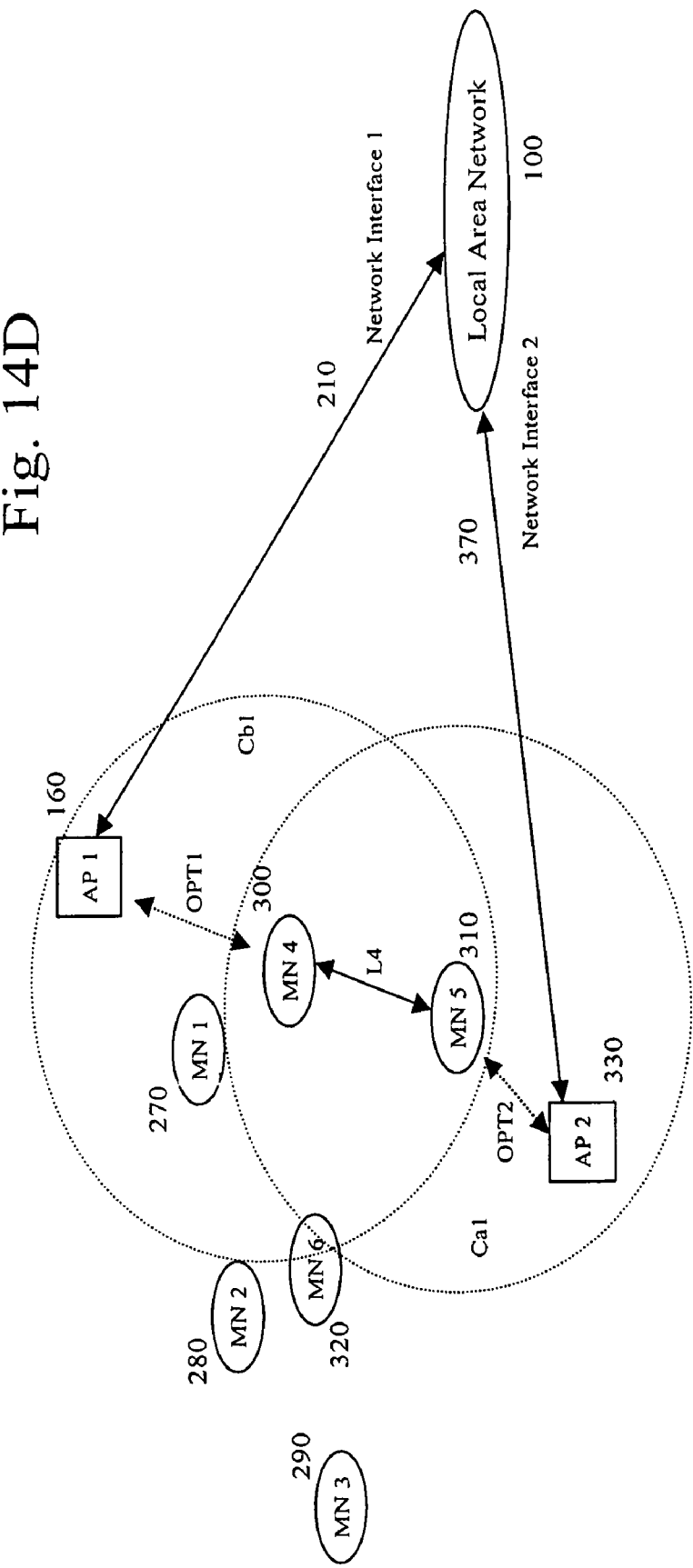

FIG. 14D illustrates the communication link request of the intelligent mobile node MN4 (300) in establishing a connection with MN5 (310). FIG. 14D further illustrates a circle Cb1 centered about MN4 (300) indicating the range where MN4 is able to have maximum bandwidth, namely 54 mbps. FIG. 14D further illustrates a circle Ca1 centered about MN5 (310) indicating the range where MN5 is able to have maximum bandwidth, namely 54 mbps. Once the controller receives the request from intelligent mobile node MN4 (300) across the LAN (100), the controller analyzes the request and determines there are two primary routes available for communications. Firstly, MN4 to AP1, to network interface 1, across the LAN (100), to network interface 2 (370), to AP2 (330), and finally to MN5 (310), or alternatively, a direct path between MN4 to MN5 using communications link L4. The controller takes into account the condition of the current traffic at the AP's and the LAN in view of the class and quality of service and elects to utilize a dedicated communications link L4 for the communication. Alternatively, if the requirements of the transaction request were not too demanding, the controller may elect to utilize the route across the LAN, and potentially reserve the communication link L4 for an alternative future transaction that may have more demanding requirements.

Figure 14E:
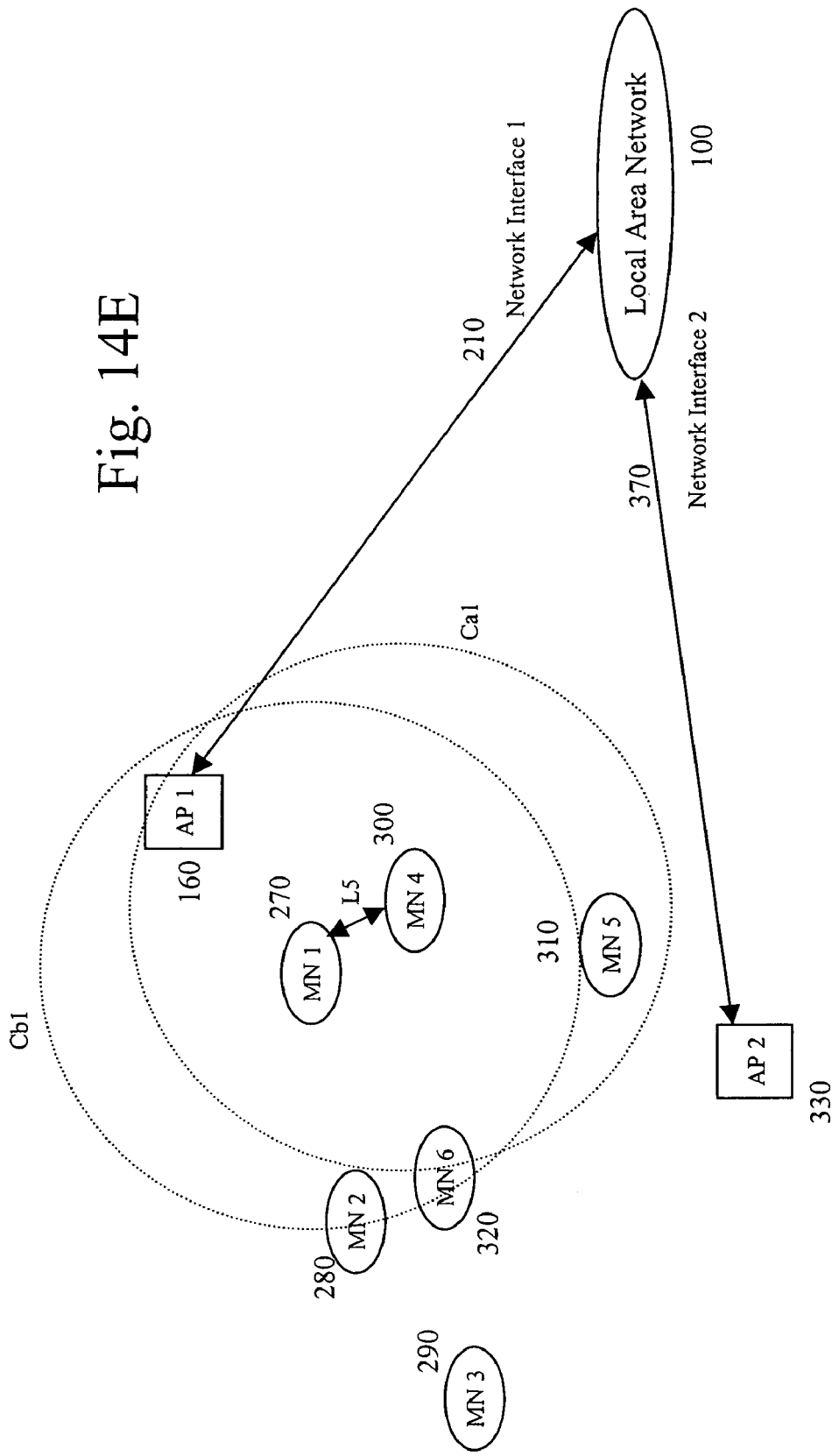

FIG. 14E illustrates the communication link request of the intelligent mobile node MN1 (270), in cooperation with the controller, in establishing a connection with MN4 (300). In the exemplary network of FIG. 14E, the controller has three primary route options. Firstly, the controller may elect to utilize a direct link between MN1 and MN4, namely communication link L5. Secondly, the controller may elect to utilize AP1 (160) to relay the information from MN1 to MN4. Alternatively, the controller may elect to have AP1 simply act as a bridge for transferring the connection from MN1 to the LAN and have the LAN relay it back to AP1 to complete the connection with MN4. As illustrated in FIG. 14E the circle Ca1 centered about MN4 illustrates all the above routes can be enabled at the peak performance of the network at 54 mbps. However, a direct connection will result in a full duplex capacity, while the others will require forwarding, thus only achieve a half duplex capacity. Furthermore, the use of the AP1 would restrict any other mobile nodes from gaining access to the resource. The controller may elect to use any of the routes available to carry out the transaction, based in the network wide requirements of the alternatives. In the exemplary network of FIG. 14E the controller elects to utilize the communications link L5 for the transaction.

Exemplary Channel Allocation Mechanisms

Figure 15:
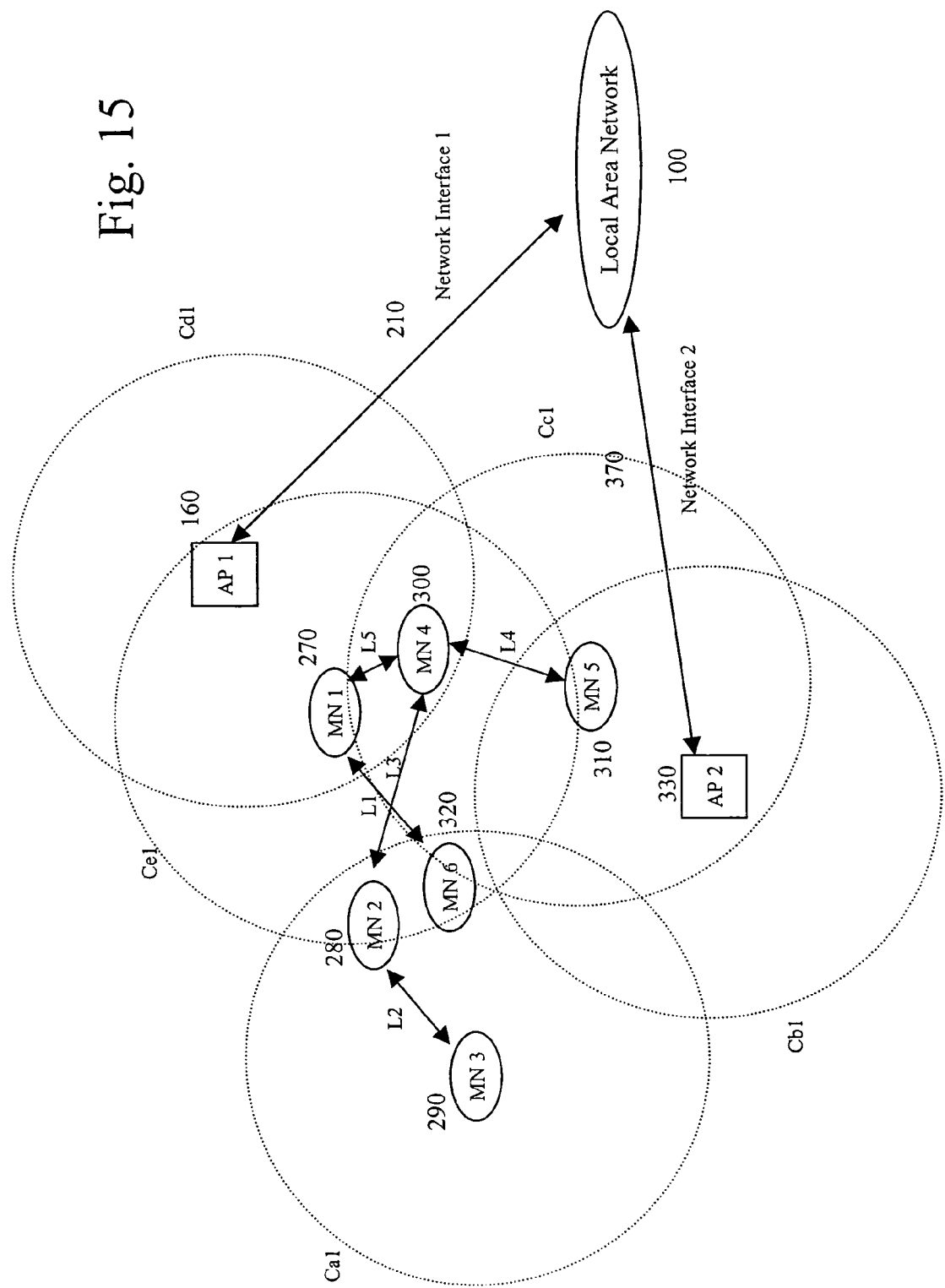
FIG. 15 is a diagram of a real-time wireless link allocation (L1-L5) within the scalable wireless network architecture.

In one embodiment, allocation of multiple links simultaneously may be performed within the wireless network. FIG. 15 is a diagram illustrating an exemplary mechanism for allocating channels according to one embodiment. FIG. 15 illustrates the real-time channel allocation mechanism, where an intelligent node may communicate with another intelligent component, such an intelligent node, on a given channel, such as link 6. The intelligent node may then be required to switch in real-time to another channel to initiate communication with another required node. FIG. 15 further illustrates that multiple channels for communication such as link 4, link 3, and link 5 at mobile node MN4 (300) may be supported. The intelligent node may utilize one of the channels to communicate with one intelligent component, such as another mobile node. Furthermore, one of the other channels may be utilized for communication with other required mobile nodes. FIG. 15 further illustrates that such a mechanism is used by other intelligent components for interrupting the data channel, such as link 3 at mobile node MN4 (300), in case of a higher priority arbitration request.

In the exemplary network of FIG. 15, the system utilizes a separate channel residing on link 6 as the command and control channel. All mobile nodes MN1, MN2, MN3, MN4, MN5, and MN6 in cooperation with the local area network have elected to use link 6 for strictly a command and control channel. Each of the intelligent components will concurrently maintain a connection with each other on link 6 while communicating information the data transaction over another link.

FIG. 15 illustrates that LAN (100) has the connectivity to access point AP1 (160) through network interface 1 (210), as well as connectivity to access point AP2 (330) through network interface 2 (370). Each of the access points provides an alternative ways for communicating between certain mobile nodes through the LAN (100). FIG. 15 further illustrates the range of coverage of MN3 (290), AP2 (330), MN5 (310), AP1 (160), and MN1 (270), namely Ca1, Cb1, Cc1, Cd1, and Ce1, respectively. As shown in FIG. 15, these regions overlap and provide a generally complete region of coverage at the highest exemplary network bandwidth, namely 54 mbps. The range circles about MN2 (280), MN6 (320) and MN4 (300) have not been illustrated for ease of readability, however, it will be appreciated that each of the mobile nodes has the capability of participating in a given communication. As shown in FIG. 15, interference issues between mobile nodes is a concern. Advanced power management is provided to mitigate the effect of interference between mobile nodes.

FIG. 15 further illustrates the simultaneous ability of a given node to communicate on multiple of channels. In the exemplary network of FIG. 15 mobile node MN2 (280) has the capability of simultaneously utilizing at least two data channels to communicate with MN3 and MN4, namely link L2 and link L3 respectively. In one embodiment, the communication can occur either simultaneously or in a round robin fashion, where the mobile node takes turns rotating through the channels one at a time. In such an embodiment, mobile node MN2 may alternate between tuning to the channel for link L2 and then switching to an alternative channel for link L3. Each of the nodes illustrated in FIG. 15 has the ability of simultaneously communicating on multiple channels either in a concurrent manner, a scheduled manner or in an arbitrated manner.

The communication channel link L6 used for command and control is not explicitly illustrated in FIG. 15. However even mobile nodes only outlining a single data link in FIG. 15, such as mobile node MN6 (320), are simultaneously intercommunicating on the command and control channel link L6 and the given data channel. Mobile node MN1 (270) has the capability of simultaneously utilizing at least three communication channels, namely link L6 for the command and control link, link L1 for the data communication with MN6 (320), and finally link L5 for data communication with MN4 (300).

In one embodiment, mobile node MN2 (280) has the capability of simultaneously utilizing at least three communication channels, namely Link L6 for the command and control link, L2 for the data communication with MN3, and L3 for the data communication with MN4.

Mobile node MN3 (290) may establish at least two communications channels, namely link L6 for the command and control link, link L2 for the data communication with MN2 (280).

Mobile node MN4 (300) may establish at least four communication channels, namely link L6 for the command and control link, link L3 for the data communication with MN2 (280), link L5 for the data communication with MN1 (270), and finally link L4 for the data communication with MN5 (310).

Mobile node MN5 (310) may establish at least two communications channels, namely link 6 for the command and control link, and link L4 for the data communication with MN4 (300). Mobile node MN6 (320) may establish at least two communications channels, namely link 6 for the command and control link, and link L1 for the data communication with MN1 (270). Note that the above configurations are described for purposes of illustration only. Various configurations may exist.

In one embodiment, the physical characteristics may be switched in real-time for a given communications link, such as the frequency of usage, bandwidth, quality of service, transmission power, receiver sensitivity, among others. In one embodiment, a given group member may be associated with a given link to have a time value, where the link association can be established on one or more time related parameters, such as transactional use, temporary time expired basis, a rotating basis, on a static basis, among others. Thus, the link association with a specific member group can be adjusted in real-time.

It is advantageous in that the network has the ability of intercommunicating by use of the command and control channel for all the management needs of the network rather than fragmenting the control within the data channel. This approach is further advantageous in that a request for communication can occur in advance of the actual data transaction and the network can select an optimal path to honor the request and queue the pending transactions. In contrast, traditional wireless networks only operate on a given current pending transaction. The current networks have either very poor or no mechanisms at all for anticipating any future state of the network, and thus have no basis for postponing a potential transaction. In such a traditional network, queuing transactions has no meaning, transactions are either granted or denied. In one embodiment, a given transaction may be contemplated, and scheduled for a future transmission. Multiple transactions may be queued at a given mobile node for delivery based on the requirements of the service. In one embodiment, a given island of mobile nodes may intercommunicate with another island of mobile nodes across the local area network, to cooperate in scheduling and queuing communication transactions.

Figure 16:
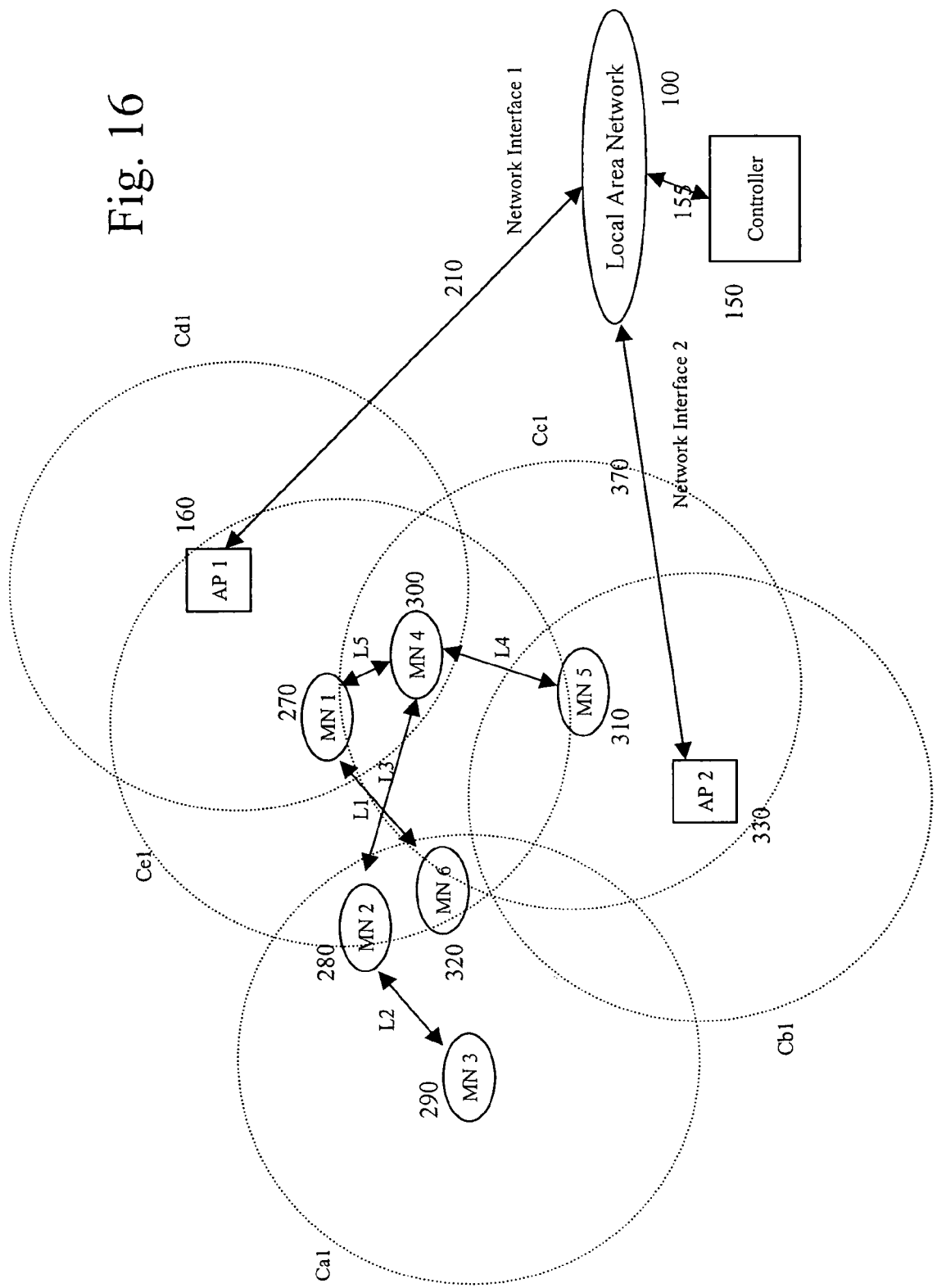
FIG. 16 is a diagram of a controller based real-time wireless link (L1-L5) allocation within the scalable wireless network architecture.

According to one embodiment, an intelligent controller (150) may participate in the command and control decisions of the wireless network. FIG. 16 is a diagram illustrating an exemplary wireless network configuration according to one embodiment. The controller (150) in FIG. 16 is interconnected to the LAN (100) through a wired link (155). The LAN in-turn is interconnected to the mobile nodes MN1 through MN6 by way of intelligent access points AP1 (160) and AP2 (330) through network interface 1 (210) and network interface 2 (370), respectively. The intelligent access points in cooperation with the intelligent mobile nodes form a contiguous region of coverage with the highest exemplary bandwidth of 54 mbps.

In one embodiment, an intelligent controller (150) may reside within the local area network, to support the command and control requirements of the wireless network. While FIG. 15 illustrates the ability of the intelligent components to cooperate in each other in optimizing the behavior of the wireless network, FIG. 16 illustrates the ability of the intelligent components to cooperate with one or more controllers to optimize the behavior of the wireless network.

In one embodiment, the controller cooperates with the mobile nodes in accumulating information regarding the transactions of the given mobile nodes and the current state of the wireless network. This data is gathered and analyzed by the controller (150). The mobile nodes cooperate with the controller to help gather and report the required information. The controller then proceeds to analyze the global perspective of the network and set the policies for individual mobile nodes, such as frequency usage, power usage, and channel usage. The controller may further cooperate with the mobile nodes on a transactional basis to optimize the network behavior. The centralized controller is advantageous in that the resource requirements the mobile nodes are mitigated. The controller may have computationally intensive requirements such as the complex nature of route selection. The centralized controller enables an architecture that utilizes lower cost mobile nodes and access points, and shares the more expensive computational resources at the centralized controller rather than requiring the individual intelligent components to have their own expensive computational resources.

Figure 17:
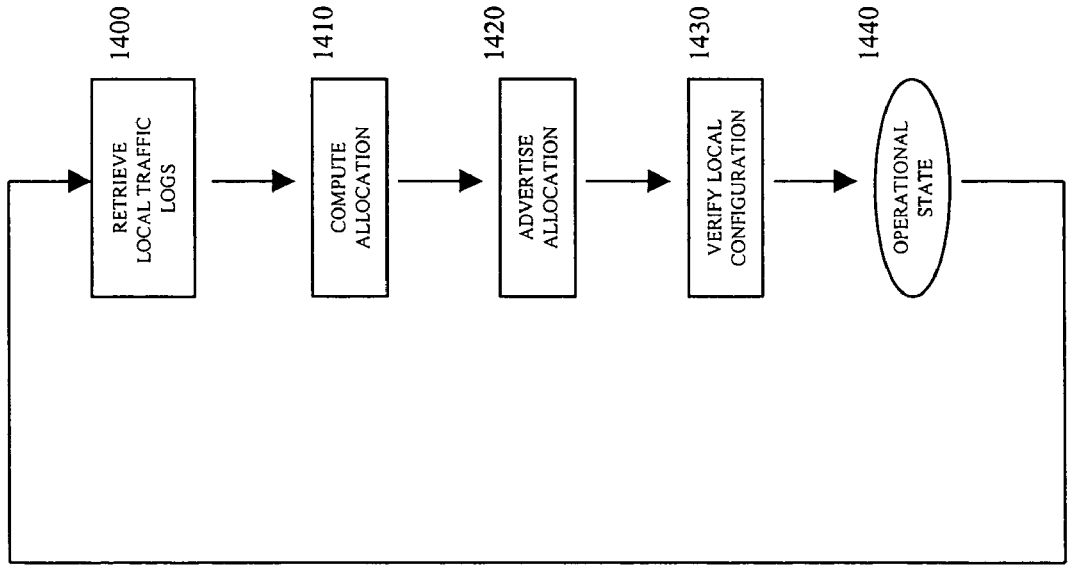
FIG. 17 is a flow diagram of an exemplary controller based real-time cell allocation.

FIG. 17 is a flow diagram illustrating an exemplary real-time channel allocation according to one embodiment. Exemplary process may be performed by a processing logic that may comprise hardware (circuitry, dedicated logic, etc.), software (such as is run on a dedicated machine), or a combination of both. The flow diagram illustrated in FIG. 17 is within the execution path of an intelligent controller. Once the controller has completed the general initialization requirements of the system and is in an operational mode, the controller may execute the operations of FIG. 17 from time to time. The intelligent controller may retrieve the local logs and other information from the individual intelligent access points within the wireless network in the state retrieve local traffic logs (1400). The system can be configured so that the information is either polled from the individual intelligent nodes, or otherwise the intelligent nodes are configured to independently send the information from time to time.

Once the information has been gathered in the retrieve local traffic logs (1400), the system proceeds to the compute allocation (1410) state. In the compute allocation (1410) state, the system computes the routes and the bandwidth usage requirements. The system then attempts to balance the current outstanding needs of the network and the system further attempts to anticipate the future needs of the system. Certain applications such as voice or video streaming require continuous resources. The system may analyze the traffic logs and forecast the likely streaming requirements of the network in the near future. The system may compute the channel allocations for the intelligent components in anticipation of a potential future congestion event. Based on the condition of the network, the system may elect to re-allocate a previously allocated channel in a different manner. The aggregation of traffic information from multiple intelligent nodes gives the system a network wide scope rather than just a single node perspective and subsequently the system is able to better optimize the network.

Once the system has computed the channel allocation in the state compute allocation (1410), the system proceeds to advertise allocation (1420). In the advertise allocation (1420) state, the system informs all the nodes that require new information regarding the new channel allocation. Once the system has advertised the new allocation scheme, the network is optimized.

After advertise allocation (1420) state, the system proceeds to verify local configuration (1430). The system does not just rely on network error conditions to report the failure of advertising the channel allocation. Rather, the system proactively queries all the nodes to verify if the advertised allocation has been established. Any failure in verification leads to re-advertising the failed allocation. Once the system has verified that the allocation across the network has been established, the system then proceeds to an operational state. The system may repeat the operations of FIG. 17 from time to time as required by the configuration and the state of the network. FIG. 17 is simply an exemplary flow diagram in regards to channel allocation within the present invention. However, other parameters such as power usage also follow a similar flow diagram.

Figure 18:
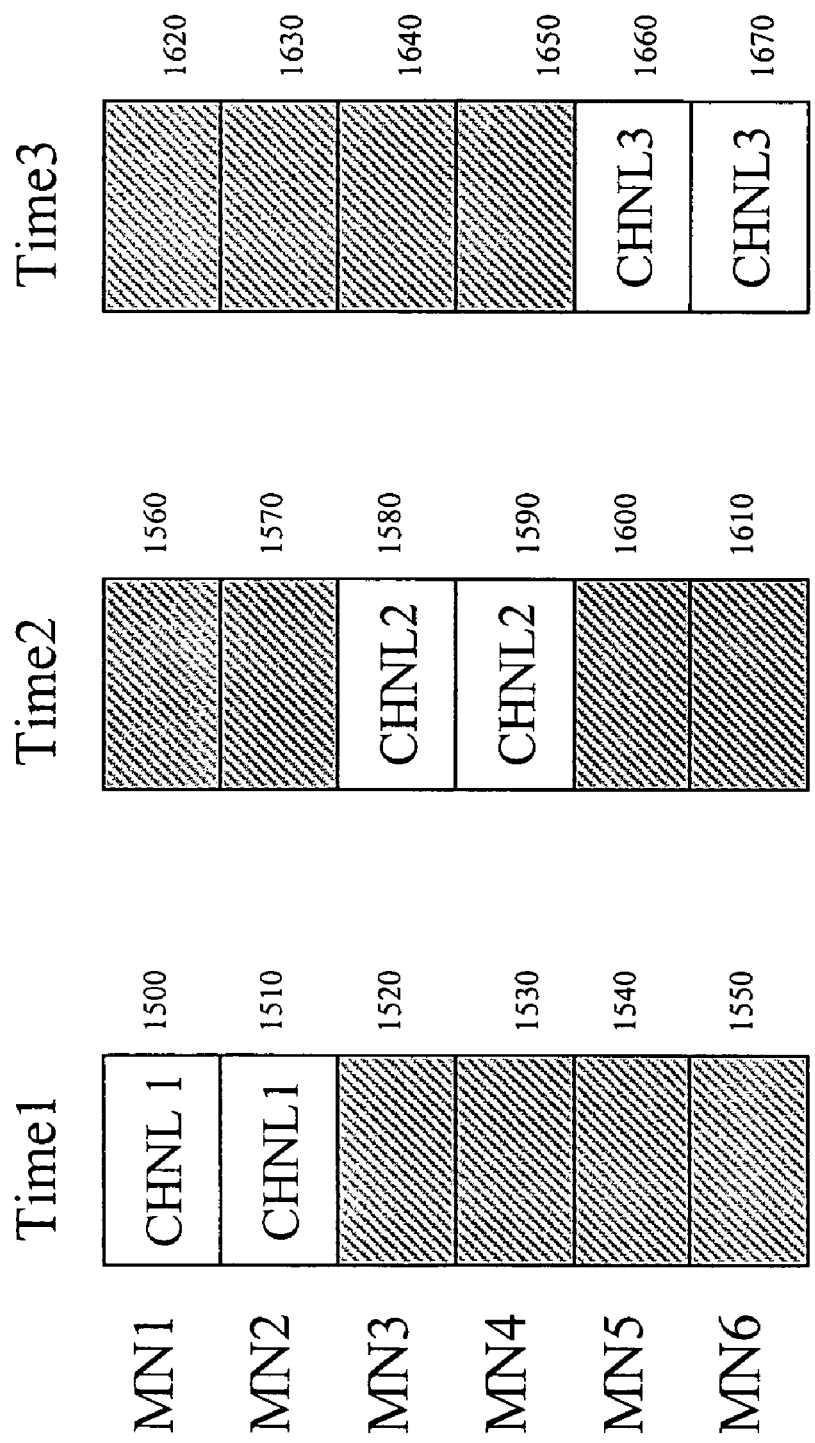
FIG. 18 is an exemplary channel usage diagram within the scalable wireless network architecture.

FIG. 18 is a diagram illustrating an exemplary channel usage according to one embodiment. The term channel is referred to as a fixed physical central RF frequency with an associated RF bandwidth that is utilized for a single communication from a given transmitter to a given receiver. Generally, a given wireless band includes muleiple channels that are used to establish communications among the mobile nodes. Traditional infrastructure network and ad-hoc networks generally select a given channel for communications and all the mobile nodes within the domain of the transmitting node tune to the given channel for inter-communication. Once a communication link is established, the mobile nodes continue to operate on the link at the given channel. Some traditional wireless networks, such as 802.11b, have the capability that in case of interference, the transmitting node may elect a different channel. Generally channel selection is a static process or at best based on a pre-defined protocol.

FIG. 18 illustrates a mechanism of real-time channel allocation for a simple case of point-to-point communication between MN1 and MN2, MN3 and MN4 and finally MN5 and MN6. For the sake of simplicity, it is assumed that the transactional communication needs are short in nature and requests are made sparsely. Further upon receiving the requests, the controller has elected to utilize channel 1 for communication from MN1 to MN2, channel 2 for communication between MN3 to MN4 and finally channel 3 for communication between MN5 to MN6.

FIG. 18 illustrates that at Time1 a request from MN1 was made to the controller for establishing a link L1. The controller elected to use channel 1 (1500 & 1510) for establishing link L1. The controller may make a physical association between given mobile nodes and the channel used for communication. FIG. 18 further illustrates that while channel 1 (1500) is being utilized for communication, no other links are active at this time and mobile nodes MN3 (1520), MN4 (1530), MN5 (1540) and MN6 (1550) are in an idle mode.

At Time2, mobile node MN3 (1580) makes a request to the controller for establishing a link L2. The controller elects to use channel 2 (1580 and 1590) for establishing link L2. FIG. 18 further illustrates that while channel 2 (1580) is being utilized for communication, no other links are active at this time and mobile nodes MN1 (1560), MN2 (1570), MN5 (1600), and MN6 (1610) are in an idle mode.

At Time3, mobile node MN5 (1660) makes a request to the controller for establishing a link L3. The controller elects to use channel 3 (1660 and 1670) for establishing link L3. FIG. 18 further illustrates that while channel 2 (1580) is being utilized for communication, no other links are active at this time and mobile nodes MN1 (1620), MN2 (1630), MN3 (1640), and MN4 (1650) are in an idle mode.

Referring to FIG. 18, the controller utilizes the real-time allocation based on a physical association or a schedule basis. Schedule allocation is exemplified when at Time2 mobile node MN5 (1600) had made the communication request rather than mobile node MN3 (1580) that the channel 2 would have been assigned to the link between MN5 and MN6. Physical association allocation is exemplified when at Time2 mobile node MN5 (1600) had made the communication request rather than mobile node MN3 (1580), where channel 3 would have been assigned to the link between MN5 and MN6. The controller uses one or more parameters to determine and optimize channel usage, such as group members, order of request, and bandwidth requirements, among others.

Once a channel has been allocated to a link, the mobile nodes are free to carry out the communication as negotiated in cooperation with the intelligent controller. The controller may enforce policy violations by either interrupting the violating nodes, or otherwise refusing a future communication request of the violating nodes.

Figure 19:
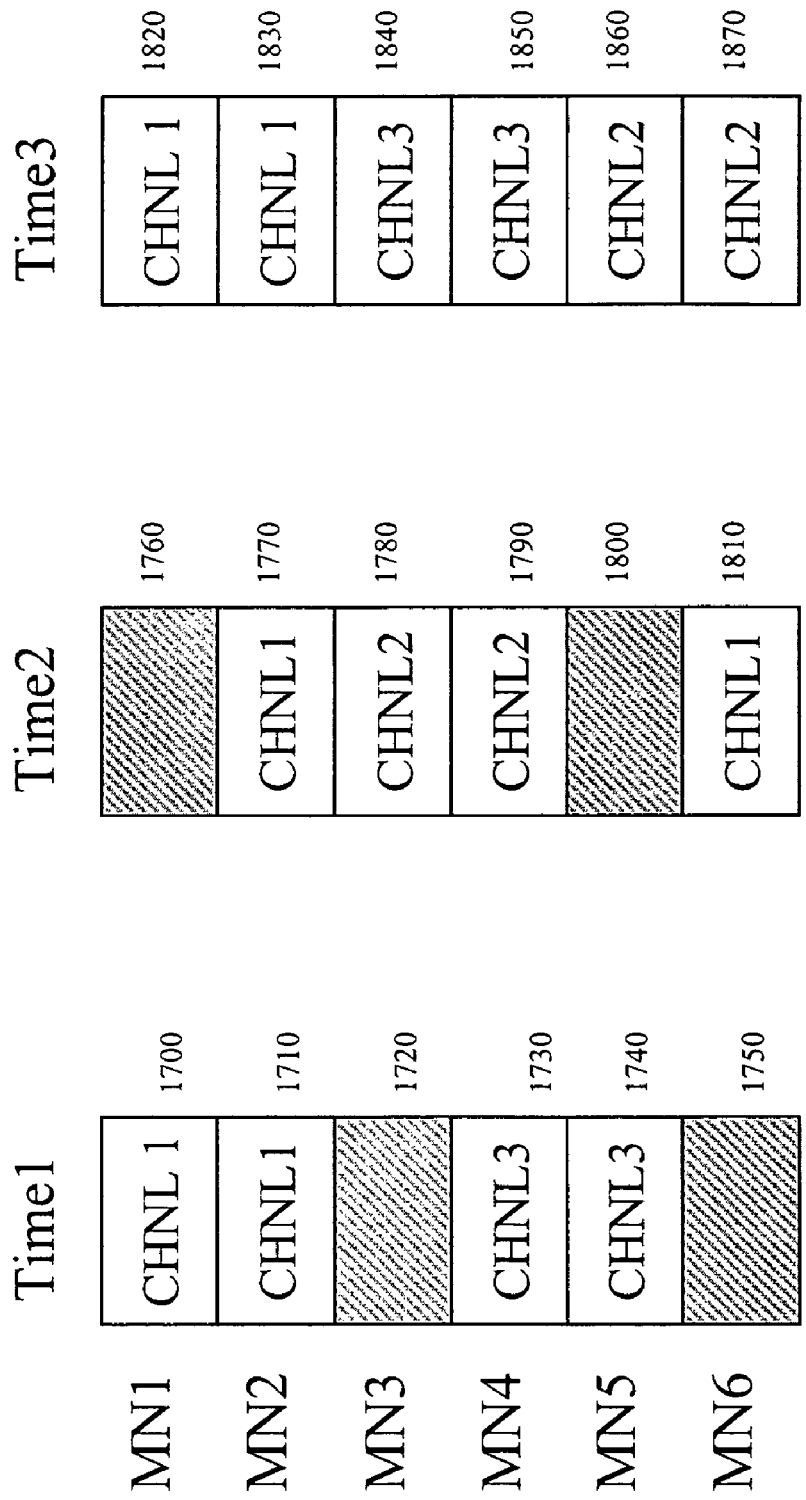
FIG. 19 is an exemplary switched real-time channel usage diagram within the scalable wireless network architecture.

FIG. 19 is a diagram illustrating an exemplary channel allocation according to another embodiment. In this embodiment, switched real-time channel allocation is supported. FIG. 18 illustrated a physical allocation or a schedule allocation between the channel used and the mobile nodes used for communication. As seen in FIG. 18, MN1 and MN2 communicate on channel 1 and will carry out all their communication on that channel. In traditional networks, channels are allocated on a relatively static basis, such as physical allocation. The traditional channel allocation mechanisms generally do not have any regard for, or the knowledge of, the information being exchanged.

FIG. 19 illustrates a real-time traffic aware allocation mechanism, where channel usage is further based on the information being exchanged, such as traffic type, class of service, quality of service, network congestion conditions, or other parameters that relate to the character of the information about to be exchanged rather than static parameters such as a fixed link bandwidth. For example, channel 1 may be used for voice traffic, while channel 3 is used for video traffic. Such an exemplary configuration of the network is advantageous in that the reservation of the bandwidth is based on a real-time condition rather than a static worst-case condition. Generally voice traffic requires very low latency and jitter, however, the bit rate does not need to be very high. In contrast, video traffic such as video on demand is less sensitive to the latency and jitter conditions, but requires very high bandwidth. A single mobile node that utilizes both kinds of traffic, will require the network to support low latency, low jitter and high-bandwidth. In an exemplary real-time allocation scenario, if a mobile node negotiates a connection with an access point, it will request an allocation of a low bit rate channel for voice traffic, leaving other mobile nodes to get a chance to request the use of other channels. Once the need arises for high bit rate, the mobile node may request a high bit rate channel, but the jitter and latency requirements will be more relaxed.

In one embodiment, the mobile node and access point may maintain reserved connections requirements of the connections already underway. In a exemplary scenario of an access point with ingress based policy control, when the mobile node informs the access point that it needs to establish a voice connection, the access point may interrogate all the connections that have already been established and the network conditions in terms of traffic congestion. If the access point has the capacity to carry the new voice traffic, it may allocate a channel to the new connection, and inform the mobile node what channel to use.

FIG. 19 illustrates that at Time1 a request from MN1 was made to the controller for establishing a link L1. The controller elects to use channel 1 (1700 and 1710) for establishing link L1. FIG. 19 further illustrates that while channel 1 (1700) is being utilized for communication, MN4 also made a request to the controller for establishing a link L3. The controller elects to use channel 3 (1730 and 1740) for establishing link L3. MN3 (1720) and MN6 (1750) are in an idle mode.

At Time2, mobile node MN2 (1770) makes a request to the controller for establishing link L1. The controller elects to use channel 1 (1770 and 1810) for establishing link L1. FIG. 19 further illustrates that at time2 while channel 1 (1770) is being utilized for communication, MN3 also made a request to the controller for establishing link L2. The controller elects to use channel 2 (1780 and 1790) for establishing link L2. MN1 (1760) and MN5 (1800) are in an idle mode.

At Time3, mobile node MN1 (1820) makes a request to the controller for establishing link L1. The controller elects to use channel (1820 and 1830) for establishing link L1. FIG. 19 further illustrates that at Time3 while channel 1 (1820) is being utilized for communications, MN3 also made a request to the controller for establishing link L3. The controller elects to use channel 3 (1840 and 1850) for establishing link L3. FIG. 19 further illustrates that at Time3 while channel 1 (1820) and channel3 (1840) are being utilized for communications, MN5 also made a request to the controller for establishing link L2. The controller elects to use channel 2 (1860 and 1870) for establishing link L2.

In one embodiment, the requesting nodes may switch between multiple channels for establishing communications based on real-time network conditions. FIG. 19 further illustrates the ability that a given controller may cooperate with the intelligent mobile nodes to optimize the channels in a given wireless network. Thus in FIG. 19, at Time3 the communication request by MN3 to establish linkL3 may be allocated to channel 2 based on the anticipated condition of the network and the history of the transacting nodes.

In one embodiment, the controller utilizes network transactions in optimizing the anticipated behavior of the network. The controller may utilize previous transactional history to aid in optimizing the anticipated behavior of the network. In this embodiment, the controller in cooperation with the access points can maintain a history of the traffic statistic for the respective mobile nodes and the access points. The controller utilizes the previous history of the transaction statistics for the respective mobile nodes or can simply utilize a system wide default parameters based on the service being requested. In such a real-time allocation, if the system grants a video on demand request, and further determines that the access point being utilized would require additional voice circuits, it can then preemptively have all data traffic be routed using mobile node to mobile node relaying rather than grant short term data packet to only refuse a voice connection later. The network is optimized using transactional history to predict what the likely requirements will continue to be over a near term, and then take preemptive action before a congestion condition occurs. This is especially advantageous when real-time streams of multi service such as voice calls or video streams are involved due to the persistent nature of these events. When a voice call is initiated, the user is anticipated to continue to utilize the connection for a period of time such as a few minutes, this anticipatory information can be utilized to preemptively optimize the network. Similarly, when a user initiates a video on demand or a broadcast video stream, it is highly likely that this type of traffic will last several minutes. The segregated command and control from the data traffic of the present invention further provides the ways for queuing of transactions.

FIG. 20 is a diagram illustrating an exemplary channel usage according to another embodiment of the invention. In this embodiment, simultaneous real-time channel allocation may be supported. FIG. 18 and FIG. 19 illustrated a physical allocation, schedule allocation, or a transactional real-time allocation between the channel used and the mobile nodes used for communication.

As shown in FIG. 18, allocation of channel is exemplified on a relatively static basis, such as physical allocation or schedule allocation. As further seen in FIG. 19, allocation of channel is exemplified on a real-time switched basis, such as transactional allocation. FIG. 20 alternatively exemplifies a simultaneous real-time traffic aware allocation mechanism, where multiple channel usage at a given intelligent component is possible. For example, mobile node MN2 (2030) at Time3 is simultaneously communication on channel 1 and channel 3.

FIG. 20 illustrates that at Time1 a request from MN1 was made to the controller for establishing a link L1. The controller elects to use channel 1 (1900 and 1910) for establishing link L1. FIG. 20 further illustrates that while channel 1 (1900) is being utilized for communication, MN4 also made a request to the controller for establishing a link L3. The controller elects to use channel 3 (1930 and 1940) for establishing link L3. MN3 (1920) and MN6 (1950) are in an idle mode.

At Time2, mobile node MN2 (1970) makes a request to the controller for establishing link L1. The controller elects to use channel 1 (1970 and 2010) for establishing link L1. FIG. 20 further illustrates that at Time2 while channel 1 (1970) is being utilized for communication, MN3 also made a request to the controller for establishing link L2. The controller elects to use channel 2 (1980 and 1990) for establishing link L2. MN1 (1960) and MN5 (2000) are in an idle mode.

At Time3, mobile node MN1 (2020) makes a request to the controller for establishing link L1. The controller elects to use channel1 (2020 and 2030) for establishing link L1. FIG. 20 further illustrates that at time3 while channel 1 (2020) is being utilized for communications, MN3 also made a request to the controller for establishing link L3. The controller elects to use channel 3 (2040 and 2030) for establishing link L3. The link L3 request made by the mobile node MN3 is to communicate to mobile node MN2 (2030). However, MN2 is already in midst of a communication transaction with MN1 (2020). Accordingly, multiple communications links may be established for a given mobile node. Subsequently the controller may allocate any channel other than channel 1 for the transaction.

FIG. 20 further illustrates that at Time3 while channel 1 (2020) and channel3 (2040) are being utilized for communications, MN5 also made a request to the controller for establishing link L2. The controller elects to use channel 2 (2060 and 2070) for establishing link L2. FIG. 20 illustrates the ways and mechanisms that a given mobile node may simultaneous communicate with the other nodes.

FIG. 20 further illustrates the mechanism wherein at Time3 the communication request by MN3 to establish link3 to MN2 may have been allocated for the purpose of eventual forwarding by mobile node MN2 to another mobile node, such as mobile node MN4. Such a mechanism illustrates the use of the additional channels as a general pool of network resources rather than just a dedicated resource for the benefit of the intelligent component itself.

According to one embodiment, the controller utilizes network transactions in optimizing the anticipated behavior of the network. The controller may utilize previous transactional history to aid in optimizing the anticipated behavior of the network. In one embodiment, the controller in cooperation with the access points can maintain a history of the traffic statistic for the respective mobile nodes and the access points. The controller utilizes the previous history of the transaction statistics for the respective mobile nodes or can simply utilize a system wide default parameters based on the service being requested. In such a real-time allocation if the system grants a video on demand request, and further determines that the access point being utilized would require additional voice circuits, it can then preemptively have all data traffic be routed using mobile node to mobile node relaying rather than grant short term data packet, to only refuse a voice connection later. The network is optimized using transactional history to predict what the likely requirements will continue to be over a near term, and then take preemptive action before a congestion condition occurs. This is especially advantageous when real-time streams of multi service such as voice calls or video streams are involved due to the persistent nature of these events. When a voice call is initiated, the user is anticipated to continue to utilize the connection for a period of time such as a few minutes, this anticipatory information can be utilized to preemptively optimize the network. Similarly when a user initiates a video on demand or a broadcast video stream, it is highly likely that this type of traffic will last several minutes. The segregated command and control from the data traffic of the present invention further provides the ways for queuing of transactions. The present invention thus has an advance notice of what is required in the near future to anticipate congestion, and preemptively circumvent it.

Thus, a wireless network having a real-time channel allocation has been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A network architecture, comprising:
    a plurality of access points coupled to a wired network, each of the access points being capable of communicating, over a wireless network, with one or more mobile nodes to receive a state of queues of packets that have not been received by the access point, and to utilize the state of queues as anticipated demands to determine whether required performance of the wireless network can be met; and
    a controller coupled to the access points over the wired network, the controller maintaining one or more parameters that control one or more characteristics of each of the access points, and the controller adjusting and communicating the one or more parameters to each of the access points in response to a detection of real-time conditions changed based on a respective packet type to be forwarded by each of the access points,
    wherein the controller periodically queries each of the access points regarding a status of a respective access point,
    the one or more parameters are adjusted based on the status collected from each of the access points,
    the respective packet type is determined based on a network wide identification that identifies a type of content within a respective packet, and
    the controller changes a class of service of a given subscriber in real-time based on the detection of real-time conditions changed,
    the controller allocates the channels to a plurality of mobile nodes that are capable of communicating with each other directly without passing through any of the access points, the controller allocates a first channel and a second channel to a first mobile node to allow the first mobile node to simultaneously communicate with a second mobile node via the first channel and forward data received via the second channel from a third mobile node to a fourth mobile node.

2. The network architecture of claim 1, wherein the controller is separated from the access points and is to centrally maintain and manage the one or more parameters on behalf of the access points.

3. The network architecture of claim 1, wherein each of the access points and the controller includes a storage element to store the one or more parameters.

4. The network architecture of claim 3, wherein the storage element is one of a semiconductor memory and a hard drive.

5. The network architecture of claim 1, wherein each of the access points and the controller includes a communication element to provide a communication link between one or more of the access points and the controller.

6. The network architecture of claim 5, wherein the communication element provides multiple communication links between each of the access points and the controller substantially concurrently.

7. The network architecture of claim 6, wherein the multiple communication links are used interchangeably dependent upon real-time network conditions detected by the controller.

8. The network architecture of claim 6, wherein the multiple communication links include at least one control and command channel and at least one data channel, wherein the at least one control and command channel is used to exchange control and command information, and wherein the at least one data channel is used to exchanged data separated from the at least one control and command channel.

9. The network architecture of claim 1, wherein each of the access points and controller includes a queuing element to store a list of pending data requests.

10. The network architecture of claim 7, wherein a behavior and priorities of the multiple communication links are changed dependent upon the real-time network conditions.

11. The network architecture of claim 10, wherein upon changing behavior and priority of a given communication links, transactions pending for the given communications link are reevaluated for queuing.

12. The network architecture of claim 7, wherein one of the communication links used for a given communication channel is changed dependent upon real-time network conditions detected by the controller.

13. The network architecture of claim 1, wherein a classification of subscribers, applications, and traffic is made in a group of elected class of service, and wherein subscribers, applications and traffic are aggregated in a group with similar requirements.

14. The network architecture of claim 13, wherein a given subscriber is a member of a plurality of elected classes of service based on applications and traffic types.

15. The network architecture of claim 13, wherein the controller utilizes the elected class of service to determine a behavior and priority of given traffic.

16. The network architecture of claim 13, wherein a membership of the elected class of service is changed dependent upon real-time network conditions detected by the controller.

17. The network architecture of claim 13, wherein a membership of the elected class of service determined based upon an identity of a subscriber.

18. The network architecture of claim 13, wherein a membership of the elected class of service is determined based upon a classification of packets in an application group based on packet types.

19. The network architecture of claim 13, wherein the controller utilizes the elected class of service to determine routing of a given packet.

20. The network architecture of claim 1, wherein the access points communicate with the mobile nodes over a communications channel in a secure and encrypted manner dependent on a class of service.

21. The network of claim 20, wherein a security mechanism used for a given channel changes from time to time.

22. The network architecture of claim 20, wherein a given communications channel is established using a plurality of security mechanisms.

23. A method, comprising:

maintaining within a controller one or more parameters that control one or more characteristics of a plurality of access points over a wired network, each of the plurality of access points being capable of communicating over a wireless network, with one or more mobile nodes to receive a state of queues of packets that have not been received by the access point, and to utilize the state of queues as anticipated demands to determine whether required performance of the wireless network can be met; and adjusting and communicating by the controller the one or more parameters to each of the plurality of access points in response to a detection of real-time conditions changed based on a respective packet type to be forwarded by each of the plurality of access points, wherein the controller periodically queries each of the plurality of access points regarding status of a respective access point, the one or more parameters are adjusted based on the status collected from each of the plurality of access points, the respective packet type is based on a network wide identification that identifies a type of content within a respective packet, and the controller changes a class of service of a given subscriber in real-time based on the detection of real-time conditions changed, the controller allocates the channels to a plurality of mobile nodes that are capable of communicating with each other directly without passing through any of the access points, the controller allocates a first channel and a second channel to a first mobile node to allow the first mobile node to simultaneously communicate with a second mobile node via the first channel and forward data received via the second channel from a third mobile node to a fourth mobile node.

24. An apparatus, comprising:

means for maintaining within a controller one or more parameters that control one or more characteristics of a plurality of access points over a wired network, each of the access points being capable of communicating over a wireless network, with one or more mobile nodes to receive a state of queues of packets that have not been received by the access point yet, and to utilize the state of queues as anticipated demands to determine whether required performance of the wireless network can be met; and means for adjusting and communicating by the controller the one or more parameters to each of the access points in response to a detection of real-time conditions changed based on a respective packet type to be forwarded by each of the plurality of access points, wherein the controller periodically queries each of the access points regarding status of a respective access point, the one or more parameters are adjusted based on the status collected from each of the access points, the respective packet type is based on a network wide identification that identifies a type of content within a respective packet, and the controller changes a class of service of a given subscriber in real-time based on the detection of real-time conditions changed, the controller allocates the channels to a plurality of mobile nodes that are capable of communicating with each other directly without passing through any of the access points, the controller allocates a first channel and a second channel to a first mobile node to allow the first mobile node to simultaneously communicate with a second mobile node via the first channel and forward data received via the second channel from a third mobile node to a fourth mobile node.

25. The network architecture of claim 1, wherein the detection of real-time conditions changed includes detection of a failed communication link between an access point and the controller.

26. The network architecture of claim 1, wherein the respective packet type to be forwarded by each of the access points includes voice or video traffic.

27. The network architecture of claim 1, wherein the respective packet type is determined based on being from one of a predetermined set of source IP addresses.

* * * * *